US008015490B2

(12) United States Patent
Ogikubo

(10) Patent No.: US 8,015,490 B2
(45) Date of Patent: Sep. 6, 2011

(54) IMAGE PROCESSING DEVICE AND IMAGE PROCESSING METHOD

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 893 days.

(21) Appl. No.: 11/993,081

(22) PCT Filed: Apr. 23, 2007

(86) PCT No.: PCT/JP2007/059284
§ 371 (c)(1),
(2), (4) Date: Dec. 19, 2007

(87) PCT Pub. No.: WO2007/126097
PCT Pub. Date: Nov. 8, 2007

(65) Prior Publication Data
US 2010/0220978 A1    Sep. 2, 2010

(30) Foreign Application Priority Data
Apr. 24, 2006    (JP) .................................. 2006-119654

(51) Int. Cl.
*G06F 15/00*    (2006.01)
*G06F 13/00*    (2006.01)
(52) U.S. Cl. ........................................ 715/716; 715/723

(58) Field of Classification Search .......... 715/700–711, 715/851–853, 716–723, 730–734, 810, 838, 715/780–784; 725/38, 25
See application file for complete search history.

(56) References Cited

U.S. PATENT DOCUMENTS
| | | | |
|---|---|---|---|
| 6,948,124 B2 * | 9/2005 | Combs et al. | 715/712 |
| 2002/0056095 A1 * | 5/2002 | Uehara et al. | 725/38 |
| 2007/0110333 A1 * | 5/2007 | Kondo et al. | 382/276 |

FOREIGN PATENT DOCUMENTS
JP    2001 309269 A    11/2001
* cited by examiner

*Primary Examiner* — Cao (Kevin) Nguyen
(74) *Attorney, Agent, or Firm* — Oblon, Spivak, McClelland, Maier & Neustadt, L.L.P.

(57) ABSTRACT

The present invention has been made to facilitate search or management of video data. The present invention generates a display space defined by display axes determined by feature parameters representing the feature of video data or audio data or associated parameters linked to the video data or audio data, converts feature values designated by the feature parameters or associated values designated by the associated parameters into coordinate parameters corresponding to a position on the display axes on the display space, and displays the video data through a display window on the display space in accordance with the change of the position corresponding to the converted coordinate parameters.

21 Claims, 53 Drawing Sheets

| FRAME NUMBER | TIME CODE | MOTION AMOUNT | MOTION DENSITY | RED | BLUE | GREEN | LUMINANCE | RED DISPERSION | BLUE DISPERSION | GREEN DISPERSION | HUE | SATURATION | VERTICAL LINE | HORIZONTAL LINE | MOTION DISPERSION | AUDIO LEVEL |
|---|---|---|---|---|---|---|---|---|---|---|---|---|---|---|---|---|
| 1frame | 00:00:01 | 0.20 | 0.30 | 0.43 | 0.60 | 0.70 | 0.55 | 0.33 | 0.47 | 0.43 | 0.55 | 0.37 | 0.60 | 0.49 | 0.23 | 0.7 |
| 2frame | 00:00:02 | 0.21 | 0.32 | 0.45 | 0.60 | 0.69 | 0.54 | 0.33 | 0.45 | 0.43 | 0.54 | 0.36 | 0.62 | 0.47 | 0.24 | 0.6 |
| 3frame | 00:00:03 | 0.32 | 0.35 | 0.46 | 0.60 | 0.72 | 0.56 | 0.33 | 0.44 | 0.42 | 0.54 | 0.35 | 0.61 | 0.43 | 0.21 | 0.9 |
| 4frame | 00:00:04 | 0.50 | 0.33 | 0.45 | 0.62 | 0.75 | 0.59 | 0.32 | 0.44 | 0.43 | 0.55 | 0.35 | 0.63 | 0.43 | 0.22 | 0.3 |
| 5frame | 00:00:05 | 0.4 | 0.38 | 0.45 | 0.62 | 0.73 | 0.57 | 0.32 | 0.44 | 0.44 | 0.56 | 0.35 | 0.63 | 0.59 | 0.23 | 0.1 |
| 6frame | 00:00:06 | 0.3 | 0.40 | 0.44 | 0.63 | 0.72 | 0.56 | 0.35 | 0.44 | 0.43 | 0.58 | 0.36 | 0.64 | 0.58 | 0.26 | 0.0 |
| 7frame | 00:00:07 | 0.32 | 0.39 | 0.43 | 0.64 | 0.74 | 0.58 | 0.34 | 0.43 | 0.43 | 0.60 | 0.37 | 0.65 | 0.57 | 0.27 | 0.2 |
| 8frame | 00:00:08 | 0.31 | 0.37 | 0.43 | 0.64 | 0.74 | 0.58 | 0.35 | 0.45 | 0.43 | 0.59 | 0.36 | 0.64 | 0.56 | 0.30 | 0.3 |
| 9frame | 00:00:09 | 0.29 | 0.37 | 0.43 | 0.63 | 0.71 | 0.55 | 0.35 | 0.43 | 0.44 | 0.58 | 0.35 | 0.62 | 0.55 | 0.29 | 0.2 |
| 10frame | 00:00:10 | 0.25 | 0.40 | 0.44 | 0.63 | 0.72 | 0.56 | 0.34 | 0.44 | 0.43 | 0.57 | 0.34 | 0.61 | 0.54 | 0.27 | 0.3 |
| 11frame | 00:00:11 | 0.20 | 0.38 | 0.44 | 0.62 | 0.72 | 0.56 | 0.34 | 0.44 | 0.43 | 0.56 | 0.35 | 0.60 | 0.52 | 0.26 | 0.5 |
| 12frame | 00:00:12 | 0.21 | 0.40 | 0.43 | 0.62 | 0.70 | 0.55 | 0.35 | 0.44 | 0.42 | 0.57 | 0.34 | 0.58 | 0.53 | 0.25 | 0.5 |
| 13frame | 00:00:13 | 0.19 | 0.39 | 0.43 | 0.61 | 0.69 | 0.54 | 0.35 | 0.43 | 0.40 | 0.57 | 0.33 | 0.59 | 0.53 | 0.25 | 0.7 |
| 14frame | 00:00:14 | 0.17 | 0.39 | 0.42 | 0.61 | 0.69 | 0.53 | 0.35 | 0.43 | 0.40 | 0.57 | 0.33 | 0.59 | 0.53 | 0.25 | 0.4 |
| 15frame | 00:00:15 | 0.18 | 0.38 | 0.40 | 0.62 | 0.68 | 0.53 | 0.36 | 0.43 | 0.40 | 0.57 | 0.33 | 0.59 | 0.53 | 0.25 | 0.2 |
| 16frame | 00:00:16 | 0.19 | 0.39 | 0.40 | 0.62 | 0.68 | 0.53 | 0.36 | 0.43 | 0.40 | 0.57 | 0.33 | 0.59 | 0.53 | 0.23 | 0.8 |
| 17frame | 00:00:17 | 0.16 | 0.38 | 0.40 | 0.62 | 0.68 | 0.53 | 0.36 | 0.43 | 0.40 | 0.57 | 0.33 | 0.59 | 0.53 | 0.23 | 0.7 |
| 18frame | 00:00:18 | 0.17 | 0.38 | 0.39 | 0.62 | 0.68 | 0.53 | 0.36 | 0.43 | 0.40 | 0.57 | 0.33 | 0.59 | 0.53 | 0.23 | 0.7 |
| 19frame | 00:00:19 | 0.18 | 0.38 | 0.39 | 0.62 | 0.68 | 0.53 | 0.36 | 0.43 | 0.40 | 0.57 | 0.33 | 0.59 | 0.53 | 0.23 | 0.8 |

FIG. 15

58Z3 ZOOM-UP IMAGE GROUP

IMAGE PROCESSING DEVICE AND IMAGE PROCESSING METHOD

TECHNICAL FIELD

The present invention relates to an image processing apparatus and an image processing method.

BACKGROUND ART

A subject such as a person, object, or landscape is picked up using an image pick-up device, and the picked up still image is compressed using a JPEG standard, JPEG 2000 standard, or the like so as to be stored in a recording medium. As a recording medium, there is available an internal memory incorporated in the image pick-up device, a removable recording medium detachably attached to the image pick-up device, and the like.

A user then uses a computer to collectively move (archive) still image data stored in such a recording medium to a large-capacity recording medium such as a hard disc or optical disc. Further, in recent years, broadband lines such as high-bandwidth line or high-speed line have been becoming popular along with an advancement of a network technology. The user utilizes such a broadband line to transmit a still image with a large data size on E-mail or upload the image to an ordinary Web site and a diary-like Web site (Blog) operated and updated by an individual or a small group.

With such various scenes of use in mind, the user uses an image management software application to manage a large number of still images stored in the large-capacity recording medium in an easy-to-search and easy-to-browse manner by sorting the images by pickup date. According to need, the user uses an image editing software application to edit a target still image.

There is available a computer or a set-top box that can store programs available through digital terrestrial broadcasting/digital satellite broadcasting or through network delivery in a large-capacity recording medium such as a hard disc or optical disc to allow users to enjoy desired program whenever they want.

Under such an environment, there may be a case where the user searches for a specific program from a plurality of stored programs so as to watch only a specific scene in the target specific program. In this case, the plurality of programs are sorted by recording date and program category (sports, drama, news, etc.) for display, as well as the first screens of respective scenes of the respective programs are displayed in thumbnail view, allowing the user to select his or her desired scene.

Thus, as the number of still image data or recorded program data is increased, it becomes difficult for the user to find a specific data from a large number of data. In view of this, techniques relating to a user-friendly display interface have been proposed (refer to, e.g., Patent Documents 1 to 3). In addition to techniques of Patent Documents 1 to 3, there is known a technique of analyzing still images themselves and arranging them on a display screen in a sorted manner according to their feature amounts obtained by the analysis.

Patent Document 1: WO2000/033455
Patent Document 2: WO2000/033570
Patent Document 3: WO2000/033572

However, in the case where the number of still image data or program data becomes huge, it is not enough to simply sort the still image data or program data by pick-up date, recording date, category, or the like in order to realize a user-friendly display interface.

Further, there has not yet been disclosed a technique on how to perform the sorting and displaying so as to realize a user-friendly display interface in the case where data to be managed is a moving picture (video data). Further, with a conventional display interface, it has been difficult for the user to intuitively recognize what feature the entire moving picture has or where a specific scene that the user desires is located in the entire moving picture.

DISCLOSURE OF INVENTION

The present invention has been made in view of the above points, and an object thereof is to provide an image processing apparatus and an image processing method capable of facilitating search or management of video data.

To solve the above problems, according to an aspect of the present invention, there is provided an image processing apparatus characterized by including: a display space generation means for generating a display space defined by display axes determined by feature parameters representing the feature of video data or audio data or associated parameters linked to the video data or audio data; a conversion means for converting feature values designated by the feature parameters or associated values designated by the associated parameters into coordinate parameters corresponding to a position on the display axes on the display space; and a display means for displaying the video data through the display window on the display space in accordance with the change of the position corresponding to the converted coordinate parameters.

Further, according to another aspect of the present invention, there is provided an image processing method characterized by including: a display space generation step of generating a display space defined by display axes determined by feature parameters representing the feature of video data or audio data or associated parameters linked to the video data or audio data; a conversion step of converting feature values designated by the feature parameters or associated values designated by the associated parameters into coordinate parameters corresponding to a position on the display axes on the display space; and a display step of displaying the video data through the display window on the display space in accordance with the change of the position corresponding to the converted coordinate parameters.

According to the present invention, video data can be displayed to a user in an easily understood and user-friendly form, allowing the user to intuitively recognize the feature of the video data, which facilitates search or management of the video data.

BRIEF DESCRIPTION OF DRAWINGS

FIG. 15 is a table showing contents of a metadata file.

BEST MODE FOR CARRYING OUT THE INVENTION

An embodiment of the present invention will be described in detail below with reference to the accompanying drawings.

(1) Configuration of Image Processing System

Figure 1:
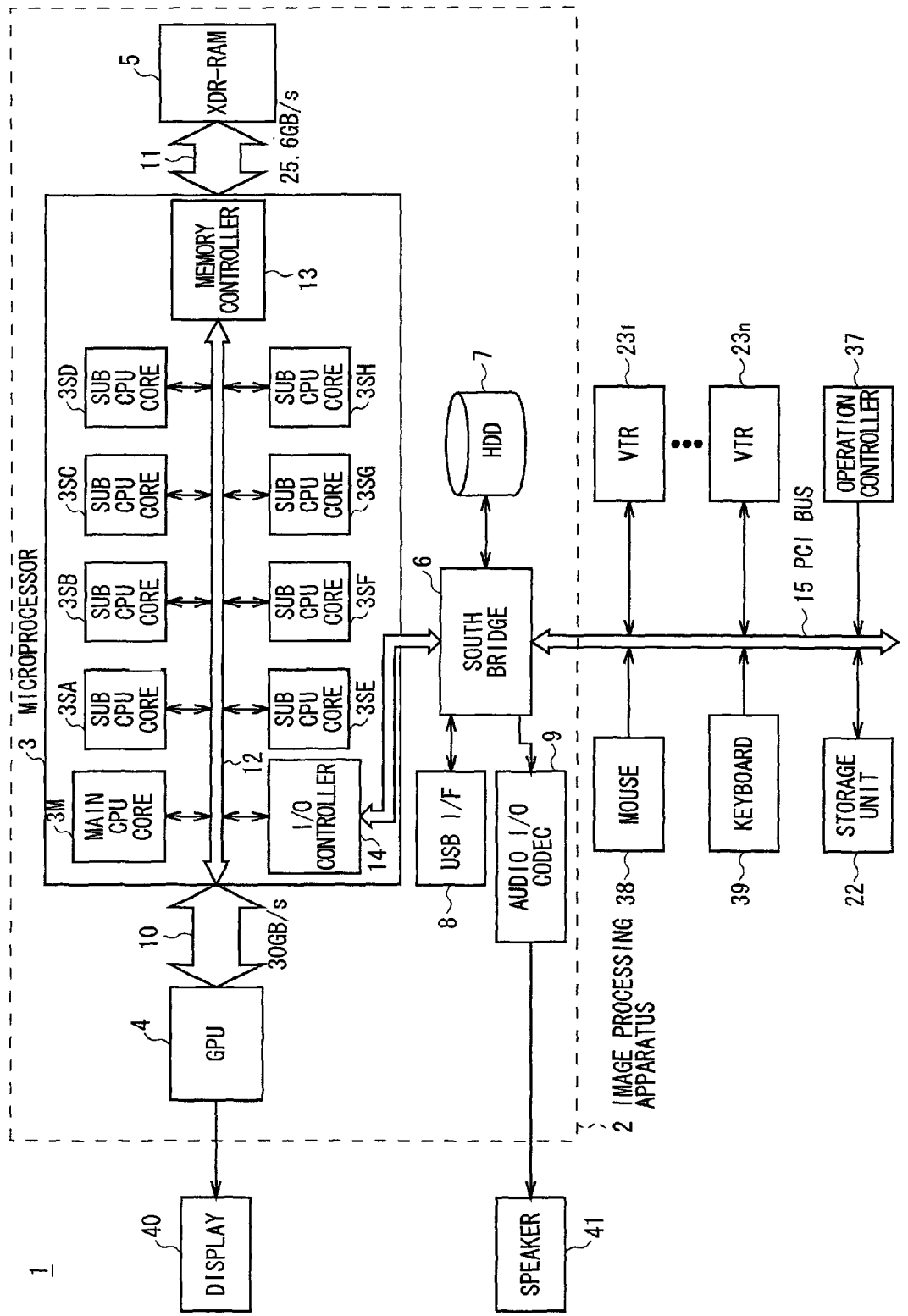
FIG. 1 is a schematic block diagram showing a configuration of an image processing apparatus according to an embodiment of the present invention.

As shown in FIG. 1, a reference numeral 1 denotes an image processing system according to an embodiment of the present invention which roughly includes an image processing apparatus 2, a storage unit 22, and a plurality of video tape recorders 231 to 23n.

The image processing system 1 is configured to load a part of or entire AV (Audio/Visual) data recorded on a video tape as a clip to a large-capacity storage unit 22 adopting RAID (Redundant Arrays of Independent Disks) technology through the image processing apparatus 2 or load still image data recorded on a video tape to the storage unit 22.

Further, the image processing system 1 is configured to create an edit list specifying edition contents for obtaining desired edited video and audio by connecting AV data loaded to the storage unit 22 in a desired state and moreover, actually execute edition processing in accordance with the created edit list and store the obtained AV data as a new clip in the storage unit 22 or record the AV data on a video tape through any one of the video tape recorders 231 to 23n.

In this case, in the image processing system 1, a GPU 4, an EXR (Extreme Data Rate)-RAM 5, and a south bridge 6 are connected to a microprocessor 3. A hard disc drive 7, a USB interface 8, and an audio I/O codec 9 are connected to the south bridge 6. A speaker 41 is connected to the audio I/O codec 9.

Further, a mouse 38, a keyboard 39, video tape recorders 231 to 23n, a recording apparatus 22, and an operation controller 37 are connected to the south bridge 6 through a PCI bus 15. A display 40 is connected to the GPU 4.

The microprocessor 3 is a multi-core processor in which a general-purpose main CPU core 3M for executing a basic program such as an OS (Operating System), a plurality of (eight in this case) signal processing processors (hereinafter, referred to as "sub CPU core") 3SA to 3SH of a RISC (Reduced Instruction Set Computer) type connected to the main CPU core 3M through an internal bus 12, a memory controller 13 for performing memory control on an XDR-RAM 5 having a capacity of, e.g., 256 [MByte], and an I/O (In/Out) controller 14 for managing data input and output between itself and south bridge 6 are integrated in one chip. This microprocessor 3 operates at an operating frequency of, e.g., 4 [GHz].

The microprocessor 3 of the image processing system 1 mainly functions as a codec compatible with an existing video standard such as MPEG-2 or H.264/AVC (Advanced Video Coding) and is configured to transfer a playback image of video data obtained as a result of decode processing to the GPU 4, change settings such as a playback speed (to be described later) of the playback image of video data, transfer still image data to the GPU 4, or perform physical simulation.

Particularly, in the microprocessor 3, the eight sub CPU cores 3SA to 3SH function as decoders for a video stream obtained by encoding video data and can decode HD (High Definition) video stream in parallel.

The main CPU core 3M, which is configured to perform processing or management other than those performed by the eight sub CPU cores 3SA to 3SH, receives an instruction supplied from the mouse 38, the keyboard 39, or the operation controller 37 through the south bridge 6 and executes various processing according to the received instruction.

As described above, the microprocessor 3 is configured to be able to decode video stream in parallel using the eight sub CPU cores 3SA to 3SH and transfer data between the microprocessor 3 and the GPU 4 at a transfer rate of up to 30 [GByte/sec] using a high bandwidth bus 10. That is, it is possible to decode and transfer many high definition video streams at short times.

The GPU 4 performs final rendering processing concerning texture pasting required when a playback image of video data to be displayed on the display 40 is moved, coordinate conversion calculation required when a playback image of video data or a still image of still image data is displayed on the display 40, and enlargement/reduction processing for a playback image of video data or still image of still image data and thereby reduces a processing load of the microprocessor 3.

Practically, upon start-up, the microprocessor 3 reads out a required application program stored in the hard disc drive 7 and develops the application program in the XDR-RAM 5 based on a control program in the hard disc drive 7 and, afterward, executes required control processing based on the application program and user operation.

When a display instruction of a clip capture window for importing an AV stream recorded on a video tape into the storage unit 22 is input by a user through the mouse 38, keyboard 39, or operation controller 37, the microprocessor 3 correspondingly controls the hard disc drive 7 so as to read out AV data corresponding to the display instruction and, at the same time, controls the GPU 4 to display the clip capture window based on the AV data on the display 40.

In this state, upon user input of a playback operation instruction for the video tape recorders 231 to 23n through the mouse 38, keyboard 39, or operation controller 37, the microprocessor 3 correspondingly controls the video tape recorders 231 to 23n so as to execute playback operation of AV data recorded on a video tape.

As a result, an AV stream played back from a video tape loaded in the video tape recorders 231 to 23n is output from the video tape recorders 231 to 23n to the GPU 4 sequentially through the PCI bus 15, south bridge 6, and microprocessor 3.

The GPU 4 applies predetermined signal processing to the supplied video data and sends the resultant video data to the display 40 under the control of the microprocessor 3, whereby a playback image based on the video data is displayed at a predetermined position in the clip capture window. Meanwhile, the microprocessor 3 sends an audio signal extracted from AV data to the speaker 41 through the audio I/O codec 9, whereby audio based on the audio signal is output from the speaker 41.

Therefore, a user can specify a desired playback video/audio part as a clip while viewing the playback image of video data displayed on the display 40 and hearing the playback audio of audio data output from the speaker 41 with the mouse 38, keyboard 39, or operation controller 37, and can register management information including time codes of the IN-point and OUT-point, clip length, clip ID, clip name, shooting time of the AV data, and creation time of the clip as metadata. This clip management information is registered in a clip management database in the hard disc drive 7 under the control of the microprocessor 3.

Although described later in detail, the microprocessor 3 can register not only the abovementioned clip management information but also the feature amount of various parameters of video data constituting AV data as a metadata file.

After that, when a capture instruction of the AV stream is input by a user through the mouse 38, keyboard 39, or operation controller 37, the microprocessor 3 correspondingly controls the video tape recorders 231 to 23n so as to play back the specified AV stream.

As a result, a video stream or audio stream included in the AV stream played back from the video tape is output from the video tape recorders 231 to 23n. The video stream is then given to the GPU 4 sequentially through the PCI bus 15, south bridge 6, microprocessor 3, and bus 10.

A user can display an edit window (to be described later) for performing editing work by a predetermined operation using the mouse 38, keyboard 39, or operation controller 37 on the display 40 and thereby can create an edit list specifying edition contents showing how to connect clips to each other by using the edit window. Moreover, the user can confirm edited video and edited audio according to the edit list after or while creating the edit list.

When a registration instruction of an edit list is input through the mouse 38 after the creation of the edit list, the microprocessor 3 converts edit data created by all users specified in the edit list into a file and registers this file in an edit list database in the hard disc drive 7.

Further, when a playback instruction of the edited video/audio based on the edit list is input through the mouse 38, keyboard 39, or operation controller 37 after or in the middle of creating the edit list, the microprocessor 3 correspondingly controls the storage unit 22 so as to read a video stream and audio stream included in a required AV stream.

Thus read video stream and audio stream included in the AV stream read out from the storage unit 22 are given to the GPU 4 sequentially through the PCI bus 15, south bridge 6, microprocessor 3, and bus 10, to be subjected to video special effect processing, if necessary, under the control of the microprocessor 3.

Under the control of the microprocessor 3, the GPU 4 applies predetermined signal processing to the video data obtained as a result of the video special effect processing and sends the resultant video signal to the display 40.

Meanwhile, the microprocessor 3 applies audio mixing to the audio data among the video data and audio data included in the AV data and sends the resultant audio data to the speaker 41 through the audio I/O codec 9.

As a result, a playback image of the video data is displayed at a predetermined position in the edit window and a playback audio of the audio data is output from the speaker 41. As described above, the image processing system 1 allows the user to do editing work while confirming the playback image and playback audio based on the edit list.

Thus, in the image processing system 1, the microprocessor 3 and GPU 4 provided in the image processing apparatus 2 can execute, for a playback image on the edit screen displayed on the display 40, video display processing including special effect processing, as well as various advanced processing or edition processing.

The video data that has simultaneously been decoded in parallel by the eight sub CPU cores 3SA to 3SH in the microprocessor 3 is transferred to the GPU 4 through the bus 10. The data transfer rate at this time is, e.g., up to 30 [GByte/sec] and, therefore, it is possible to display even a highly complex video data that has been subjected to special effect processing at high speed and smoothly.

(2) Display Processing for Video Data

In the image processing system 1, an edit mode and a view mode are prepared. In the edit mode, the abovementioned edition processing for generating edited video image data is executed. In the view mode, a classification display for allowing a user to easily manage or search for a large quantity of video image data and still image data stored in the storage unit 22 is executed.

(2-1) Display Content of Edit Window

Figure 2:
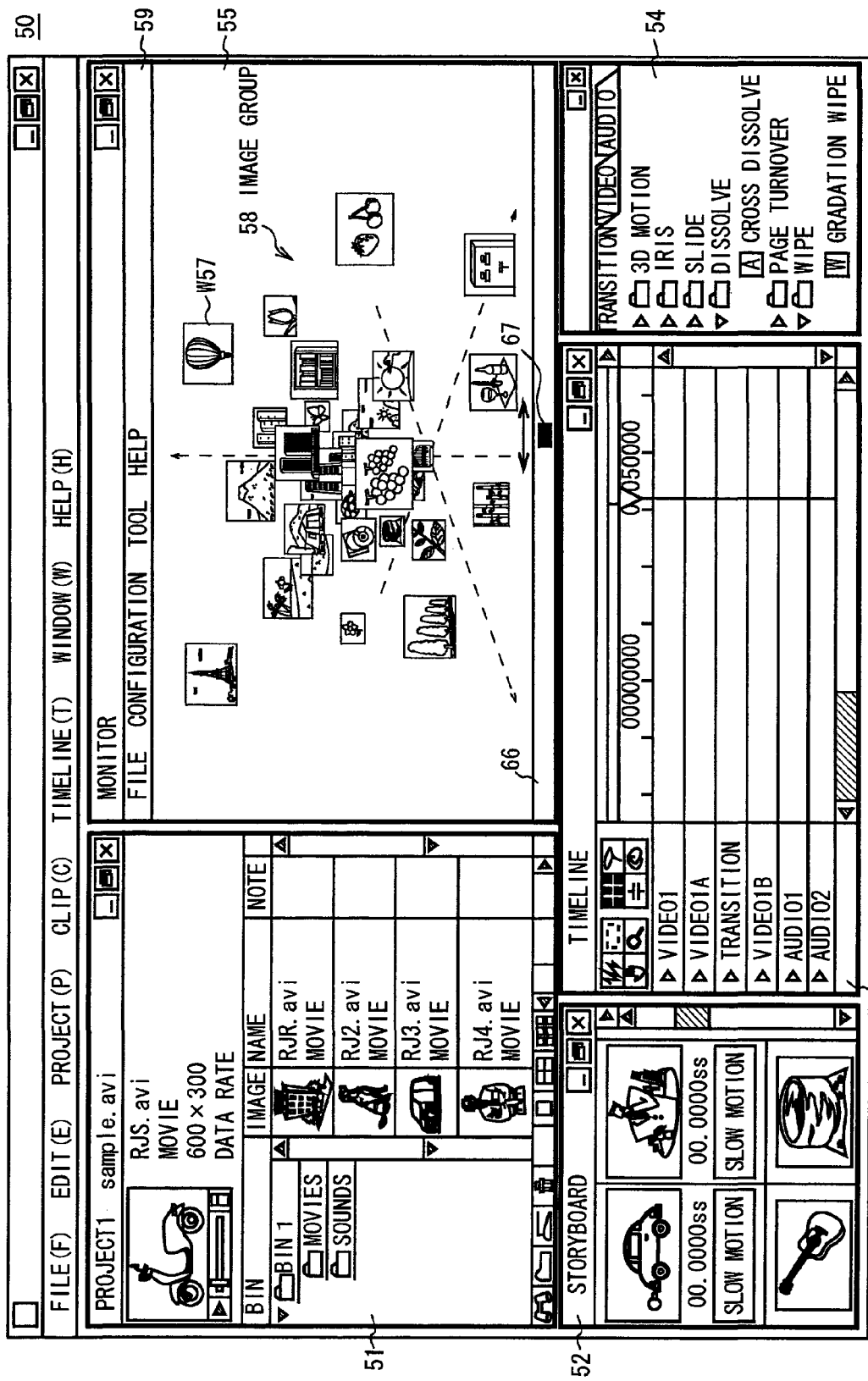
FIG. 2 is a schematic view showing a configuration of an edit screen according to the embodiment of the present invention.

When an instruction for displaying the edit window is input by a user through the mouse 38, keyboard 39, or operation controller 37, the microprocessor 3 of the image processing apparatus 2 controls the hard disc drive 7 and GPU 4 so as to enter the view mode, whereby an edit window 50 shown in FIG. 2 is displayed on the display 40.

The edit window 50 has a clip list display area 51, a storyboard area 52, a timeline area 53, an effect information display area 54, and a display area 55 that is unique to this edit window 50. On this edit window 50, editing work is mainly done on the display area 55, and the storyboard area 52 and the timeline area 53 are just supplementarily provided.

In this case, the clip list display area 51 shows various bins and files being registered in the image processing apparatus 2. When a user selects a desired bin or file, this clip list display area 51 shows a list of AV data being contained in the bin or file.

Then the user selects desired AV data from the AV data as a moving picture from the clip list displayed in the clip list display area 51, drags and drops a desired clip onto the display area 55, whereby a display window W57 showing the first image (the first still image in the case of video data) of the AV data is displayed on the display area 55. Note that a plurality of display windows W57 can be displayed on the display area 55.

In this state, the user can click the display window W57 to cause the image processing apparatus 2 to play back the dragged-and-dropped AV data on the display area 55 and fast forward, fast rewind, or stop the displayed playback image.

Thus, the user can search for a desired frame while visually confirming the playback image of the video data contained in the AV data through a plurality of display windows W57 on the display area 55 and specify a start point (hereinafter, referred to as IN-point) and an end point (hereinafter, referred to as OUT-point) of a desired video/audio part to be cut out from the AV data.

When the IN-point and OUT-point are thus specified, the microprocessor 3 of the image processing apparatus 2 enters the edit mode. In this state, the user can paste the video/audio part between the IN-point and OUT-point of thus specified AV data in the storyboard area 52 as new AV data by drag-and-drop operation.

The edit window 50 arranges clips of editing-targeted AV data in the storyboard area 52, which allows the user to easily imagine an edited video. The storyboard area 52 shows the thumbnail and detailed information of the main image corresponding to the first image or the like of each pasted clip.

Then the user sequentially arranges clips pasted on the storyboard area 52 on a video track of the timeline area 53 by drag-and-drop operation. At this time, a band (not shown) corresponding to a length of each pasted clip appears on the video track with a timeline as an index. When audio is accompanying the pasted video, a band (not shown) having the same length appears on an audio track at the same position indicated by the timeline.

Since the bands exist on the video track and the audio track in the timeline area 53, the video and audio of the clip corresponding to the bands are displayed and output at times specified on the timeline. Therefore, such an edit list can be created that specifies a series of clips to be played back as an edited video/audio.

(2-2) Display of Image Group

Further, the microprocessor 3 of the image processing apparatus 2 displays a plurality of display windows W57 each having a predetermined frame size, which show the AV data selected by the user from the clip list displayed in the clip list display area 51 and dragged and dropped onto the display area 55, on the display area 55 of the edit window 50 to thereby present an image group 58.

In the microprocessor 3 of the image processing apparatus 2, an additional clip can be dragged and dropped from the clip list display area 51 onto the display area 55 showing at least one display window W57, and one or some display windows existing on the display area 55 can be deleted according to user's selection/deletion operation.

Figure 3:
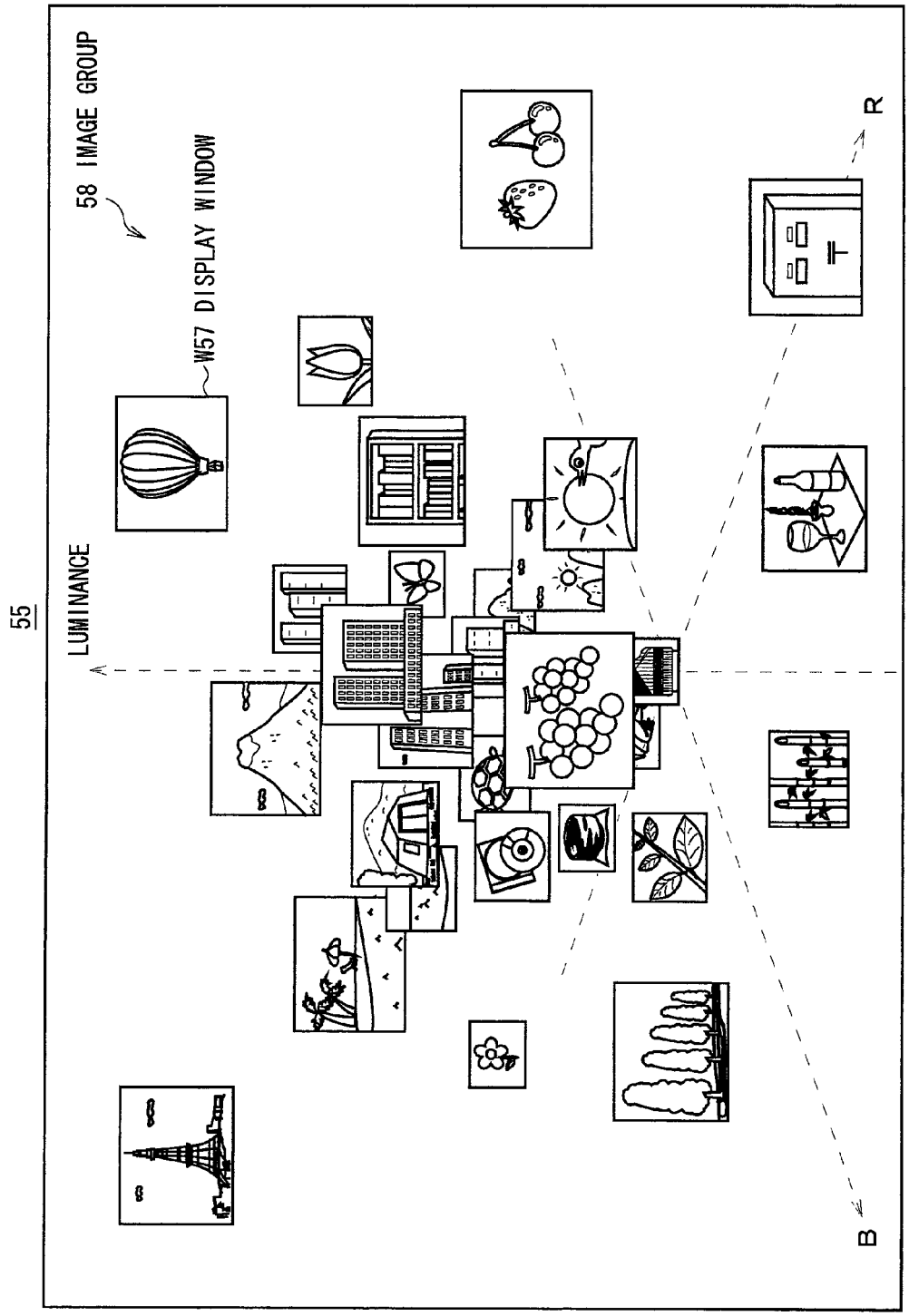
FIG. 3 is a schematic view showing an image group.

Here, as shown in FIG. 3, the image group 58 refers to a plurality of the first pictures (still images) of video data or representative picture (still image) which are arranged in the form of the display window W57 based on the feature amount (picture-basis or GOP-basis) of the video data in a three-dimensional display space in which parameters of "red (R)", "blue (B)", and "luminance" are set respectively as X-axis, Y-axis, and Z-axis constituting display axes.

The parameters constituting the respective display axes (X-axis, Y-axis, and Z-axis) in the three-dimensional display space can collectively referred to as "feature parameters" representing the feature of AV data containing video data. Basically, the feature amount included in the feature parameters differs for each picture constituting the video data unless pictures of the same still image continue each other in terms of time.

Although the respective display axes of the three-dimensional display area as depicted in FIG. 3 are not explicitly displayed on the display area 55 of the edit window 50 actually, the display windows W57 are arranged based on the respective display axes such that the display window W57 showing a picture (still image) having a high red level video data included in the image group 58 is disposed on the lower right side of the display area 55, display window W57 showing a picture having a high luminance level video data included in the image group 58 is disposed on the upper central side of the display area 55, and display window W57 showing a picture having a high blue level video data included in the image group 58 is disposed on the lower left side of the display area 55. This arrangement allows the user to intuitively recognize rough distribution of the luminance or color component contained in a plurality of video data as an image.

Incidentally, in this three-dimensional display space, only positive quadrants with respect to an origin are used for respective parameters of "red (R)" (X-axis), "blue (B)" (Y-axis), and "luminance (Z-axis)", and a plurality of display windows W57 are arranged in the space corresponding to the quadrants. Alternatively, however, the quadrants may include negative direction with respect to an origin.

For video data included in the image group 58, the microprocessor 3 of the image processing apparatus 2 can sequentially update a picture constituting the video data at an update speed according to a predetermined frame frequency in the display window W57, thereby displaying the video data as a moving picture.

Since, at this time, the feature amount of the picture constituting the video data changes every time the picture is updated, the microprocessor 3 of the image processing apparatus 2 rearranges the display window W57 according to the feature amount in the three-dimensional display space, whereby the display window W57 of the video data is displayed while moving on the three-dimensional display space.

The image processing apparatus 2 can control the playback speed of the video data by changing the update speed of the picture. When the update speed is increased, the video data can be played back at fast speed and, accordingly, the movement speed of the display window W57 is increased to allow the display window W57 to move at high speed on the three-dimensional display space. On the other hand, when the update speed is increased, the movement speed of the display window W57 is decreased to allow the display window W57 to move at low speed in such a manner as if it were floating on the three-dimensional display space.

Further, the image processing apparatus 2 can fast-rewind plays back the video data in the display window W57. In this case, the display window W57 moves in the opposite direction to the above-described case. Incidentally, the image processing apparatus 2 can stop the display window W57 at a user's desired timing while the display window W57 is moving in the forward direction or backward direction so as to display a picture (still image) corresponding to this timing.

(2-3) Display of Video Data

The image processing apparatus 2 previously extracts the feature parameters representing the feature amount of the picture constituting the video data as metadata and, when displaying the playback image of the video data through the display window W57, rearranges the display window W57 on the three-dimensional virtual space according to the feature amounts of respective pictures to be updated. The above configuration for moving the display window W57 will be described in terms of the function block constituted by the microprocessor 3 and GPU 4.

Here, the following three configuration examples will be described. A first configuration example is a method that previously extracts the feature parameters from respective pictures constituting the video data as metadata and uses the extracted feature parameters to display the video data. A second configuration example is a method that uses metadata to display the video data while generating the metadata from respective pictures constituting the video data. A third configuration example is a method that uses the feature parameters to display the video data while generating the feature parameters as metadata when the video data is encoded for recording.

(2-3-1) First Configuration Example

Figure 4:
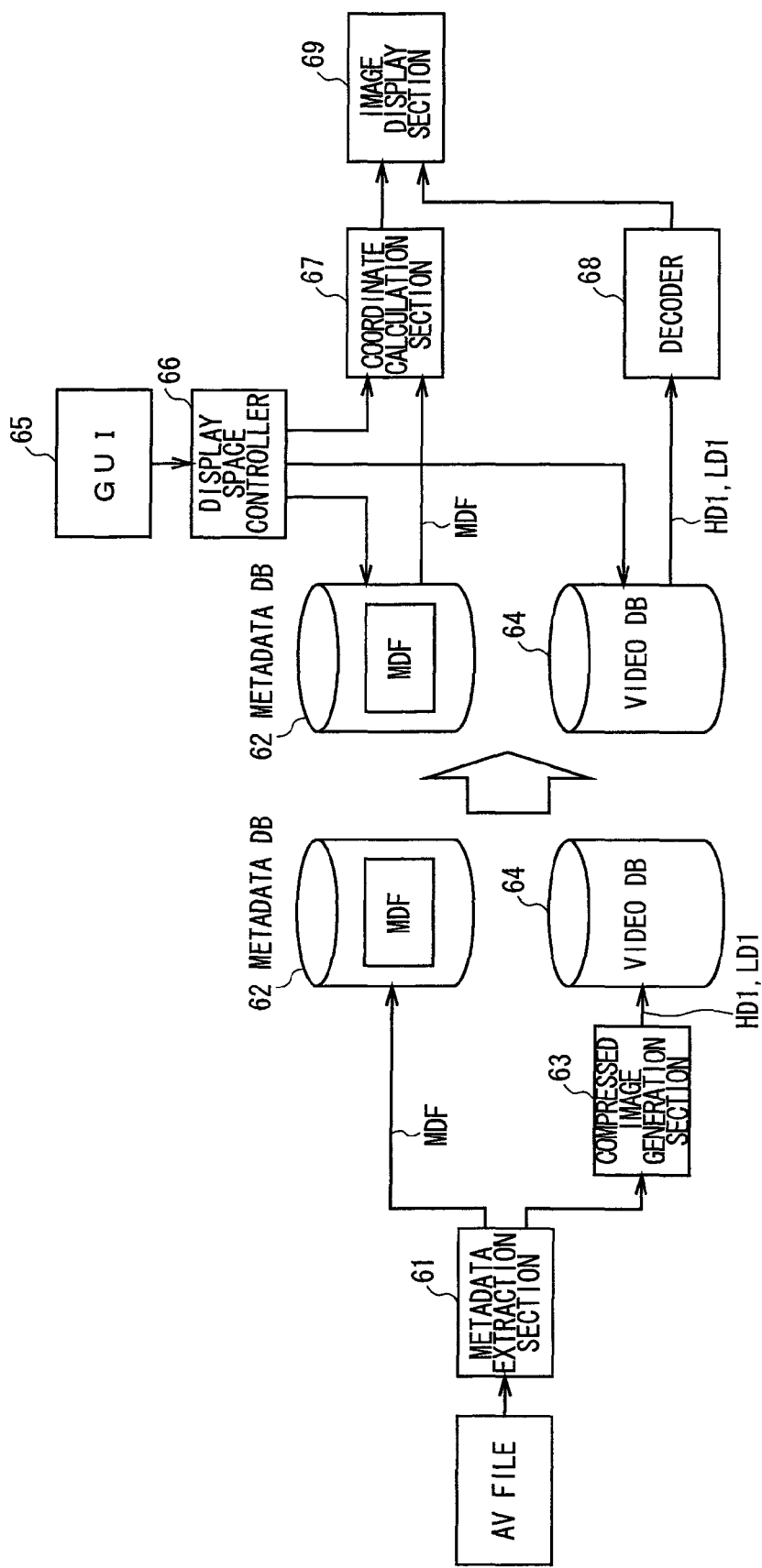
FIG. 4 is a schematic block diagram showing a first configuration example in which a microprocessor and a GPU realize a display function of video data.

As shown in FIG. 4, a metadata extraction section 61 extracts the feature parameters representing various feature amounts included in AV data containing video data and registers the extracted feature parameters in a metadata database (hereinafter, referred to as "metadata DB") 62 as a picture-basis or pictures-basis (e.g., GOP-basis) metadata file MDF corresponding to the video data.

A compressed image generation section 63 compresses respective pictures of the video data supplied through the metadata extraction section 61 so as to register the compressed pictures in a video database (hereinafter, referred to as "video DB") 64 as a main-video stream HD1, as well as reduces the number of pixels of the pictures in the video data at a predetermined rate so as to register the pixel number reduced pictures in the video DB 64 as a sub-video stream LD1.

This configuration allows both the main-video stream HD1 whose pixel number has not been reduced and sub-video stream LD1 whose pixel number has been reduced to be stored in the video DB 64 in units of video data or in units of a predetermined time period. Thus, the microprocessor 3 can selectively use the main and sub-video streams in accordance with the position on the three-dimensional display space. For example, when the image size of the display window W57 needs to be reduced, the sub-video stream LD1 is used; on the other hand, when the image size of the display window W57 needs to be enlarged, the main-video stream HD1 is used.

A display space controller 66 recognizes parameters of the display axes used for generation of the three-dimensional display space which is specified by a user through a Graphical User Interface (GUI) 65 displayed on the display area 55, recognizes viewpoint coordinates for presenting the image group 58 to the user, or makes various determinations concerning the display such as a determination of arranging the AV data selected by a user on the three-dimensional display space.

Therefore, the display space controller 66 outputs frame numbers corresponding to a plurality of pictures constituting the video data to be displayed on the display area 55 as the image group 58 (FIG. 3) to the metadata DB 62 based on the determination result to allow the metadata DB 62 to read out the metadata file MDF therefrom using the feature parameters of the picture corresponding to the frame number as the metadata and send the metadata file MDF to a coordinate calculation section 67.

Further, based on the determination result, the display space controller 66 outputs the frame numbers of the pictures constituting the video data also to the video DB 64. This allows the sub-video stream LD1 corresponding to the frame numbers to be sent to a decoder 68 when the playback image of the video data is displayed through the display window W57, and allows the main-video stream HD1 corresponding to the frame numbers to be sent to the decoder 68 when the playback image of the video data is displayed in an enlarged manner.

The decoder 68 decodes the sub-video stream LD1 and main-video stream HD1 supplied from the video DB 64 and sends the decoded sub- and main-video data to an image display section 69.

The coordinate calculation section 67 sets the feature parameters supplied from the display space controller 66 to the display axes of the display space, converts the feature parameters into coordinates (coordinate parameters) of the three-dimensional display space by calculation, and determines the arrangement on the three-dimensional display space according to the obtained coordinate parameter values. Then, based on the viewpoint coordinate with respect to the image group 58 including a plurality of display windows W57 to be arranged on the three-dimensional display space and positions of the respective display windows W57, the coordinate calculation section 67 determines the display size of each display window W57 and sends various information (display parameters) concerning the display of each display window W57 to the image display section 69.

The image display section 69 uses the coordinate parameters received from the coordinate calculation section 67 to determine the three-dimensional coordinate positions on the three-dimensional display space on which the sub-video data supplied from the decoder 68 is arranged and arranges a display window W57 corresponding to the sub-video data on the three-dimensional display space. After executing the above processing for display windows W57 corresponding to other video data, the image display section 69 converts the coordinate parameters of the display windows W57 into the two-dimensional coordinate positions (display position parameters) of the display area 55 to thereby display the image group 58 including a plurality of display windows W57 on the display area 55.

(2-3-2) Second Configuration Example

Figure 5:
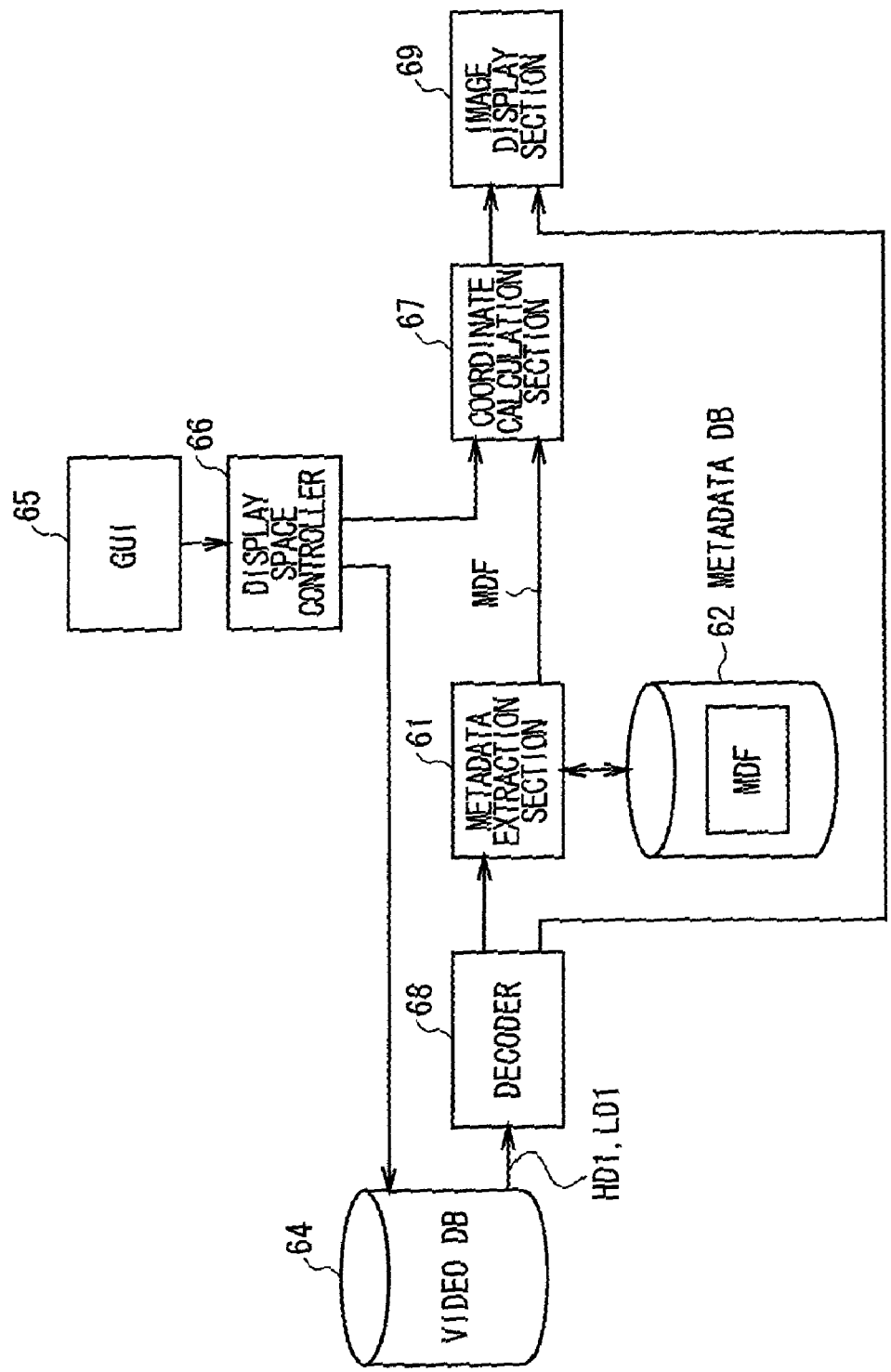
FIG. 5 is a schematic block diagram showing a second configuration example in which a microprocessor and a GPU realize a display function of video data.

Referring to FIG. 5, in which the same component parts as those in FIG. 4 are designated by the same reference numerals as the corresponding parts in FIG. 4, the display space controller 66 recognizes the feature parameters set to the display axes of the three-dimensional display space which is specified by a user through the GUI 65 displayed on the display area 55 or recognizes viewpoint coordinates for presenting the image group 58 to the user. Further, the display space controller 66 makes various determinations concerning the display such as a determination of arranging the video data selected by a user on the three-dimensional display space and sends this determination to the coordinate calculation section 67.

Therefore, the display space controller 66 outputs the frame numbers of the pictures constituting the video data also to the video DB 64 based on the determination result to allow the sub-video stream LD1 corresponding to the frame numbers to be sent to the decoder 68 when the playback image of the video data is displayed through the display window W57, and allow the main-video stream HD1 corresponding to the frame numbers to be sent to the decoder 68 when the playback image of the video data is displayed in an enlarged manner.

Incidentally, as in the case of the above first configuration example, both the main-video stream HD1 that has been encoded with the pixel number thereof not reduced and sub-video stream LD1 that has been encoded with the pixel number thereof reduced are previously stored in the video DB 64.

The decoder 68 decodes the sub-video stream LD1 and main-video stream HD1 supplied from the video DB 64 and sends the decoded main-video data to the metadata extraction section 61 and decoded sub-video data to the image display section 69.

The metadata extraction section 61 extracts the feature parameters included in the main-video data supplied from the decoder 68 as metadata and registers the extracted metadata in the metadata DB 62 as the metadata file MDF, as well as sends this metadata file MDF to the coordinate calculation section 67.

The coordinate calculation section 67 generates the three-dimensional display space in which the feature parameters supplied from the display space controller 66 are set to the display axes by calculation, converts the feature amounts represented by the feature parameters of the video data to be displayed on the respective display windows W57 into coordinate parameters in the three-dimensional display space, and determines the arrangement on the three-dimensional display space according to the obtained coordinate parameter values. Then, based on the viewpoint coordinate with respect to the image group 58 including a plurality of display windows W57 to be arranged on the three-dimensional display space and positions of the respective display windows W57, the coordinate calculation section 67 determines the display size of each display window W57 and sends various information (display parameters) concerning the display of each display window W57 to the image display section 69. Then, based on the viewpoint coordinate with respect to the image group 58 including a plurality of display windows W57 to be arranged on the three-dimensional display space and positions of the respective display windows W57, the coordinate calculation section 67 determines the display size of each display window W57 and sends various information (display parameter) concerning the display of each display window W57 to the image display section 69.

The image display section 69 uses the coordinate parameters received from the coordinate calculation section 67 to determine the three-dimensional coordinate positions (coordinate parameters) on the three-dimensional display space on which the sub-video data supplied from the decoder 68 and arranges a display window W57 corresponding to the sub-video data on the three-dimensional display space. After executing the above processing for display windows W57 corresponding to other video data, the image display section 69 converts the three-dimensional coordinate parameters of a plurality of display windows W57 into the two-dimensional coordinate positions (display position parameters) of the display area 55 to thereby display the image group 58 including a plurality of display windows W57 on the display area 55.

(2-3-3) Third Configuration Example

Figure 6:
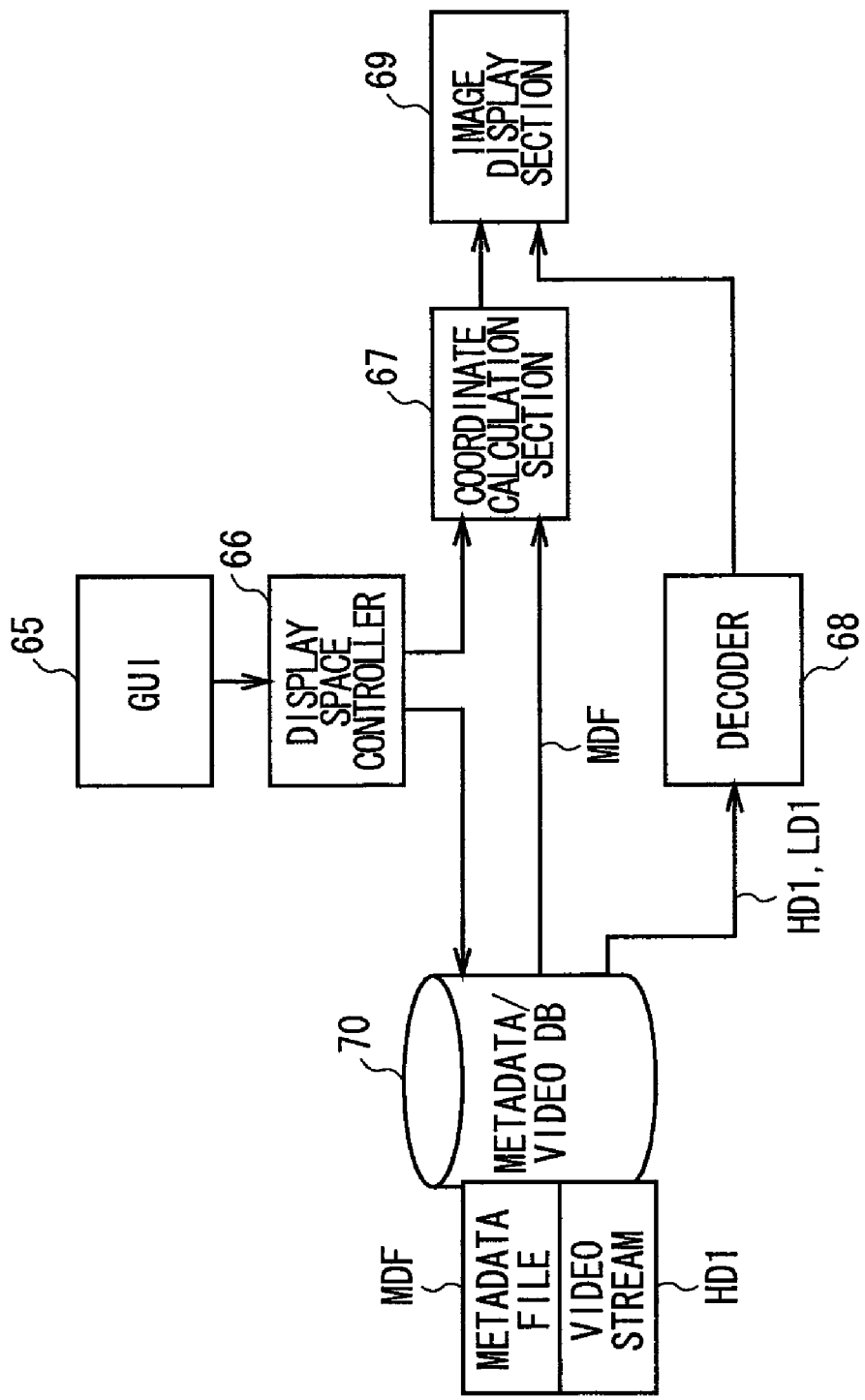
FIG. 6 is a schematic block diagram showing a third configuration example in which a microprocessor and a GPU realize a display function of video data.

Referring to FIG. 6, in which the same component parts as those in FIG. 5 are designated by the same reference numerals as the corresponding parts in FIG. 5, the display space controller 66 recognizes the feature parameters set to the display axes of the three-dimensional display space which is specified by a user through the GUI 65 or recognizes viewpoint coordinates for presenting the image group 58 to the user. Further, the display space controller 66 makes various determinations concerning the display such as a determination of arranging the video data selected by a user on the three-dimensional display space and sends this determination to the coordinate calculation section 67.

Therefore, the display space controller 66 outputs the frame numbers of the pictures constituting the video data to a metadata and video database (hereinafter, referred to as "metadata/video DB") 70 based on the determination result.

This metadata/video DB 70 stores the main-video stream HD1 picked up and encoded by an image pickup device, as well as sub-video stream LD1 obtained by encoding sub-video data which is obtained by reducing the pixel number of the main-image data. When the playback image of the video data is displayed through the display window W57, the metadata/video DB 70 sends the sub-video stream LD1 corresponding to the frame numbers to the decoder 68. When the playback image of the video data is displayed in an enlarged manner, the metadata/video DB 70 sends the main-video stream HD1 corresponding to the frame numbers to the decoder 68.

Further, the metadata/video DB 70 stores the feature parameters included in the main-video data which has been extracted by a metadata extraction section incorporated in the image pickup device at the shooting time of the main-video data as a metadata file MDF.

Therefore, the metadata/video DB 70 sends the feature parameters corresponding to the frame numbers supplied from the display space controller 66 to the coordinate calculation section 67 as the metadata file MDF.

The coordinate calculation section 67 generates the three-dimensional display space in which the feature parameters supplied form the display space controller 66 are set to the display axes by calculation, converts the feature parameters of the video data to be displayed on the respective display windows W57 into coordinate parameters in the three-dimensional display space, and determines the arrangement on the three-dimensional display space according to the obtained coordinate parameter values. Then, based on the viewpoint coordinate with respect to the image group 58 including a plurality of display windows W57 to be arranged on the three-dimensional display space and positions of the respective display windows, the coordinate calculation section 67 determines the display size of each display window W57 and sends various information concerning the display of each display window W57 to the image display section 69.

The decoder 68 decodes the sub-video stream LD1 or main-video stream HD1 supplied from the metadata/video DB 70 and sends the decoded main-video data or sub-video data to the image display section 69.

The image display section 69 uses the coordinate parameters received from the coordinate calculation section 67 to determine the three-dimensional coordinate positions (coordinate parameters) on the three-dimensional display space on which the sub-video data supplied from the decoder 68 and arranges a display window W57 corresponding to the sub-video data on the three-dimensional display space. After executing the above processing for display windows W57 corresponding to other video data, the image display section 69 converts the three-dimensional coordinate parameters of a plurality of display windows W57 into the two-dimensional coordinate positions (display position parameters) of the display area 55 to thereby display the image group 58 including a plurality of display windows W57 on the display area 55.

(2-4) Concrete Configuration of Metadata Extraction Section

Figure 7:
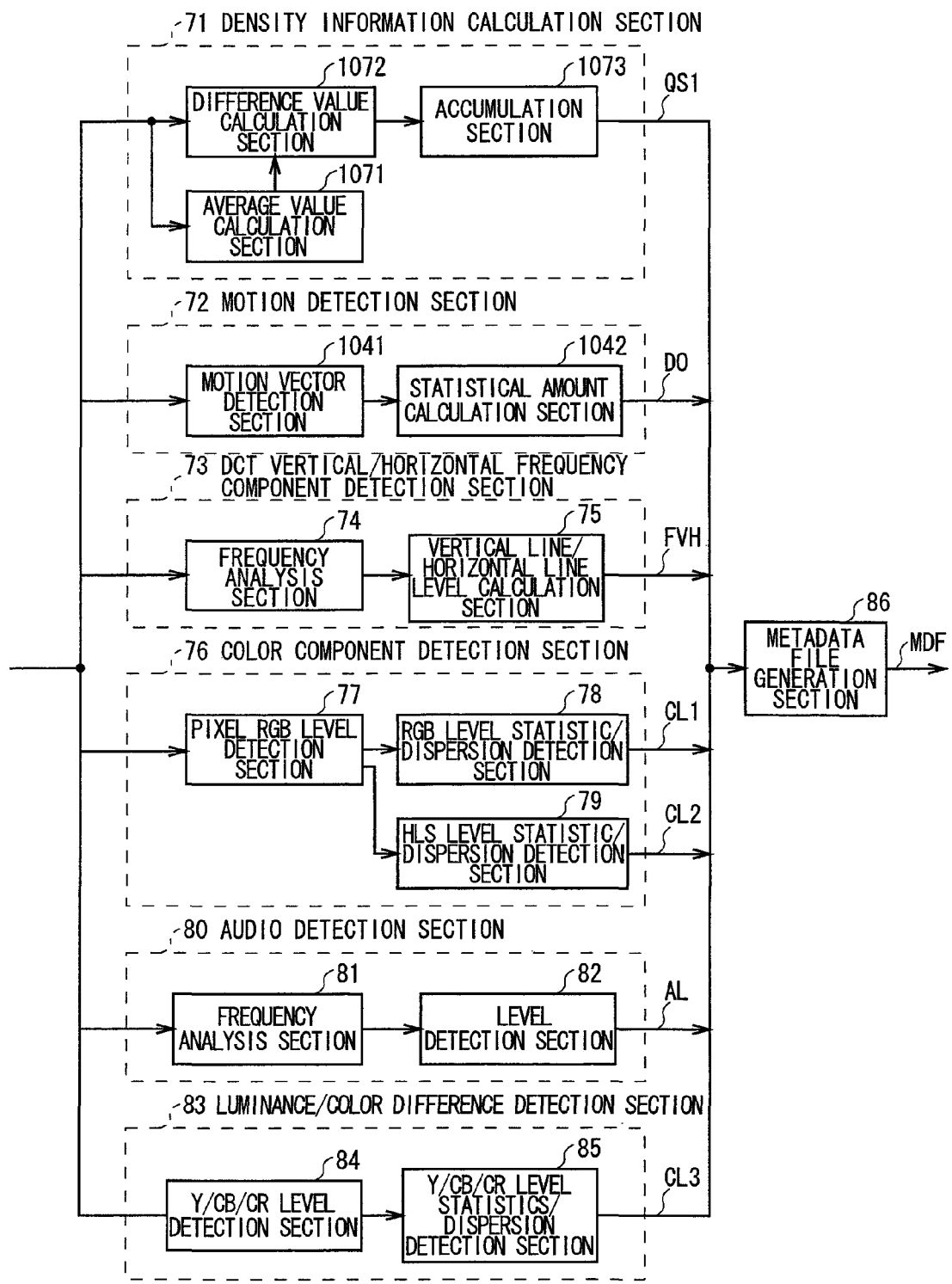
FIG. 7 is a schematic block diagram showing a configuration of a metadata extraction section.

A concrete configuration of the abovementioned metadata extraction section 61 will next be described. As shown in FIG. 7, the metadata extraction section 61 includes a density information calculation section 71, a motion detection section 72, a DCT vertical/horizontal frequency component detection section 73, a color component detection section 76, an audio detection section 80, a luminance/color difference detection section 83, and a metadata file generation section 86 in order to extract the feature parameters including various feature amounts corresponding to a density (complexity), a motion vector, a DCT (Discrete Cosine Transform) vertical/horizontal frequency component, a color component, and a audio level of each picture constituting the video data. The metadata extraction section 61 may include additional detection sections for extracting the feature amounts of parameters other then the above.

(2-4-1) Configuration of Density Information Calculation Section

The density information calculation section 71 includes an average value calculation section 1071, a difference value calculation section 1072, and an accumulation section 1073. Video data is supplied to the average value calculation section 1071 and difference value calculation section 1072.

Figure 8:
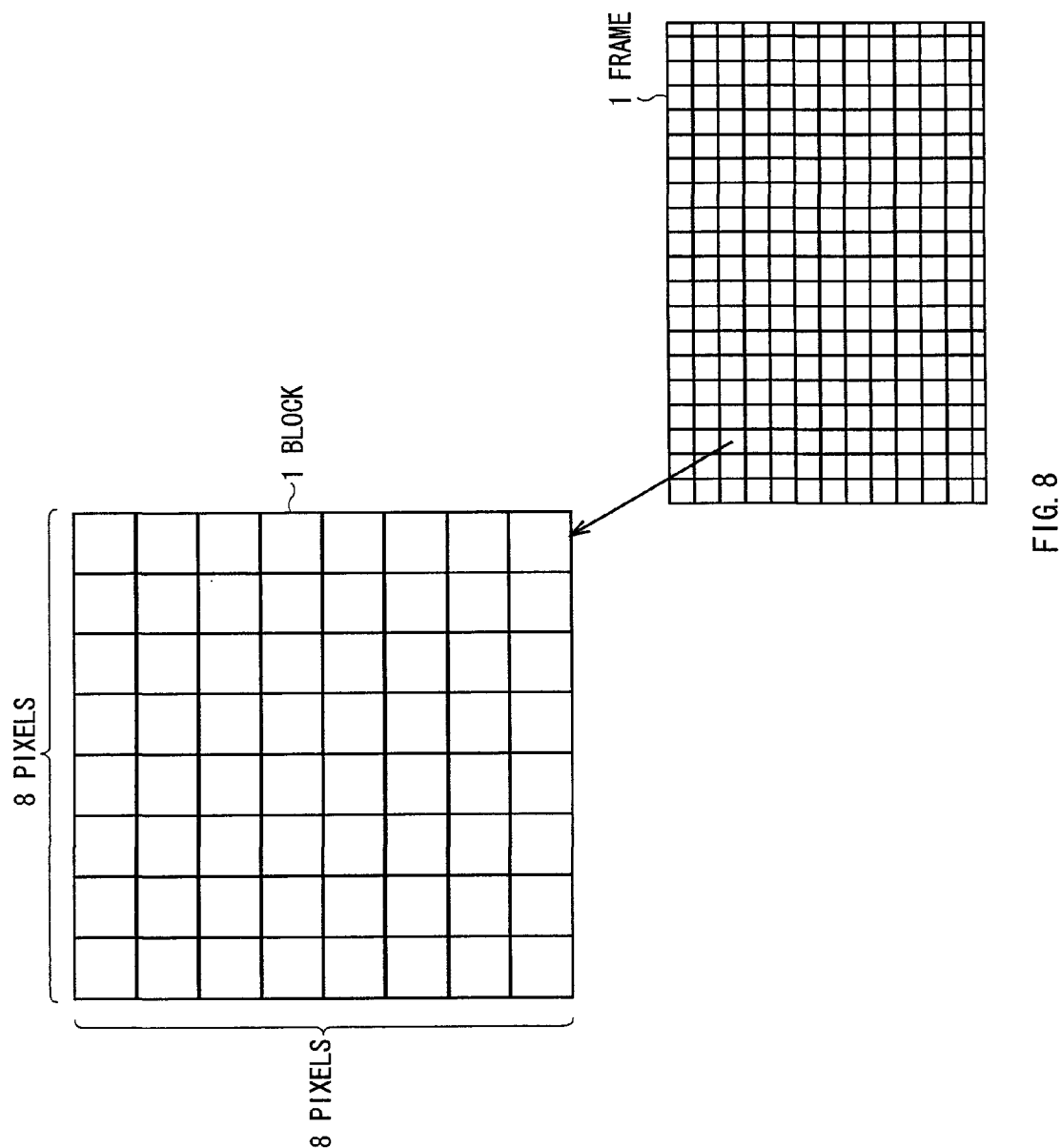
FIG. 8 is a schematic view used to explain processing performed by average value calculation section.

The average value calculation section 1071 sequentially sets the frames constituting the video data as a target frame and divides the target frame into, e.g., 8×8 pixel blocks as shown in FIG. 8. Further, the average value calculation section 1071 calculates the average value of the pixel values of respective blocks on the target frame and supplies the obtained average value to the difference value calculation section 1072.

Assume here that the pixel value of k-th pixel in the raster scan order for the 8×8 pixel blocks is Pk, the average value calculation section 1071 calculates an average value Pave according to the following expression:

$$Pave = 1/(8 \times 8) \times \Sigma Pk$$

where the summation $\Sigma$ represents a summation with respect to k from k=1 to k=64 (=8×8).

The difference value calculation section 1072 divides the target frame into, e.g., 8×8 pixel blocks in the same manner as the average value calculation section 1071 and calculates an absolute value |Pk−Pave| of the difference value between the pixel value Pk of each block and average value Pave of the pixel values of the 8×8 pixel blocks and sequentially supplies the obtained value to the accumulation section 1073.

The accumulation section 1073 accumulates the absolute values |Pk−Pave| of the difference values calculated for the respective pixels of the blocks sequentially supplied from the difference value calculation section 1072 to obtain an accumulation value Q=Σ|Pk−Pave|, where the summation $\Sigma$ represents a summation with respect to k from k=1 to k=64 (=8×8).

Further, the accumulation section 1073 calculates the total sum of the accumulation values Q obtained for all the blocks of the target frame and outputs the total sum to the metadata file generation section 86 as target frame density information QS1.

The total sum of the accumulation value Q obtained for the target frame is referred to as "Intra-AC". The larger the value of the Intra-AC becomes, the more variation there is in the pixel values in the target frame. Therefore, it can be said that as the density information QS1 which is the total sum of the accumulation values Q becomes larger, the still image of the target frame becomes denser (more complex).

(2-4-2) Configuration of Motion Detection Section

Figure 9:
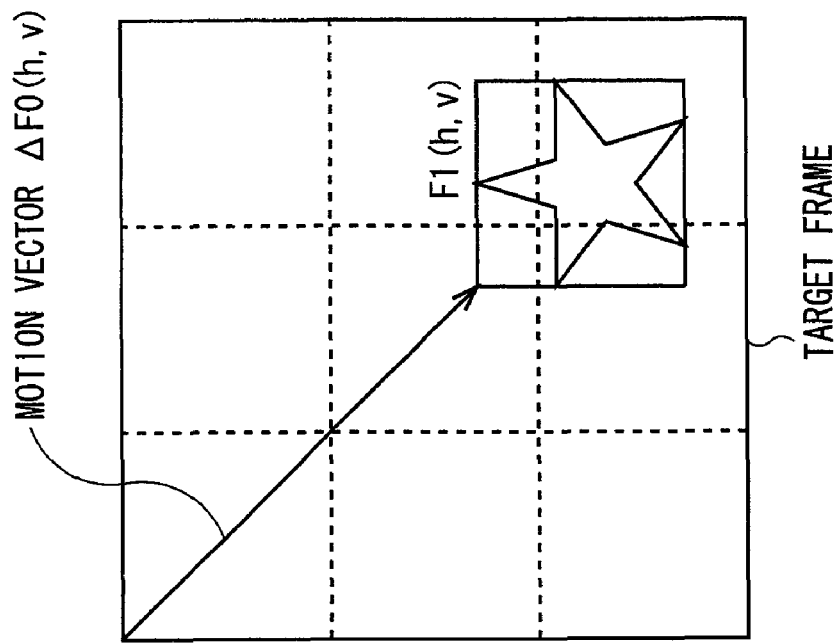
FIG. 9 is a schematic view used to explain processing performed by a motion detection section.
Figure 9:
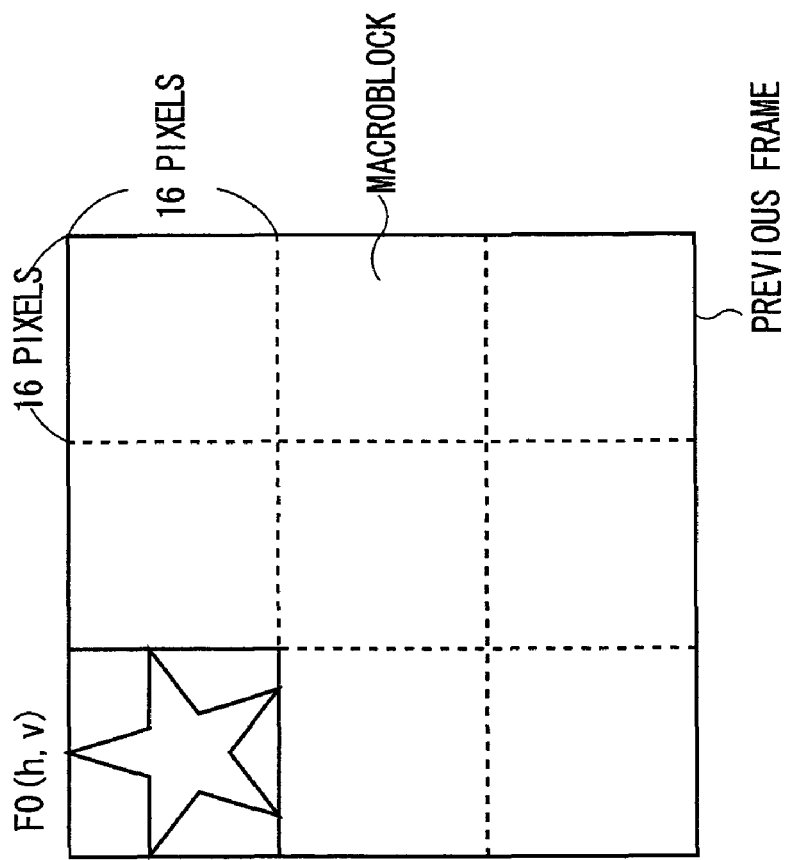

In the motion detection section 72 (FIG. 7), as shown in FIG. 9, a motion vector detection section 1041 divides the previous frame into macroblocks each having 16×16 pixels and detects each 16×16 pixel block (hereinafter, referred to as "similar block") in the target frame that is most similar to each macroblock in the previous frame. Then, the motion vector detection section 1041 calculates a vector starting from the upper left of the macroblock and ending at the upper left of the similar block as a motion vector ΔF0 (h,v) of the macroblock.

It is now assumed that the position of a macroblock, h-th from the left end and the v-th from the upper end in the previous frame, is expressed by F0 (h,v) and that the position of a 16×16 pixel block, i.e., similar block in the target frame which has been moved from the macroblock F0 (h,v) by a distance corresponding to a motion vector ΔF0 (h,v) is expressed by F1 (h,v), the motion vector ΔF0 (h,v) of the macroblock F0 (h,v) is expressed by the following expression:

$$\Delta F0(h,v)=F1(h,v)-F0(h,v)$$

A statistical amount calculation section 1042 calculates the statistical amount of the motion vector obtained for the macroblock in the previous frame. More specifically, the statistical amount calculation section 1042 calculates the total sum D0=Σ|ΔF0 (h,v)| of the magnitudes of the motion vectors ΔF0 (h,v) of all the macroblocks in the previous frame and outputs the obtained total sum D0 as motion information of the target frame.

The summation Σ in the above expression: D0=Σ|ΔF0 (h,v)| represents a summation with respect to h from h=1 to h=the horizontal number of macroblocks in the previous frame and v from v=1 to v=the vertical number of macroblocks in the previous frame.

The larger the magnitude of the motion vector ΔF0 (h,v) of each macroblock F0 (h,v) in the previous frame is, the larger the motion information D0 which is the total sum of the motion vectors becomes. Therefore, it can be said that as the motion information D0 of the target frame becomes larger, the motion of the image of the target frame becomes larger (more violent).

In the above case, the total sum D0=Σ|ΔF0 (h,v)| of the magnitudes of the motion vectors ΔF0 (h,v) of all the macroblocks in the previous frame is obtained as the statistical amount of the motion vectors obtained for the macroblocks in the previous frame. Alternatively, however, the dispersion of the motion vectors obtained for the macroblocks in the previous frame can be used as the statistical amount.

In this case, the statistical amount calculation section 1042 calculates an average value Dave of the motion vectors ΔF0 (h,v) of all the macroblocks in the previous frame and calculates a dispersion σ0 of the motion vectors ΔF0 (h,v) of all the macroblocks F0 (h,v) in the previous frame using, e.g., the following expression:

$$\sigma 0=\Sigma(\Delta F0(h,v)-\Delta ave)2$$

where the summation Σ represents a summation with respect to h from h=1 to h=the horizontal number of macroblocks in the previous frame and v from v=1 to v=the vertical number of macroblocks in the previous frame.

As in the case of the total sum D0, as the motion of the image of the target frame becomes larger (more violent), the dispersion σ0 becomes larger.

Figure 10:
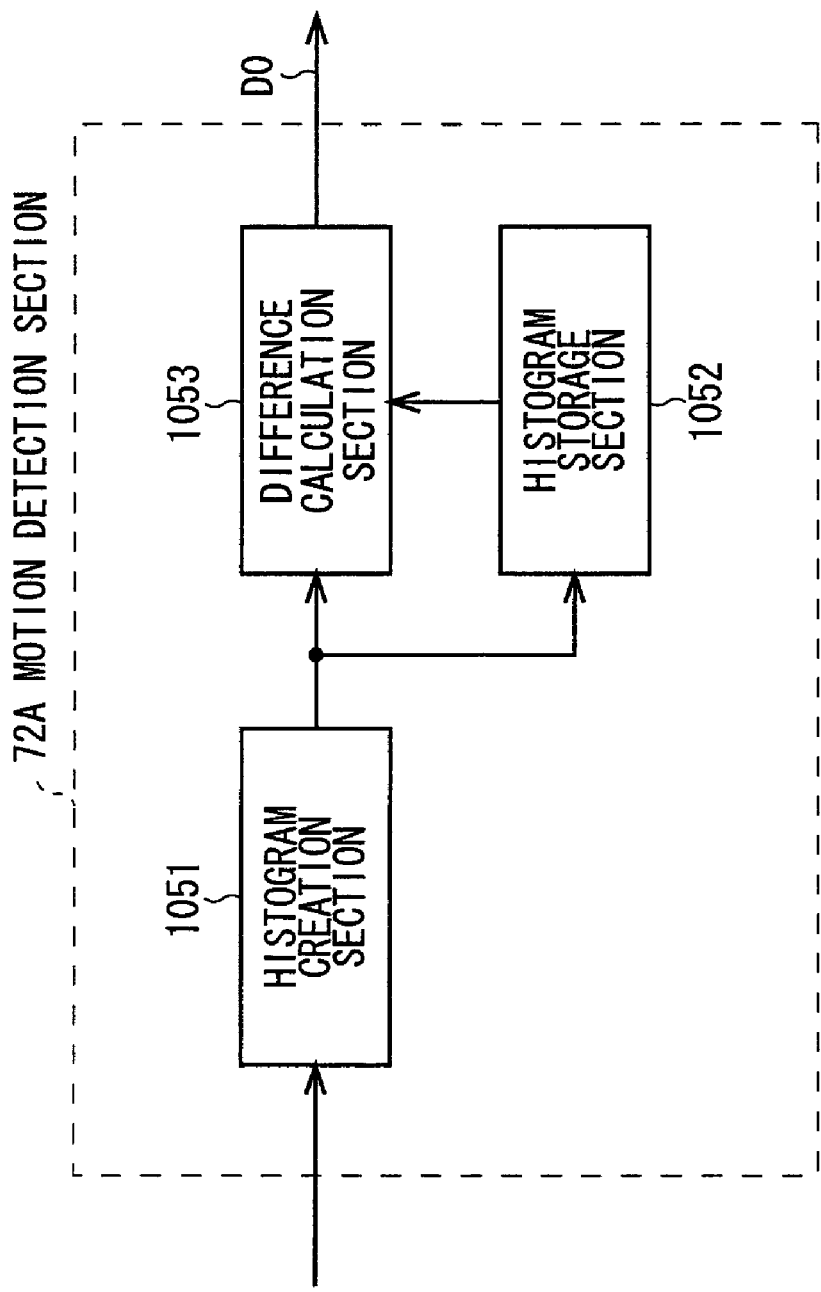
FIG. 10 is a schematic block diagram showing another configuration of the motion detection section.

FIG. 10 shows another configuration of the motion detection section 72 of FIG. 7. This motion detection section 72A includes a histogram creation section 1051, a histogram storage section 1052, and a difference calculation section 1053.

When video data is supplied to the histogram creation section 1051, the histogram creation section 1051 sequentially sets the frames constituting the video data as a target frame, creates a simple histogram of the pixel values of the target frame, and supplies this histogram created for each target to the histogram storage section 1052 and difference calculation section 1053.

The histogram storage section 1052 stores the histogram of the target frame supplied from the histogram creation section 1051. The histogram storage section 1052 has a storage capacity large enough to store at least histograms corresponding to two frames and thus stores the histogram of the target frame supplied from the histogram creation section 1051 and histogram of the previous target frame (i.e., previous frame).

The difference calculation section 1053 calculates a difference absolute sum (to be described later) of the histogram of the target frame supplied from the histogram creation section 1051 and histogram of the previous frame stored in the histogram storage section 1052 and outputs the calculation result as the motion information D0 of the target frame.

Figure 11:
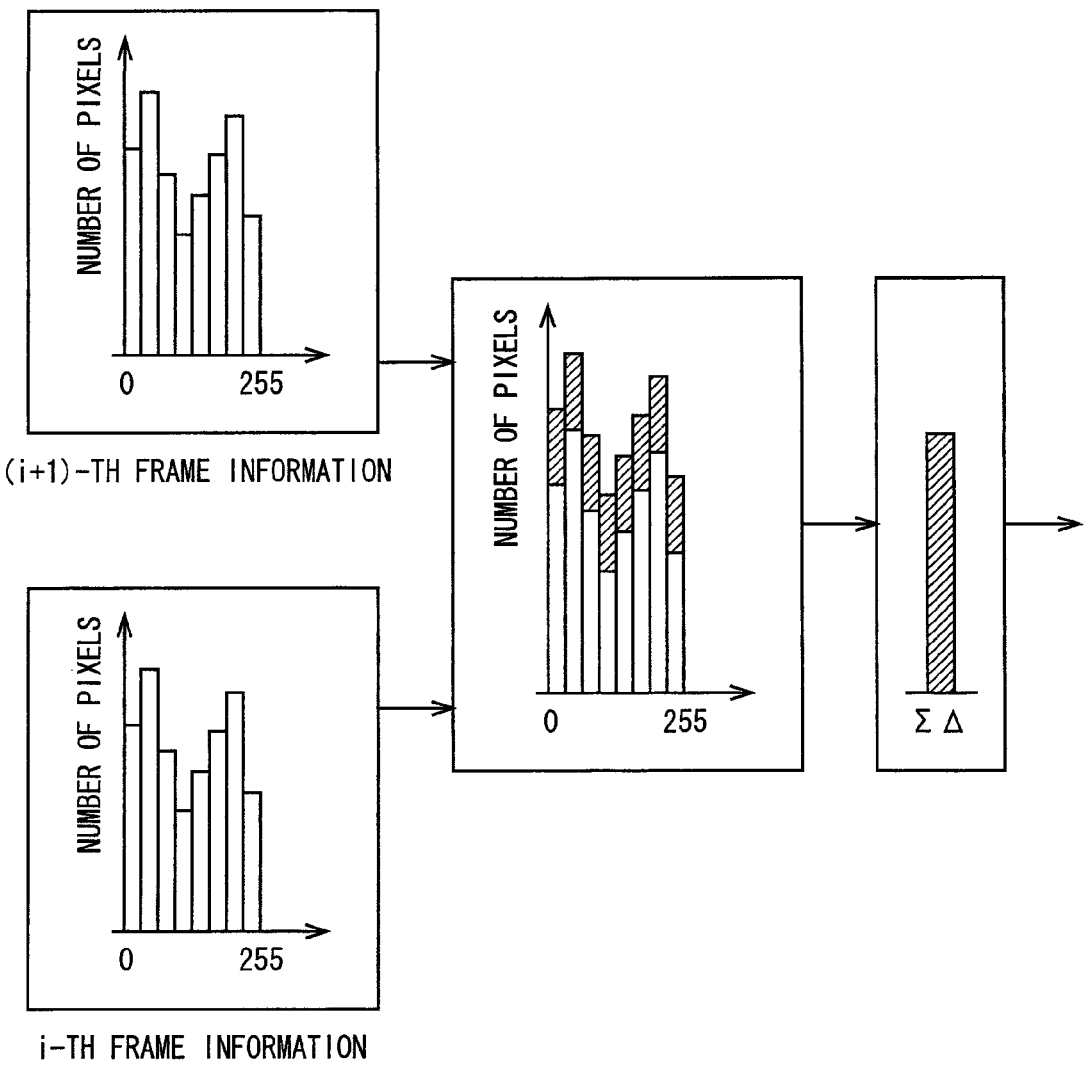
FIG. 11 is a schematic view used to explain processing performed by a motion information calculation section.

Referring to FIG. 11, the above processing performed in the motion detection section 72A of FIG. 10 will be described in more detail. Assuming that the pixel value of the video data supplied to the histogram creation section 1051 is represented by 8 bits with the values 0 to 255, the histogram creation section 1051 equally divides the range of 0 to 255 into, e.g., 8 small ranges of 0 to 31, 32 to 63, 64 to 95, 96 to 127, 128 to 159, 160 to 191, 192 to 223, 224 to 255 and calculates the frequency of occurrence of the pixel values included in the each small range to thereby create the simple histogram of the target frame.

Assuming that, for example, (i+1)-th frame is the target frame, the difference calculation section 1053 calculates an absolute value Δ (shadowed portions in FIG. 11) of the difference value between the frequency in (i+1)-th frame which is the target frame and frequency in i-th frame which is the previous frame in the same small range. Further, the difference calculation section 1053 calculates a total sum (difference absolute sum) ΣΔ of the absolute value of the difference value of the frequency obtained for respective 8 small ranges in the histogram and outputs the obtained total sum ΣΔ to the metadata file generation section 86 as the motion information D0 of the target frame.

When the motion of the target frame is large (violent), the frequency distribution of the pixel values in the target frame differs from that in the previous frame. Therefore, it can be said that as the difference absolute sum ΣΔ of the target frame becomes larger, the image of the target frame becomes larger (more violent).

Figure 12:
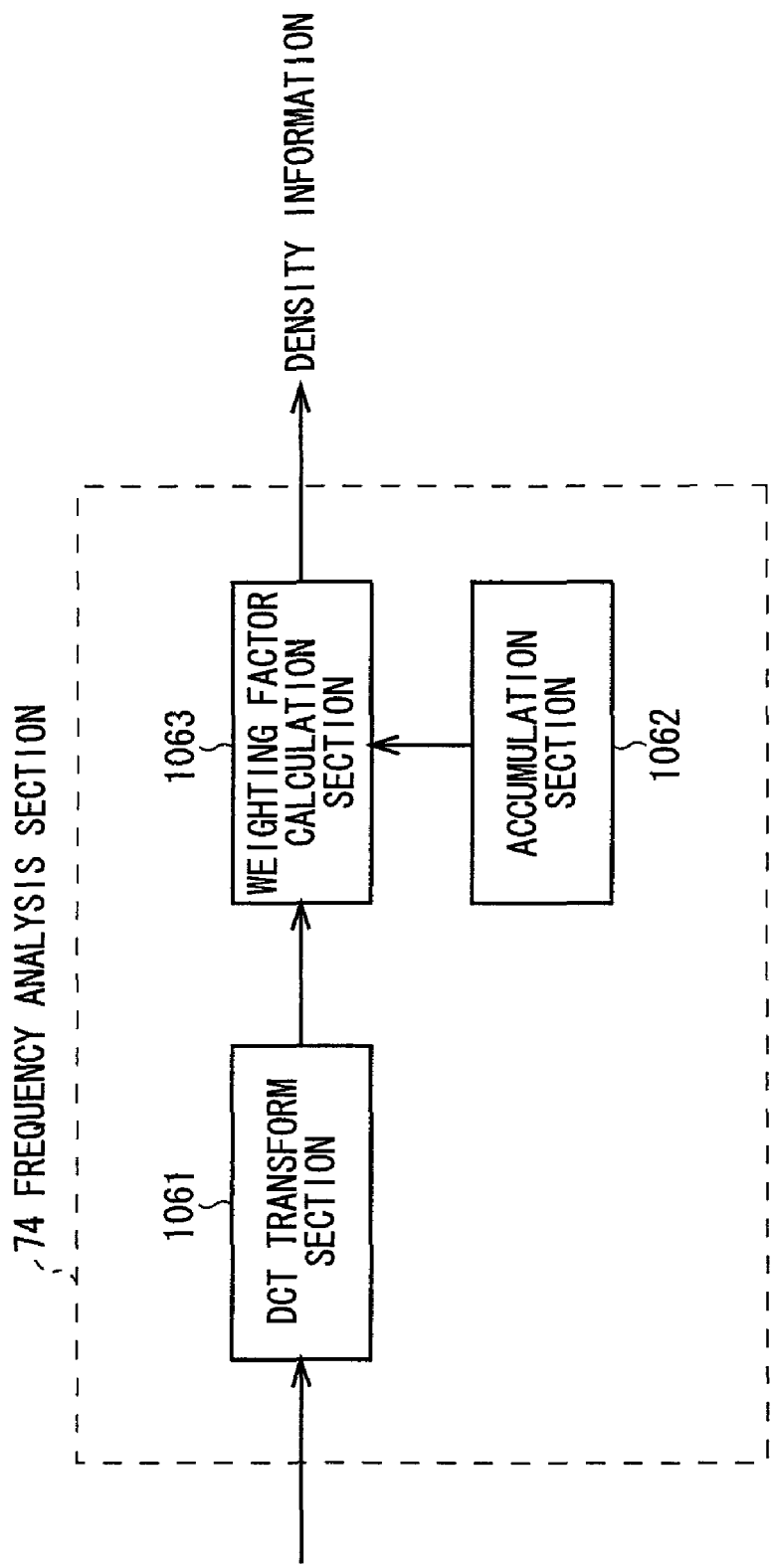
FIG. 12 is a schematic block diagram showing a configuration of a frequency analysis section.

(2-4-3) Configuration of DCT Vertical/Horizontal Frequency Component Detection Section FIG. 12 shows a configuration example of a frequency analysis section 74 in the DCT vertical/horizontal frequency component detection section 73 (FIG. 7). The frequency analysis section 74 includes a DCT transform section 1061, a weighting factor calculation section 1062, and an accumulation section 1063.

When video data is supplied to the DCT transform section 1061, the DCT transform section 1061 sequentially sets the frames constituting the video data as a target frame and divides the target frame into 8×8 pixel blocks. Further, the DCT transform section 1061 DCT transforms the respective blocks in the target frame and supplies 8×8 DCT coefficients obtained for respective blocks to the accumulation section 1063.

The weighting factor calculation section 1062 calculates the weights to be added respectively to the 8×8 DCT coefficients and supplies the weights to the accumulation section 1063. The accumulation section 1063 adds the weights supplied from the weighting factor calculation section 1062 respectively to the 8×8 DCT coefficients supplied from the DCT transform section 1061 so as to perform accumulation to thereby obtain an accumulation value for each block. Further, the accumulation section 1063 calculates the total sum of the accumulation values obtained for respective blocks and sends the total sum to a vertical line/horizontal line level calculation section 75 (FIG. 7) as the density information of the target frame.

Figure 13:
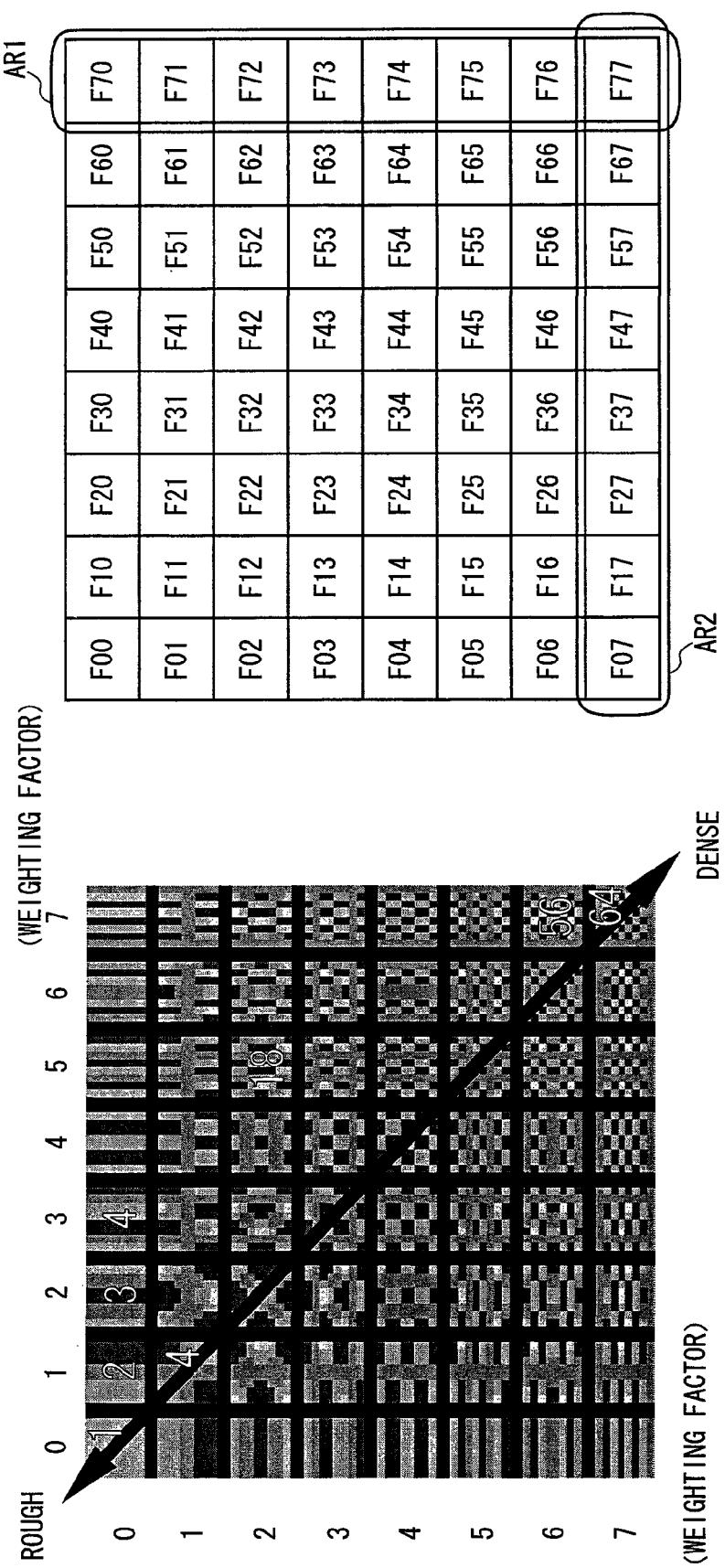
FIG. 13 is a schematic view used to explain processing performed by a density information calculation section.

Referring to FIG. 13, the processing performed in the frequency analysis section 74 of FIG. 12 will be described in more detail. The left side of FIG. 13 shows a base image after DCT transform. The base image is composed of 8×8 patterns (frequency components). In this base image, the frequency component becomes higher toward the right side and lower side.

The right side of FIG. 13 shows a DCT coefficient F (i−1, j−1) which is the i (i=1, 2, 8)-th from the left and j (i=1, 2, .. . 8)-th from the top of the 8×8 DCT coefficients of each block. The DCT coefficient F (i−1, j−1) represents the degree (rate) at which the frequency component of a pattern which is i-th from the left and j-th from the top of the base image is included in the base image.

The numerals appearing in the base image of the left side of FIG. 13 each indicate a weight G (i−1, j−1) calculated by the weighting factor calculation section 1062 of FIG. 12. The weight G (i−1, j−1) is a weight to be added to the DCT coefficient F (i−1, j−1). The weighting factor calculation section 1062 calculates the weight G (i−1, j−1) according to the following expression:

$$G(i-1, j-1) = i \times j$$

Accordingly, in the weighting factor calculation section 1062, as the frequency component of the DCT coefficient F (i−1, j−1) becomes higher, the weight G (i−1, j−1) to be added to the DCT coefficient F (i−1, j−1) becomes larger.

The accumulation section 1063 (FIG. 12) multiplies the DCT coefficient F (i−1, j−1) of the block supplied from the DCT transform section 1061 by the weight G (i−1, j−1) supplied from the weighting factor calculation section 1062 to obtain a multiplication value G (i−1, j−1)×F (i−1, j−1). Then, the accumulation section 1063 accumulates the multiplication value G (i−1, j−1)×F (i−1, j−1) obtained for respective 8×8 DCT coefficients F (i−1, j−1) in the block to obtain an accumulation value V=ΣG (i−1, j−1)×F (i−1, j−1). The summation Σ in V=ΣG (i−1, j−1)×F (i−1, j−1) represents a summation with respect to i from i=1 to i=8 and j from j=1 to j=8.

Further, the accumulation section 1063 calculates a total sum K of the accumulation values V obtained for all the blocks in the target frames and outputs the total sum K to the vertical line/horizontal line level calculation section 75 as the density information of the target frame.

The higher the frequency component included in the target frame becomes, the larger the value of the density information which is the total sum K of the accumulation values V, and the denser (more complex) the still image of the target frame.

The vertical line/horizontal line level calculation section 75 of the DCT vertical/horizontal frequency component detection section 73 detects that an image of the target frame includes fine vertical lines, that is, the image has a high frequency component in the horizontal direction based on the DCT coefficient in an area AR1 of the target frame or that the image of the target frame includes fine horizontal lines, that is, the image has a high frequency component in the vertical direction based on the DCT coefficient in an area AR2 of the target frame.

Thus, the DCT vertical/horizontal frequency component detection section 73 can determine the density (complexity) level of the image of the target frame using the frequency analysis section 74 and determines the levels of the horizontal frequency and vertical frequency using the vertical line/horizontal line level calculation section 75. The obtained information is then output to the metadata file generation section 86 as a DCT vertical/horizontal frequency component information FVH.

(2-4-4) Configuration of Color Component Detection Section

The color component detection section 76 includes a pixel RGB level detection section 77, an RGB level statistic/dispersion detection section 78, and an HLS level statistic/dispersion detection section 79. The supplied video data is input to the pixel RGB level detection section 77.

The pixel RGB level detection section 77 detects the RGB levels of each pixel in the target frame of the video data and sends the detected RGB levels to the RGB level statistic/dispersion detection section 78 and HLS level statistic/dispersion detection section 79.

The RGB level statistic/dispersion detection section 78 calculates the statistic and dispersion of the RGB levels of each pixel in the target frame supplied from the pixel RGB level detection section 77 and outputs the statistic representing the levels of the respective color components of RGB in the target frame and dispersion value representing whether the color components in the target frame are added globally or locally to the metadata file generation section 86 as color component information CL1.

Figure 14:
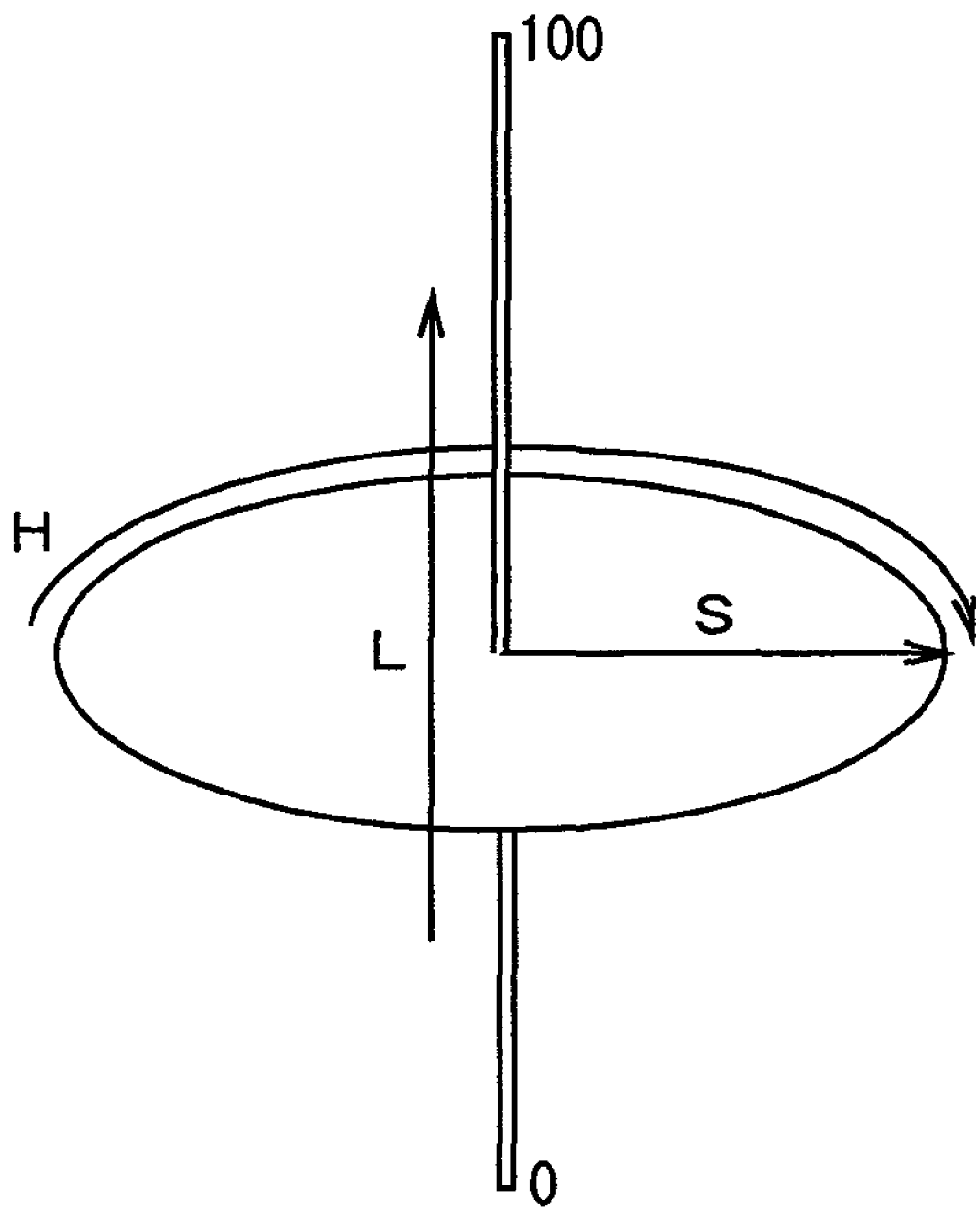
FIG. 14 is a schematic view used to explain an HLS space.

The HLS level statistic/dispersion detection section 79 converts the RGB levels of each pixel in the target frame supplied from the pixel RGB level detection section 77 into three components of "Hue", "Saturation", and "Luminance/Lightness", calculates the statistic and dispersion value of each of the above elements in an HLS space composed of the hue, saturation, and luminance, as shown in FIG. 14, and outputs the detection result to the metadata file generation section 86 as HLS information CL2.

The hue in the HLS space is represented by an angle from 0° to 359°, in which 0° is red and 180° is blue green opposed to red. That is, in the HLS space, it is easy to find an opposing color.

The saturation in the HLS space is the mixing rate of chromatic color. The HLS space, unlike an HSV (Hue, Saturation, and Value) space, is based on the idea that a reduction of the saturation form pure color means that the color has more grey. That is, the lower saturation means the color is near gray, and higher saturation means that the color is away from gray.

The luminance in the HLS space, which differs from the case of the HSV space where luminance 100% is set as a pure color and how much the luminance level is lost from the 100% luminance state is represented, is an index in which luminance 0% is black, luminance 100% is white, and luminance 50% is pure white.

Therefore, the HLS level statistic/dispersion detection section 79 can output the HLS information CL2 which represents the hue in a far more understandable manner than the RGB space to the metadata file generation section 86.

(2-4-5) Configuration of Audio Detection Section

In the above description, the feature parameters are extracted from the video data. However, in the case where audio data is included in the AV data, the feature amount representing the feature of audio data can be calculated from audio data corresponding to the video data as the feature parameters. That is, the feature parameters are parameters that can be applied to both the video data and audio data.

The audio detection section 80 (FIG. 7) includes a frequency analysis section 81 and a level detection section 82. Video data supplied to the audio detection section 80 is input to the frequency analysis section 81.

The frequency analysis section 81 analyzes the frequency of audio data corresponding to the target frame of the video data and notifies the level detection section 82 of its frequency band. The level detection section 82 detects the level of audio data in the frequency band notified from the frequency analysis section 81 and outputs the detected level to the metadata file generation section 86 as audio level information AL.

(2-4-6) Configuration of Luminance/Color Difference Detection Section

The luminance/color difference detection section 83 (FIG. 7) includes a Y/Cb/Cr level detection section 84 and a Y/Cb/Cr level statistic/dispersion detection section 85. Video data supplied to the luminance/color difference detection section 83 is input to the Y/Cb/Cr level detection section 84.

The Y/Cb/Cr level detection section 84 detects the luminance level of a luminance signal Y and signal levels of a color difference signals Cb and Cr for each pixel in the target frame of the video data and supplies the detected levels to the Y/Cb/Cr level statistic/dispersion detection section 85.

The Y/Cb/Cr level statistic/dispersion detection section 85 calculates the statistic and dispersion value of the luminance level of the luminance signal Y and signal levels of the color difference signals Cb and Cr of each pixel in the target frame which is supplied from the Y/Cb/Cr level detection section 84 and outputs the statistic representing the levels of the luminance signal Y, color difference signals Cb and Cr and dispersion value of the luminance signal Y, color difference signals Cb and Cr in the target frame to the metadata file generation section 86 as color component information CL3.

(2-4-7) Configuration of Metadata File Generation Section

Based on the density information QS1 supplied from the density information calculation section 71, motion information D0 of the target frame supplied from the motion detection section 72, DCT vertical/horizontal frequency component information FVH supplied from the DCT vertical/horizontal frequency component detection section 73, color component information CL1 and HLS information CL2 supplied from the color component detection section 76, audio level information AL supplied from the audio detection section 80, and color component information CL3 supplied from the luminance/color difference detection section 83, the metadata file generation section 86 generates the feature parameters of the pictures constituting the video data and feature parameters of the audio data corresponding to the video data respectively as a metadata file MDF including metadata and outputs them.

In the metadata file MDF, as shown in FIG. 15, various feature parameters such as "time code", "motion amount", "density", "red", "blue", "green", "luminance", "red dispersion", "green dispersion", "hue", "saturation", "vertical line", "horizontal line", "motion dispersion", and "audio level" are registered for respective pictures (from the first to last frames) constituting the video data.

Although in this example, normalized relative values between 0 and 1 are used as the feature amount values in the respective feature parameters of the metadata file MDF, an absolute value may be used. Further, the contents of the metadata file MDF are not limited to the above mentioned feature parameters. For example, after the display window W57 has been arranged on the three-dimensional display space, the coordinate value on the three-dimensional display space on which the display window W57 has actually been arranged may be registered as the metadata.

In the image processing apparatus 2, when the coordinate value on the three-dimensional display space is registered in the metadata file MDF as described above, it is not necessary to additionally calculate the coordinate parameters in the three-dimensional display space based on the feature parameters in order to arrange the next display window W57 of the video data on the three-dimensional display space, whereby the display window W57 can be arranged on the three-dimensional display space in a moment.

(2-5) Display Processing Procedure

A display processing procedure for video data and display processing procedure for a plurality of video data which are performed by the microprocessor 3 of the image processing apparatus 2 will concretely be described using flowcharts.

Figure 16:
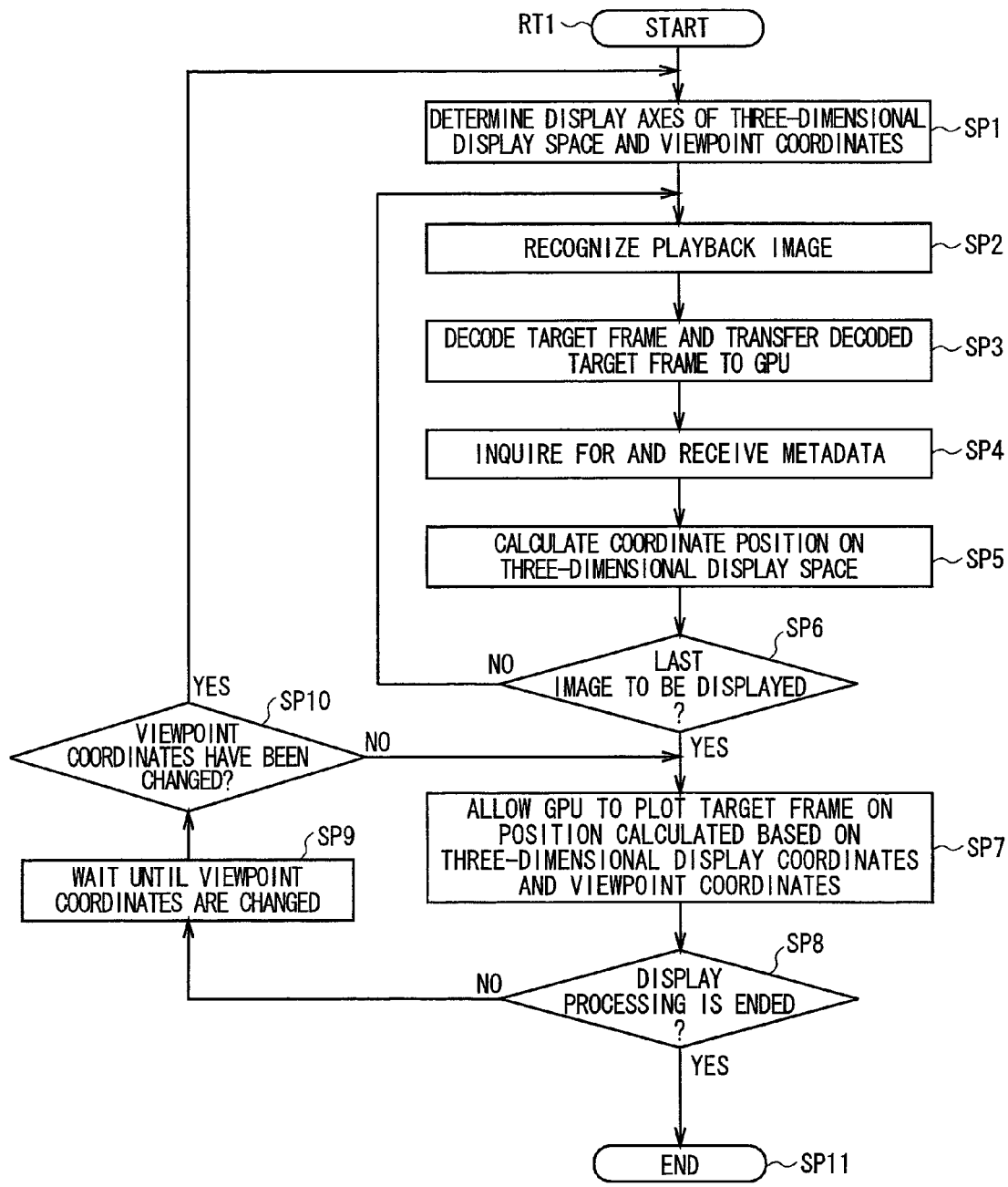
FIG. 16 is a flowchart showing a display processing procedure of a picture (still image) constituting video data.

(2-5-1) Classification Display Processing Procedure for Picture (Still Image) of Video Data As shown in FIG. 16, the microprocessor 3 of the image processing apparatus 2 executes an initialization step of routine RT1 and proceeds to the next step SP1 where it determines the display axes of the three-dimensional display space specified by a user and viewpoint coordinates for displaying the image group 58 to the user, followed by proceeding to step SP2.

Figure 17:
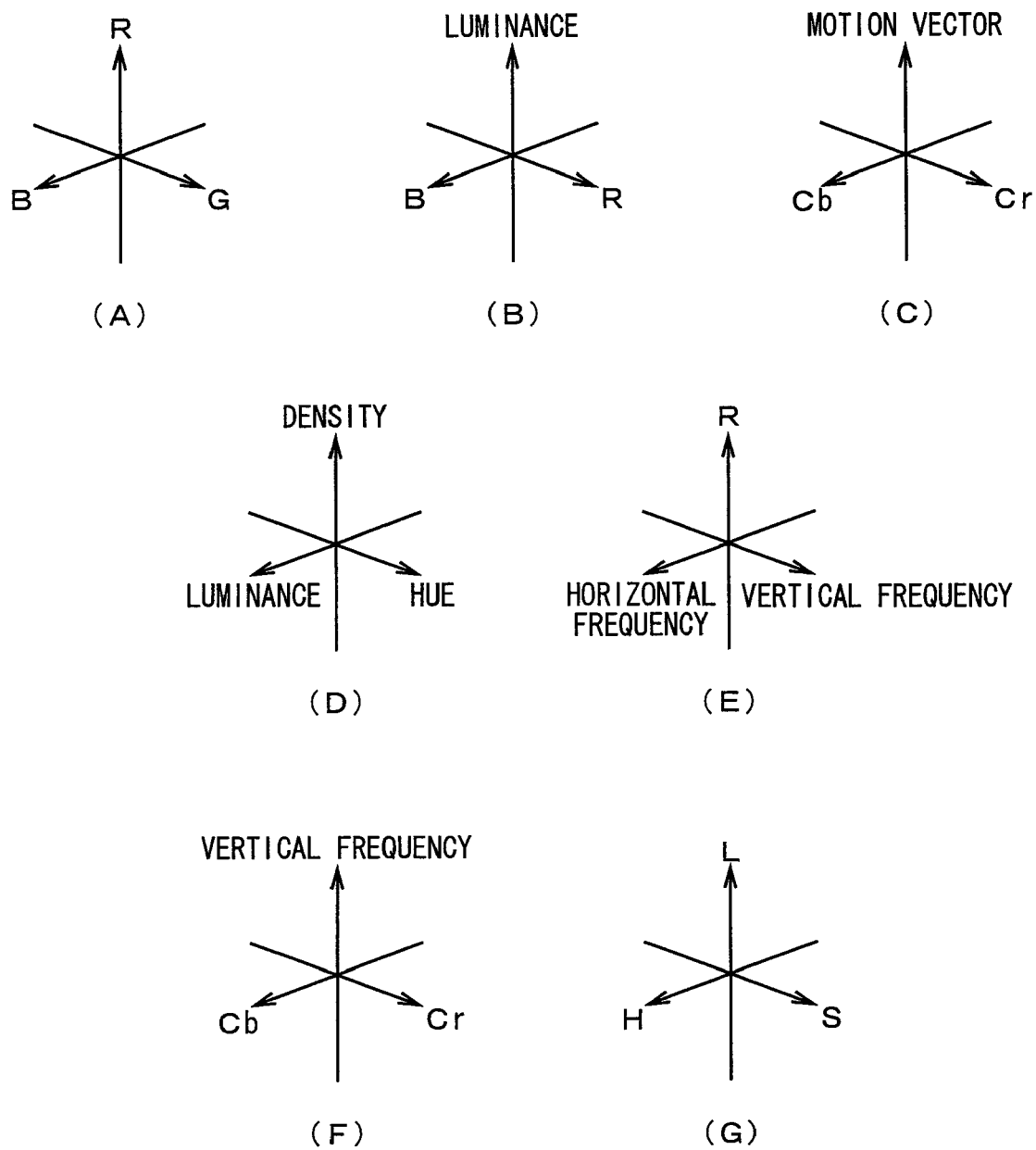
FIGS. 17 (A) to 17 (G) are schematic views each showing display axes in a three-dimensional display space.

In step SP1, the microprocessor 3 of the image processing apparatus 2 can determine the display axes so as to generate various types of three-dimensional display spaces such as: three-dimensional display space defined by R-axis, G-axis, and B-axis representing color components of RGB (FIG. 17 (A)); three-dimensional display space defined by luminance level axis, R-axis, and B-axis (FIG. 17 (B)); three-dimensional display space defined by motion vector axis, Cb-axis, and Cr-axis (FIG. 17 (C)); three-dimensional display space defined by density information axis, luminance level axis, and hue axis (FIG. 17 (D)); three-dimensional display space defined by R-axis, DCT vertical frequency axis, and DCT horizontal frequency axis (FIG. 17 (E)); three-dimensional display space defined by DCT vertical frequency axis, Cb-axis, and Cr-axis (FIG. 17 (F)); and three-dimensional display space defined by L (Luminance)-axis, H (Hue)-axis, and S (Saturation)-axis which are elements of the HLS space (FIG. 17 (G)). However, the display axes used for generating the three-dimensional display space are not limited to the above, but it is possible to use another combination of feature parameters registered in the metadata file as the display axes.

In step SP2, the microprocessor 3 of the image processing apparatus 2 recognizes a picture (still image) of the video data to be played back which is specified by the user and then proceeds to step SP3. In step SP3, the microprocessor 3 sets the still image as a target frame, decodes its sub-video stream LD1, transfers decoded sub-video data to the GPU 4, and proceeds to step SP4.

In step SP4, the microprocessor 3 of the image processing apparatus 2 inquires for the feature amounts of the feature parameters used as the display axes of the three-dimensional display space, receives them from the metadata file MDF associated with the still image, and proceeds to step SP5.

In step SP5, the microprocessor 3 of the image processing apparatus 2 calculates the coordinate position (coordinate parameters) on the three-dimensional display space on which the display window W57 of the still image is pasted based on the feature amounts of the feature parameters received in step SP4 and proceeds to step SP6. That is, the microprocessor 3 of the image processing apparatus 2 converts the feature amounts corresponding to the display axes that the still image has into the coordinate value on the three-dimensional display space.

In step SP6, the microprocessor 3 of the image processing apparatus 2 determines whether the current still image is the last image to be displayed or not. When an affirmative result is obtained, which means that the still image other than the current still image has not been specified by the user, that is, there is not any other display window W57 to be displayed, the microprocessor 3 proceeds to step SP7.

On the other hand, when a negative result is obtained in step SP6, which means that the picture (still image) of the video data other than the current still image has been specified by the user, that is, there is another display window W57 corresponding to the still image to be displayed, the microprocessor 3 of the image processing apparatus 2 returns to step SP2 where it repeats the abovementioned processing to thereby calculate the coordinate positions on the three-dimensional display space for a plurality of display windows W57 corresponding to a plurality of still images according to the feature amounts set in the feature parameters of the respective still images.

In step SP7, the microprocessor 3 of the image processing apparatus 2 allows the GPU 4 to paste the display window W57 corresponding to the still image on the three-dimensional display space based on the coordinate parameters (coordinate positions) calculated in step SP5, convert the coordinate parameters (coordinate positions) on the three-dimensional display space into a two-dimensional coordinate position (display position parameters) on the two-dimensional screen of the display area 55 based on the viewpoint coordinates determined in step SP1, determine the display size of each display window W57, and plot the display window W57 on the two-dimensional coordinate position for display. After that, the microprocessor 3 of the image processing apparatus 2 proceeds to step SP8.

At this time, in the case where still images (pictures) of plurality of vide data are specified by the user, the microprocessor 3 of the image processing apparatus 2 arranges a plurality of display windows W57 corresponding to the plurality of still images on the respective coordinate positions (positions represented by the coordinate parameters) according to the feature parameters of the still images as the image group 58 composed of the plurality of display windows W57.

In step S8, the microprocessor 3 of the image processing apparatus 2 determines whether to end display processing for the display window W57 based on whether there has been issued a termination instruction from the user or whether a predetermined time has elapsed. When an affirmative result is obtained, the microprocessor 3 proceeds to step SP11 where it ends the display processing.

On the other hand, when a negative result is obtained in step SP8, the microprocessor 3 of the image processing apparatus 2 proceeds to step SP9 without ending the display processing for the display window W57. In step SP9, the microprocessor 3 of the image processing apparatus 2 waits until the viewpoint coordinates of the display window W57 are changed by user's cursor operation and then proceeds to subsequent step SP10.

In step SP10, the microprocessor 3 of the image processing apparatus 2 determines whether the viewpoint coordinates of the display window W57 have actually been changed by the user. When a negative result is obtained, the microprocessor 3 returns to step SP7 where it continues displaying the display window W57 of the still image at the original coordinate position. On the other hand, when an affirmative result is obtained, the microprocessor 3 returns to step SP1, where it determines new viewpoint coordinates after change, repeats the processing of step SP2 and subsequent steps, and rearranges the display window W57 on the three-dimensional display space based on the new viewpoint coordinates.

When rearranging the display window W57 on the three-dimensional display space based on the new viewpoint coordinates, the microprocessor 3 of the image processing apparatus 2 arranges the display window W57 such that the display window W57 is always positioned right in front of the user irrespective of the change of the viewpoint, allowing the user to always visually confirm the display window W57 from the front.

As described above, the microprocessor 3 of the image processing apparatus 2 can arrange the display window W57 of the still image on the coordinate position on the three-dimensional display space according to the feature parameter that the still image of the video data has. Thus, in the case where pictures (still images) of a plurality of video data are specified, the microprocessor 3 can present the plurality of still images as the image group 58 (FIG. 3) composed of the display windows W57 of the still images corresponding to the plurality of video data, thereby allowing the user to intuitively grasp the overall trend of the plurality of video data as an image through the image group 58.

Figure 18:
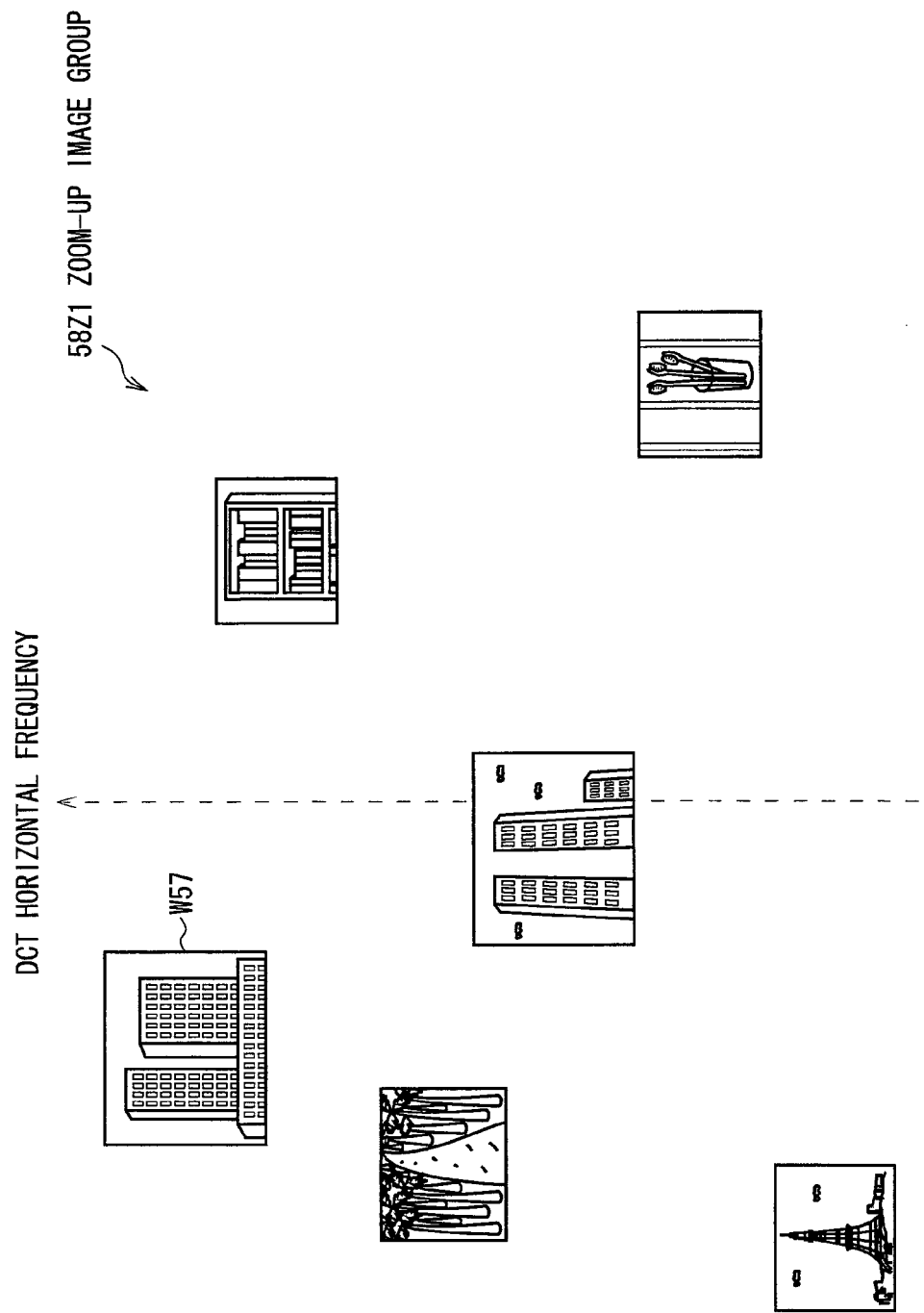
FIG. 18 is a schematic view showing a zoom-up display example of an image group situated near a DCT horizontal frequency axis.

In a state where the display window W57 corresponding to the picture (still image) of the video data is arranged on the three-dimensional display space defined by, e.g., DCT horizontal frequency axis, R-axis, and G-axis, when the viewpoint coordinates are moved to a position biased to the DCT horizontal frequency axis where the horizontal frequency is high by the user's zoom-up operation, the microprocessor 3 of the image processing apparatus 2 can present a zoom-up image group 58Z1 in which a large number of display windows W57 of the still images having fine vertical lines are arranged near the DCT horizontal frequency axis as shown in FIG. 18.

Figure 19:
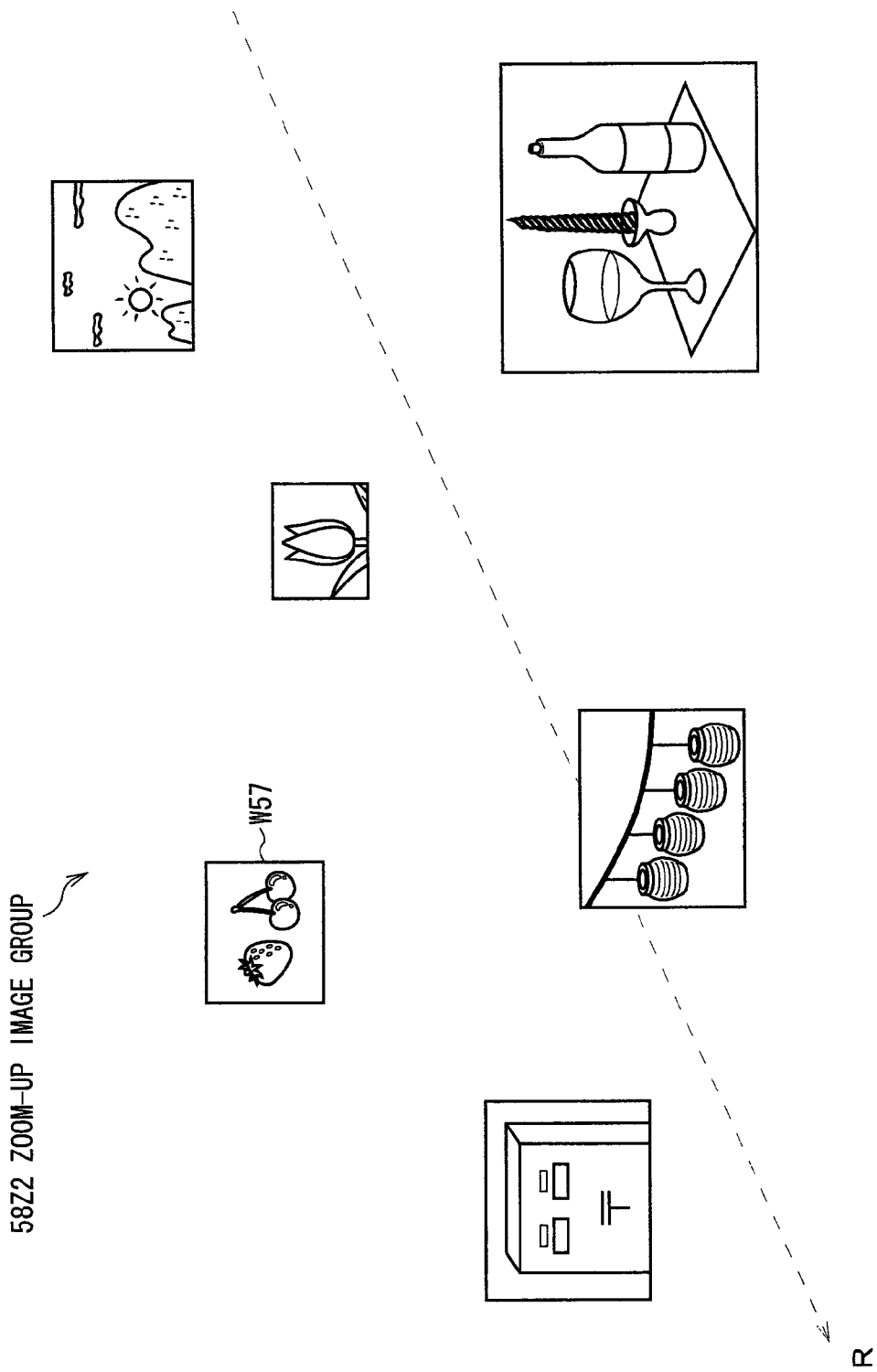
FIG. 19 is a schematic view showing a zoom-up display example of an image group situated near an R-axis.

Further, in a state where the display window W57 corresponding to the still image of the video data is arranged on the three-dimensional display space defined by, e.g., DCT horizontal frequency axis, R-axis, and G-axis, when the viewpoint coordinates are moved to a position biased to the R-axis where the R-value is large by the user's zoom-up operation, the microprocessor 3 of the image processing apparatus 2 can present a zoom-up image group 58Z2 in which a large number of display windows W57 of the still images having a strong red component are arranged near the R-axis as shown in FIG. 19.

Figure 20:
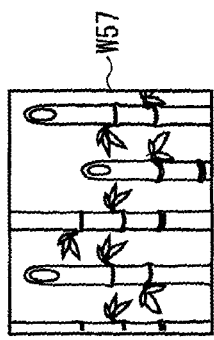
FIG. 20 is a schematic view showing a zoom-up display example of an image group situated near a G-axis.
Figure 20:
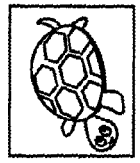
Figure 20:
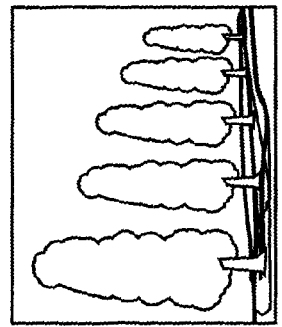
Figure 20:
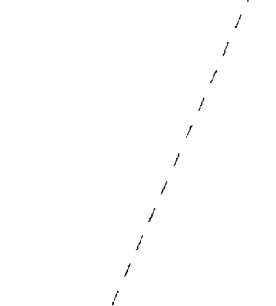
Figure 20:
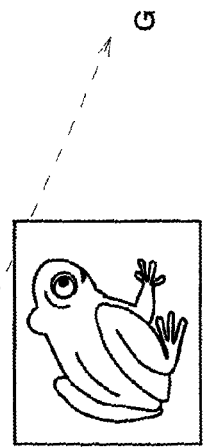
Figure 20:
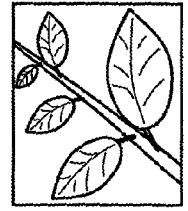

Further, in a state where the display window W57 corresponding to the still image of the video data is arranged on the three-dimensional display space defined by, e.g., DCT horizontal frequency axis, R-axis, and G-axis, when the viewpoint coordinates are moved to a position biased to the G-axis where the G-value is large by the user's zoom-up operation, the microprocessor 3 of the image processing apparatus 2 can present a zoom-up image group 58Z3 in which a large number of display windows W57 of the still images having a strong green component are arranged near the G-axis as shown in FIG. 20.

(2-5-2) Classification Display Processing Procedure for Video Data (Moving Picture)

Subsequently, a display processing procedure for video data (moving picture) will be described. The display processing procedure for video data (moving picture) is basically the same as the abovementioned display processing routine RT1 for a picture (still image) of video data. That is, the same processing as the display processing routine RT1 for a still image is executed every time a picture (still image) constituting the video data is updated according to a predetermined frame frequency.

Figure 21:
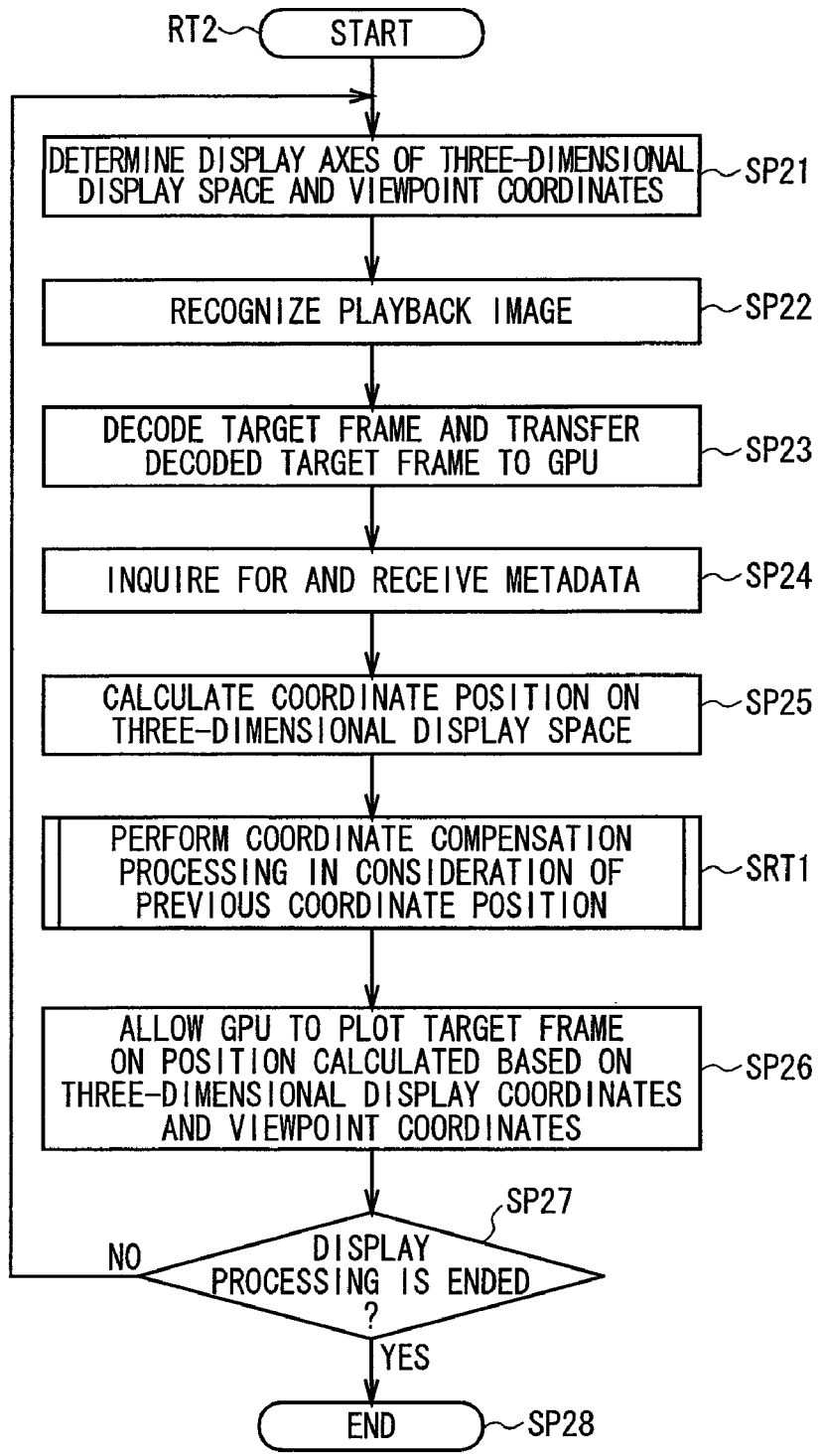
FIG. 21 is a flowchart showing a display processing procedure of video data.

Concretely, as shown in FIG. 21, the microprocessor 3 of the image processing apparatus 2 executes an initialization step of routine RT2 and proceeds to the next step SP21 where it determines the display axes of the three-dimensional display space specified by a user and viewpoint coordinates for displaying the image group 58 to the user, followed by proceeding to step SP22.

In step SP22, the microprocessor 3 of the image processing apparatus 2 recognizes a still image of the video data to be played back which is specified by the user and then proceeds to step SP23. In step SP23, the microprocessor 3 of the image processing apparatus 2 sets the still image as a target frame, decodes its sub-video stream LD1, transfers decoded sub-video data to the GPU 4, and proceeds to step SP24.

In step SP24, the microprocessor 3 of the image processing apparatus 2 inquires for the feature amounts of the feature parameters used as the display axes of the three-dimensional display space, receives them from the metadata file MDF associated with the still image, and proceeds to step SP5.

In step SP25, the microprocessor 3 of the image processing apparatus 2 calculates the coordinate parameters (coordinate positions) on the three-dimensional display space on which the display windows W57 corresponding to the still images constituting the video data are pasted based on the feature amounts of the feature parameters received in step SP24 and proceeds to the next sub-routine SRT1. That is, the microprocessor 3 of the image processing apparatus 2 converts the feature amounts of the feature parameters into the coordinate parameters (coordinate positions) of the three-dimensional display space having the display axes to which the feature parameters that the respective pictures (still images) constituting the video data have are set.

In sub-routine SRT1, the microprocessor 3 of the image processing apparatus 2 performs coordinate compensation processing based on a mutual positional relationship between the coordinate parameters (coordinate positions) on the three-dimensional display space of a previously-displayed still image and coordinate parameters (coordinate positions) on the three-dimensional display space of a still image to be displayed after update to calculate compensated coordinates and proceeds to step SP26. This coordinate compensation processing procedure in the sub-routine SRT1 will be described later.

In step SP26, the microprocessor 3 of the image processing apparatus 2 allows the GPU 4 to paste the display windows W57 corresponding to the still images constituting the video data on the three-dimensional display space based on the coordinate position on the three-dimensional display space calculated in step SP25 or compensated coordinate obtained in the sub-routine SRT1, convert the coordinate position on the three-dimensional display space into a two-dimensional coordinate position (display position parameters) on the two-dimensional screen of the display area 55 based on the viewpoint coordinates determined in step SP21, determine the display size of each display window W57, and plot the display window W57 on the two-dimensional coordinate position in the update order of the still image for display. After that, the microprocessor 3 of the image processing apparatus 2 proceeds to step SP27.

In step SP27, the microprocessor 3 of the image processing apparatus 2 determines whether to end display processing for the display window W57 corresponding to the still image of the video data based on whether there has been issued a termination instruction from the user or whether a predetermined time has elapsed. When an affirmative result is obtained, the microprocessor 3 proceeds to step SP28 where it ends the display processing for the display window W57.

On the other hand, a negative result is obtained in step SP27, the microprocessor 3 of the image processing apparatus 2 does not end the display processing for the display window W57 but returns to step SP21 where it executes the display processing for the display window W57 corresponding to the video data to be specified next.

As described above, the microprocessor 3 of the image processing apparatus 2 arranges the display window W57 of a still image on the coordinate position on the three-dimensional display space on which the feature parameters that the still image constituting the video data has are set to the display axes and changes the coordinate position (coordinate parameters) on the three-dimensional display space for rearrangement in accordance with a change of the feature amounts of the feature parameters of the still image occurring every time the still image of the display window W57 arranged on the three-dimensional display space is updated according to a predetermined frame frequency to thereby give the user an impression as if the display window W57 moved in a floating manner on the three-dimensional display space every time the still image of the display window W57 is updated. This allows the user to intuitively and instantly recognize the time-series feature (trend) of the video data as a motion image of the display window W57 changing along with the progress of the playback image.

(2-5-3) Simultaneous Display Processing Procedure for Plurality of Video Data (Moving Pictures)

Subsequently, a display processing procedure for a plurality of video data will be described. The display processing procedure for a plurality of video data is basically the same as the abovementioned display processing routine RT2 for one video data. That is, the microprocessor 3 of the image processing apparatus 2 performs display processing for each video data in a simultaneous and parallel manner so as to display the display windows W57 in a moving manner in accordance with a change of the feature parameters of the still images occurring every time the respective still images are updated while changing the positions on the three-dimensional display space.

Figure 22:
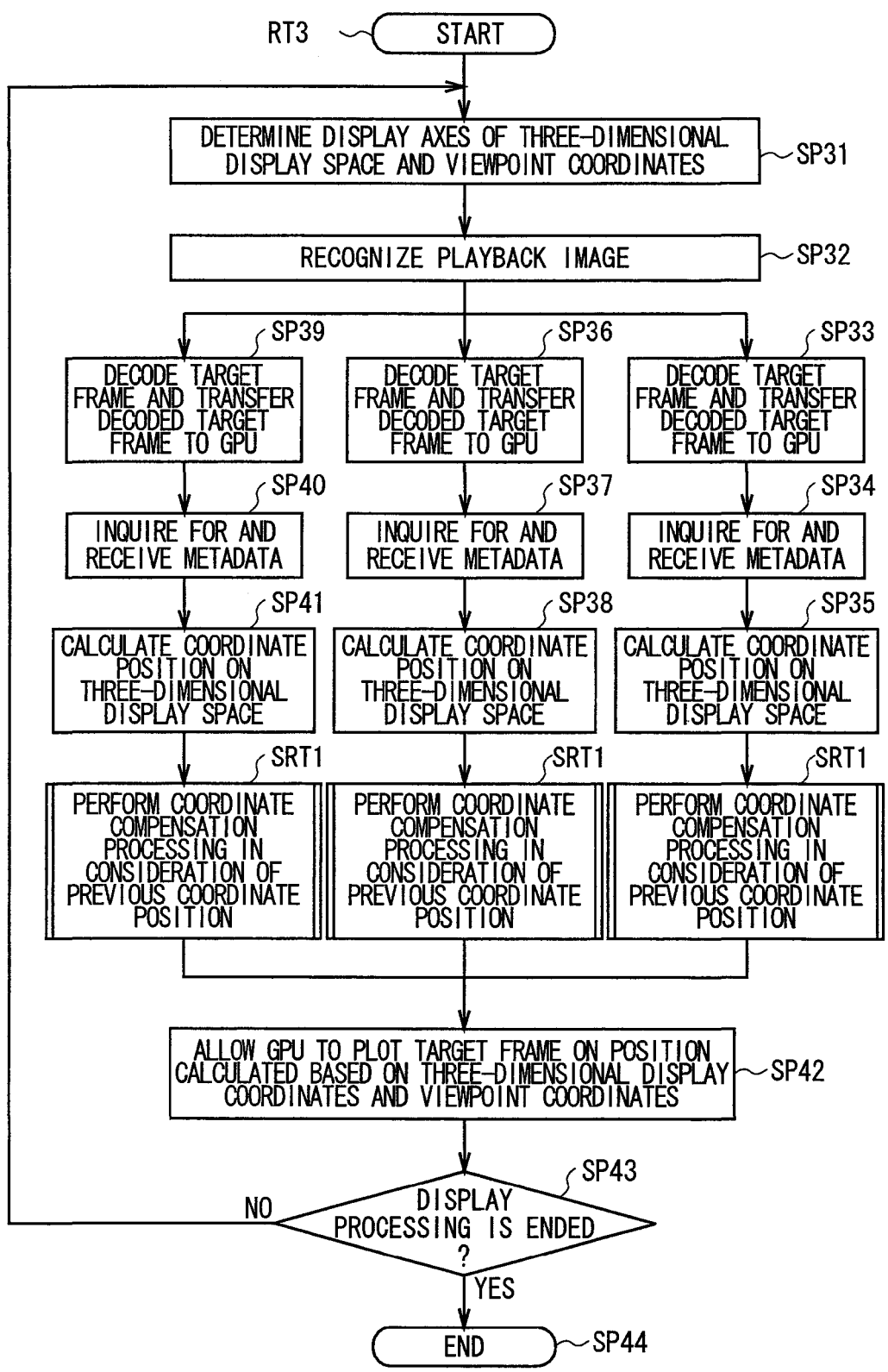
FIG. 22 is a flowchart showing a display processing procedure of a plurality of video data.

Concretely, as shown in FIG. 22, the microprocessor 3 of the image processing apparatus 2 executes an initialization step of routine RT3 and proceeds to the next step SP31 where it determines the display axes of the three-dimensional display space specified by a user and viewpoint coordinates for displaying the image group 58 to the user, followed by proceeding to step SP32.

In step SP32, the microprocessor 3 of the image processing apparatus 2 recognizes respective still images of a plurality of video data to be played back which are specified by the user and then proceeds to steps SP33, SP36, and SP39.

In steps SP33, SP36, and SP39, the microprocessor 3 of the image processing apparatus 2 sets the still images as target frames, decodes their sub-video streams LD1, transfers decoded sub-video data respectively to the GPU 4, and proceeds to steps SP34, SP37, and SP40.

In steps SP34, SP37, and SP40, the microprocessor 3 of the image processing apparatus 2 inquires for the feature amounts of the feature parameters used as the display axes of the three-dimensional display space, receives them from the metadata files MDF associated with the respective still images, and proceeds to subsequent steps SP35, SP38, and SP41.

In steps SP35, SP38, and SP41, the microprocessor 3 of the image processing apparatus 2 calculates the coordinate parameters (coordinate positions) on the three-dimensional display space on which the display windows W57 corresponding to the still images constituting the respective video data are pasted based on the feature amounts of the feature parameters received in steps SP34, SP37, and SP40 and proceeds to the next sub-routine SRT1. That is, the microprocessor 3 of the image processing apparatus 2 converts the feature amounts of the feature parameters into the coordinate parameters (coordinate positions) of the three-dimensional display space having the display axes to which the feature parameters that the respective still images constituting a plurality of video data have are set.

In the sub-routine SRT1 the microprocessor 3 of the image processing apparatus 2 performs coordinate compensation processing based on a mutual positional relationship between the coordinate parameters (coordinate positions) on the three-dimensional display space of a previously-displayed still image and coordinate parameters (coordinate positions) on the three-dimensional display space of a still image to be displayed after update to calculate compensated coordinates and proceeds to step SP42.

In step SP42, the microprocessor 3 of the image processing apparatus 2 allows the GPU 4 to paste the display windows W57 corresponding to the still images constituting the video data on the three-dimensional display space based on the coordinate positions respectively on the three-dimensional display space calculated in steps SP35, SP38, and SP41, convert the coordinate positions on the three-dimensional display space respectively into two-dimensional coordinate positions (display position parameters) on the two-dimensional screen of the display area 55 based on the viewpoint coordinates determined in step SP31, determine the display sizes of respective display windows W57, and plot the display windows W57 on the two-dimensional coordinate positions to thereby display the image group 58. After that, the microprocessor 3 of the image processing apparatus 2 proceeds to subsequent step SP43.

In step SP43, the microprocessor 3 of the image processing apparatus 2 determines whether to end display processing for the image group 58 based on whether there has been issued a termination instruction from the user or whether a predetermined time has elapsed. When an affirmative result is obtained, the microprocessor 3 proceeds to step SP44 where it ends the display processing for the image group 58 composed of a plurality of display windows W57 corresponding to a plurality of video data.

On the other hand, a negative result is obtained in step SP44, the microprocessor 3 of the image processing apparatus 2 does not end the display processing for the image group 58 but returns to step SP31 where it executes the display processing for the display window W57 corresponding to the video data to be specified next.

As described above, the microprocessor 3 of the image processing apparatus 2 arranges a plurality of display windows W57 corresponding to a plurality of still images on the coordinate parameters (coordinate positions) on the three-dimensional display space according to the feature amounts of the feature parameters of display axes that the respective still images in a plurality of video data have and changes the coordinate parameters (coordinate positions) on the three-dimensional display space, respectively, for rearrangement in accordance with a change of the feature amounts of the feature parameters of the still images occurring every time the still images of the display windows W57 arranged on the three-dimensional display space are updated according to a predetermined frame frequency to thereby give the user an impression as if the display windows W57 moved in a floating manner on the three-dimensional display space every time the still images of the display windows W57 are updated. This allows the user to intuitively and instantly recognize the time-series feature (trend) of a plurality of video data as motion images of the display windows W57 changing along with the progress of the playback images.

That is, in the case where the features of the still images constituting a plurality of different video data are very similar to one another, the display windows W57 corresponding to the respective video data move in the same floating manner and in the same direction. On the other hand, in the case where the features of the still images constituting a plurality of different video data are different from one another, the display windows W57 corresponding to the respective video data float in a different floating manner and in the different directions.

Thus, when the video data that the user wants to focus on is selected by the user, the user easily focuses attention only on the display window W57 corresponding to the selected video data and, therefore, the user can easily grasp the feature (trend) of the video data through an impactful image representing a change of the motion of the display window W57.

Figure 23:
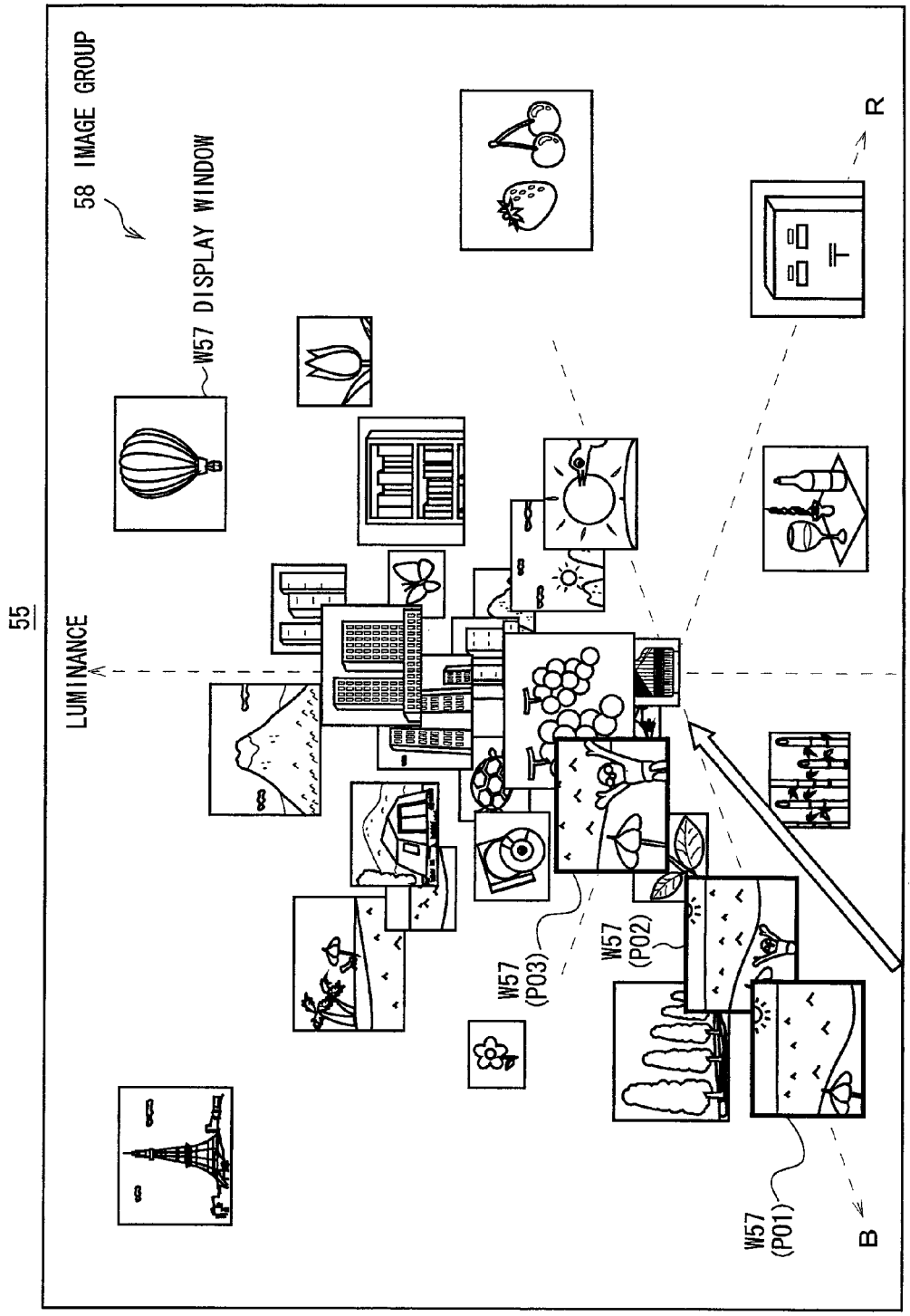
FIG. 23 is a schematic view used to explain the motion of a display window.

Concretely, as shown in FIG. 23, in the case where the first still image of the display window W57 corresponding to given video data includes a strong blue component corresponding to B-axis, the microprocessor 3 of the image processing apparatus 2 arranges the display window W57 at a position PO1 of the lower left corner of the screen in accordance with the feature amount represented by the feature parameter corresponding to B-axis that the still image has.

After update of the still image of the video data, the microprocessor 3 of the image processing apparatus 2 rearranges the display window W57 of the updated still image at a position PO2 from the position PO1 in accordance with the feature amount of the blue component in this updated still image.

After further update of the still image of the video data, the microprocessor 3 of the image processing apparatus 2 rearranges the display window W57 of the updated still image at a position PO3 from the position PO2 in accordance with the feature amount of the blue component in this updated still image.

As described above, the microprocessor 3 of the image processing apparatus 2 rearranges the display window W57 while changing the coordinate position on the three-dimensional display space in accordance with the feature amounts of the feature parameters of the respective still images every time the still image of the video data is updated. This allows the user to visually confirm a state where as if the display window W57 corresponding to the video data moved on the screen of the display area 55 in a floating manner.

(2-5-4) Coordinate Compensation Processing Procedure

Next, a coordinate compensation processing procedure of the sub-routine SRT1 (FIG. 21) in the routine RT2 and coordinate compensation processing procedure of the sub-routine SRT1 (FIG. 22) in the routine RT3 will be described below. The both procedures are the same as each other.

Figure 24:
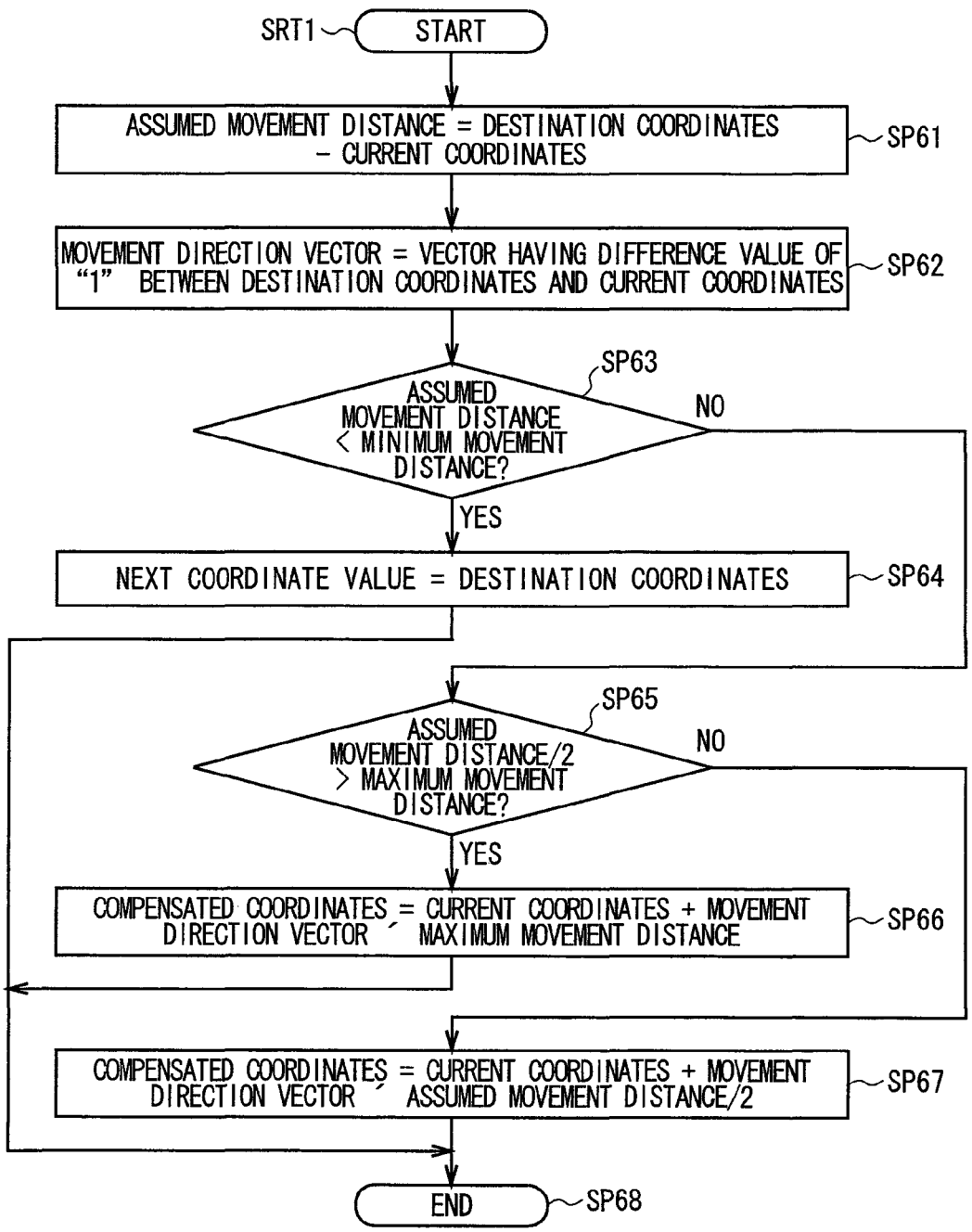
FIG. 24 is a flowchart showing a coordinate compensation processing procedure.
Figure 25:
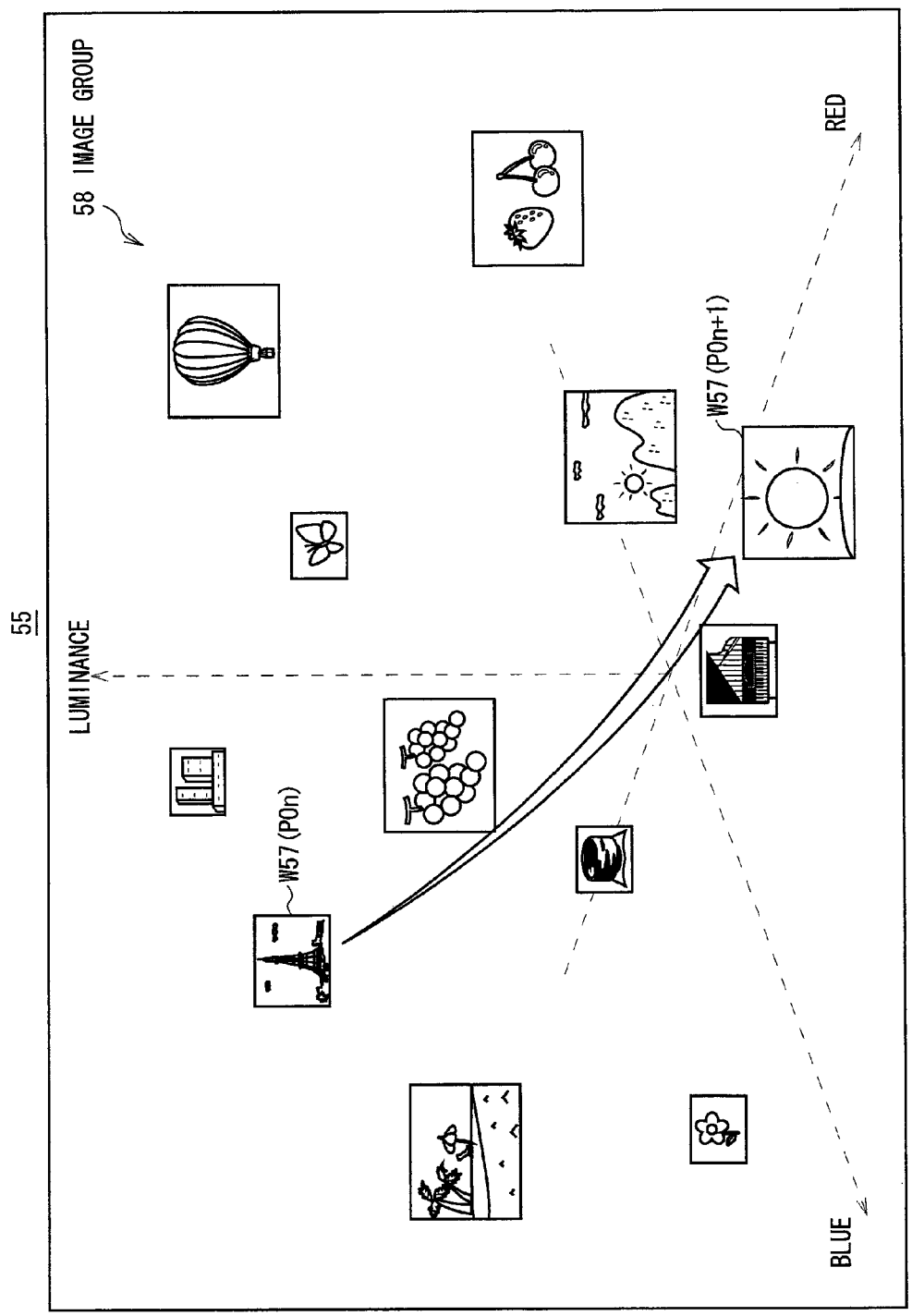
FIG. 25 is a schematic view showing a scene change.

In the coordinate compensation processing routine SRT1 shown in FIG. 24, when the still image of the display window W57 is updated to cause this display window W57 to sequentially move in accordance with the feature amounts of the still image thereof, the microprocessor 3 of the image processing apparatus 2 does not allow the display window W57 to jump to a destination in a single action at the time of scene change as shown in FIG. 25 but allows the display window W57 to gradually move to a destination while adjusting the movement speed of the display window W57 (allows the display window W57 to move in a stepwise manner). That is, the microprocessor 3 of the image processing apparatus 2 performs compensation calculation to obtain compensated coordinates in addition to the coordinates of the original destination to thereby allow the display window W57 to once move to the position represented by the compensated coordinates, thus allowing the user to follow the motion of the display window W57.

Concretely, the microprocessor 3 of the image processing apparatus 2 executes an initialization step of sub-routine RT1 and proceeds to the next step SP61. In step SP61, at the time of update of the still image of the video data, the microprocessor 3 of the image processing apparatus 2 calculates a difference between the current coordinates (position POn) on the three-dimensional display space of the display window W57 corresponding to the current still image and destination coordinates (position POn+1) on the three-dimensional display space of the display window W57 corresponding to the next still image to obtain an assumed movement distance (Euclidean distance) and proceeds to step SP62.

In step SP62, the microprocessor 3 of the image processing apparatus 2 calculates the destination coordinates and current coordinates to obtain a vector having a difference value of "1" as a movement direction vector and proceeds to step SP63.

In step SP63, the microprocessor 3 of the image processing apparatus 2 determines whether the assumed movement distance obtained in step SP61 is smaller than a previously set predetermined minimum movement value. When an affirmative result is obtained, which means that the assumed movement distance is smaller than the minimum movement value, that is, the distance between the position POn of the display window W57 corresponding to the current still image and position POn+1 of the display window W57 corresponding to the next still image is small enough to allow the user to follow the motion of the display window W57, then the microprocessor 3 of the image processing apparatus 2 proceeds to subsequent step SP64.

In step SP64, the microprocessor 3 of the image processing apparatus 2 recognizes that the destination coordinates on which the display window W57 is to be located is a coordinate value itself determined in accordance with the feature amounts of the next still image, arranges the display window W57 on the position corresponding to the coordinate value, and proceeds to step SP68, where the microprocessor 3 of the image processing apparatus 2 ends this processing flow.

On the other hand, when a negative result is obtained in step SP63, which means that the assumed movement distance is larger than the minimum movement value, that is, the distance between the position POn of the display window W57 corresponding to the current still image and position POn+1 of the display window W57 corresponding to the next still image is so large that it is difficult for the user to follow the motion of the display window W57, the microprocessor 3 of the image processing apparatus 2 proceeds to step SP65.

In step S65, the microprocessor 3 of the image processing apparatus 2 determines whether the ½ of the assumed movement distance (hereinafter, referred to as "assumed movement distance/2") obtained in step SP61 is larger than a previously set predetermined maximum movement distance. When an affirmative result is obtained, which means that the assumed movement distance/2 is larger than the maximum movement distance, that is, the distance between the position POn of the display window W57 corresponding to the current still image and compensated coordinate position corresponding to the assumed movement distance/2 is still large and therefore it is difficult for the user to follow the motion of the display window W57, then the microprocessor 3 of the image processing apparatus 2 proceeds to subsequent step SP66.

In step SP66, the microprocessor 3 of the image processing apparatus 2 calculates compensated coordinates (=current coordinates+movement direction vector×maximum movement value), sets the calculated compensated coordinates as the destination coordinates of the display window W57, and proceeds to step SP 68, where the microprocessor 3 of the image processing apparatus 2 ends this processing flow.

On the other hand, when a negative result is obtained in step SP65, which means that the assumed movement distance/2 is smaller than the maximum movement distance, that is, the distance between the position POn of the display window W57 corresponding to the current still image and compensated coordinate position corresponding to the assumed movement distance/2 is small enough to allow the user to easily follow the motion of the display window W57, the microprocessor 3 of the image processing apparatus 2 then proceeds to step SP67.

In step SP67, the microprocessor 3 of the image processing apparatus 2 calculates compensated coordinates (=current coordinates+movement direction vector×assumed movement distance/2), sets the calculated compensated coordinates as the destination coordinates of the display window W57, and proceeds to step SP 68, where the microprocessor 3 of the image processing apparatus 2 ends this processing flow.

Figure 26:
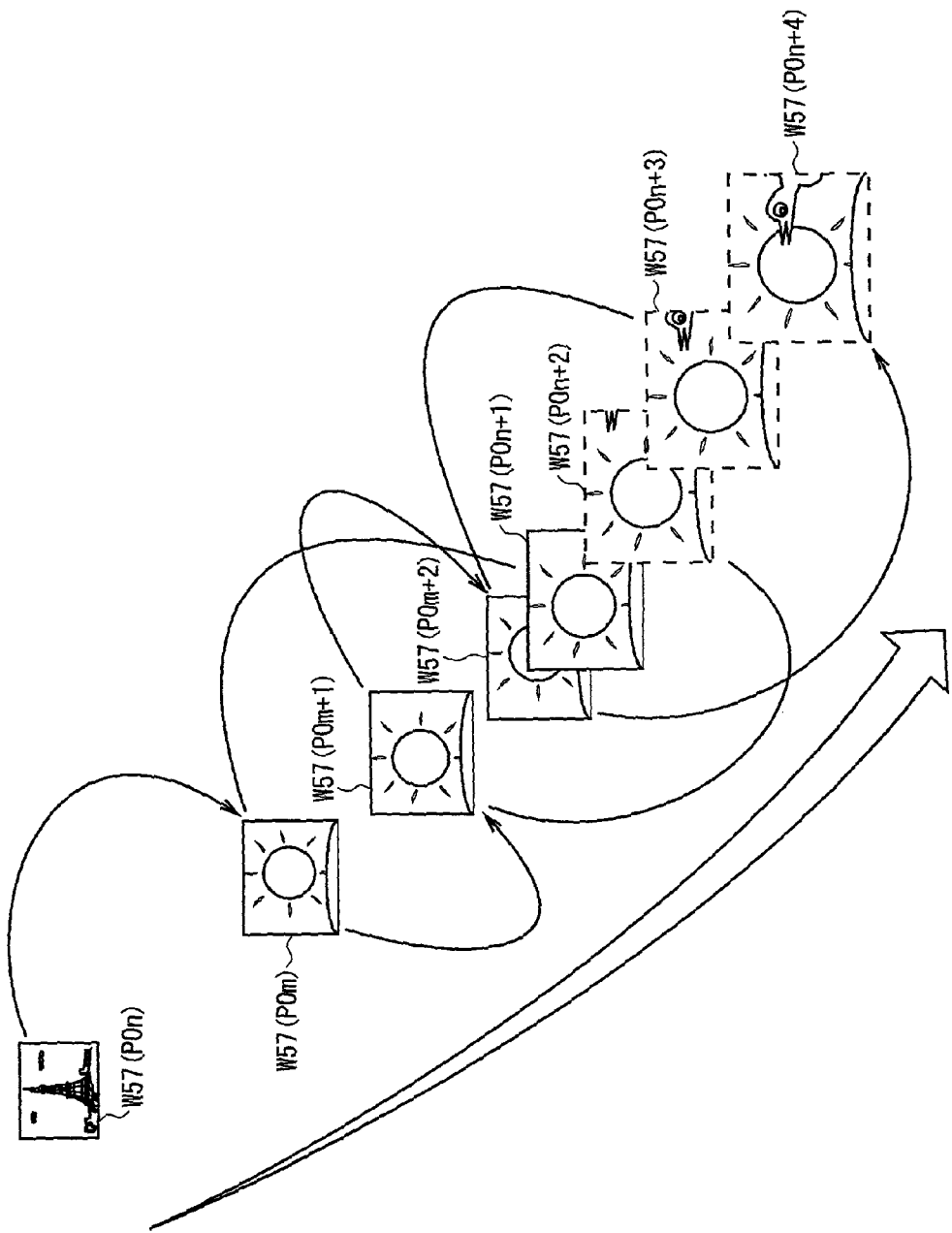
FIG. 26 is a schematic view used to explain the movement of a display window at the time of a scene change.

Assume that, as shown in FIG. 26, there occurs a scene change in which the display window W57 of given video data is instantly moved from the current coordinate position POn corresponding to the still image at that time to the position POn+1 corresponding to the next still image. In this case, in the case where the assumed movement distance between the position POn of the display window W57 and destination coordinate position POn+1 is larger than the minimum movement distance, the microprocessor 3 of the image processing apparatus 2 executes the above coordinate compensation processing routine SRT1 to calculate compensated coordinates so as to move the display window W57 by an amount corresponding to the assumed movement distance/2 or maximum movement distance (coordinate position corresponding to assumed movement distance/2 in this case) and temporarily arranges the display window W57 at a position POm corresponding to the calculated compensated coordinates for display.

At this time, the microprocessor 3 of the image processing apparatus 2 displays a still image after the scene change through the display window W57. Alternatively, however, a still image before the scene change may be displayed through the display window W57 until the position POn+1 after the scene change. Further, another method may be adopted in which a still image before the scene change is displayed through the display window W57 until the intermediate position between the position before and after the scene change and still image after the scene change is displayed through the display window W57 at the intermediate position and subsequent positions.

In the case where the assumed movement distance between the position POm of the display window W57 and a position POn+2 corresponding to a last updated still image is still larger than the minimum movement value, the microprocessor 3 of the image processing apparatus 2 calculates once again compensated coordinates so as to move the display window W57 by an amount corresponding to the assumed movement distance/2 or maximum movement distance and temporarily arranges the display window W57 at a position POm+1 corresponding to the calculated compensated coordinates for display.

Subsequently, in the case where the assumed movement distance between the position POm+1 of the display window W57 and a position POn+3 corresponding to a further updated still image is still larger than the minimum movement value, the microprocessor 3 of the image processing apparatus 2 calculates once again compensated coordinates so as to move the display window W57 by an amount corresponding to the assumed movement distance/2 or maximum movement distance and temporarily arranges the display window W57 at a position POm+2 corresponding to the calculated compensated coordinates for display.

Thereafter, at the time point when the assumed movement distance between the position POm+2 of the display window W57 and a position POn+4 corresponding to a further updated still image becomes smaller than the minimum movement value, the microprocessor 3 of the image processing apparatus 2 directly moves the display window W57 at a position POn+4 corresponding to the assumed movement distance for display.

That is, when the still image of the display window W57 corresponding to the video data is updated according to a predetermined frame frequency to rearrange this display window W57 in accordance with the feature amounts of the feature parameters of the still image of the display window W57 in units of a frame, even if there is a need to allow the display window W57 to significantly jump due to a scene change, the microprocessor 3 of the image processing apparatus 2 does not allow the display window W57 to jump to a destination in a single action but allows the display window W57 to gradually get close to a destination while shortening the movement distance of the window W57 in a stepwise manner, thus allowing the user to follow the motion of the display window W57 at the time of the scene change.

(3) Rearrangement Processing

In the image processing apparatus 2 of the present invention, it is possible to arbitrarily change the display axes defining the three-dimensional display space according to user's operation even after arrangement of the display window W57 of the video data on the determined display axes on the three-dimensional display space to thereby rearrange the display window W57. This rearrangement processing for the display window W57 will be described below.

When an instruction of changing the parameters of the display axes is issued through a user through the GUI 65 (FIGS. 4 to 6) after arrangement of the display window W57 of the video data on the three-dimensional display space, the microprocessor 3 of the image processing apparatus 2 regenerates a new three-dimensional display space based on new display axes.

Figure 27:
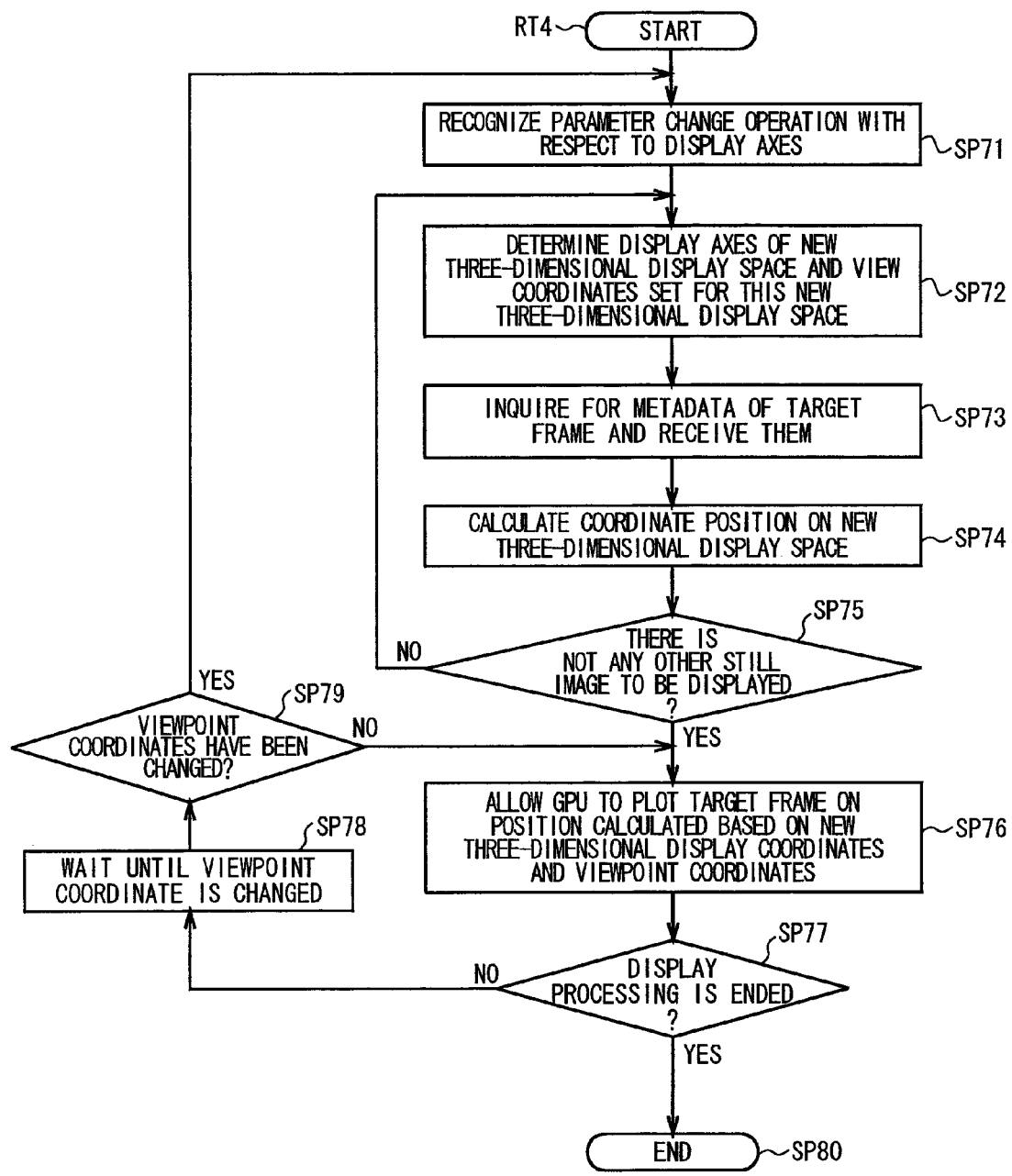
FIG. 27 is a flowchart showing a relocation processing procedure.

Concretely, the microprocessor 3 of the image processing apparatus 2 executes an initialization step of routine RT4 shown in FIG. 27 and proceeds to the next step SP71 where it recognizes the content of a user's feature parameter change operation with respect to the display axes to confirm the feature parameters corresponding to new display axes to be changed from the current display axes and proceeds to subsequent step SP72.

In step SP72, the microprocessor 3 of the image processing apparatus 2 determines the display axes of a new three-dimensional display space and viewpoint coordinates set at that time and proceeds to step SP73. If there is no change in the viewpoint coordinates, the microprocessor 3 uses the previously set viewpoint coordinate without modification.

In step SP72, the microprocessor 3 of the image processing apparatus 2 sets the still images of the video data being displayed through a plurality of display windows W57 constituting the image group 58 as target frames, inquires for the feature amounts of the feature parameters used as the display axes of a new three-dimensional display space, receives them from the metadata files MDF associated with the target frames, and proceeds to step SP74.

In step SP74, the microprocessor 3 of the image processing apparatus 2 calculates the coordinate parameters (coordinate positions) on the new three-dimensional display space on which the display windows W57 of the still images are pasted based on the feature amounts of the feature parameters received in step SP73 and proceeds to step SP75.

In step SP75, the microprocessor 3 of the image processing apparatus 2 determines there is not any other still image of the video data to be displayed through the display window W57.

When an affirmative result is obtained, which means that there is not any other display window W57 of the video data to be displayed, the microprocessor 3 proceeds to subsequent step SP76.

On the other hand, when a negative result is obtained in step SP75, which means that there is another display window W57 of the video data to be displayed, the microprocessor 3 of the image processing apparatus 2 returns to step SP72 where it repeats the abovementioned processing to thereby calculate the coordinate positions on the new three-dimensional display space for a plurality of display windows W57 corresponding to a plurality of video data according to the feature parameters of the respective still images.

In step SP76, the microprocessor 3 of the image processing apparatus 2 allows the GPU 4 to paste the display windows W57 corresponding to the still images on the new three-dimensional display space based on the coordinate position of the new three-dimensional display space calculated in step SP74, convert the coordinate parameters (coordinate positions) on the three-dimensional display space into two-dimensional coordinate positions (display position parameters) on the two-dimensional screen of the display area 55 based on the viewpoint coordinates determined in step SP72, determine the display sizes of a plurality of display windows W57, and plot the display windows W57 on the two-dimensional coordinate positions for display, whereby the image group 58 composed of a plurality of display windows W57 that have been rearranged on the new three-dimensional display space can be displayed. After that, the microprocessor 3 of the image processing apparatus 2 proceeds to step SP77.

In step S77, the microprocessor 3 of the image processing apparatus 2 determines whether to end display processing for the image group 58 based on whether there has been issued a termination instruction from the user or whether a predetermined time has elapsed. When an affirmative result is obtained, the microprocessor 3 proceeds to step SP80 where it ends the display processing of the image group 58.

On the other hand, when a negative result is obtained in step SP77, the microprocessor 3 of the image processing apparatus 2 proceeds to step SP78 without ending the display processing for the image group 58. In step SP78, the microprocessor 3 waits until the viewpoint coordinates of the display window W57 are changed by user's cursor operation and then proceeds to subsequent step SP79.

In step SP79, the microprocessor 3 determines whether the viewpoint coordinates of the display window W57 have actually been changed by the user. When a negative result is obtained, the microprocessor 3 returns to step SP76 where it continues displaying the image group 58 at the original coordinate position. On the other hand, when an affirmative result is obtained, the microprocessor 3 returns to step SP71, where it recognizes the content of a user's feature parameter change operation with respect to the display axes to confirm the feature parameters corresponding to new display axes to be changed from the current display axes and repeats the processing of step SP72 and subsequent steps.

Figure 28:
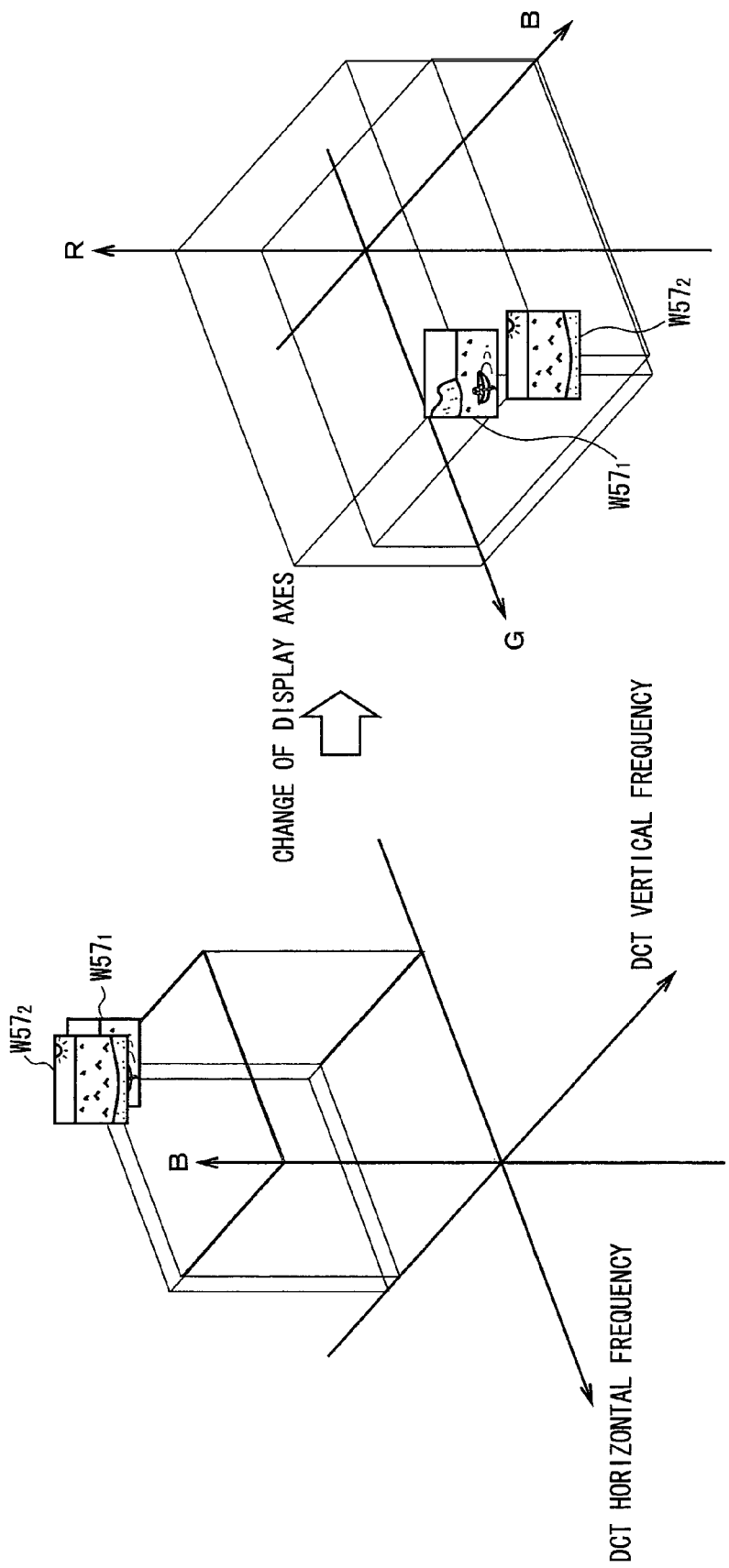
FIG. 28 is a schematic perspective view showing an image group before and after relocation.

For example, as shown in FIG. 28, assume that display windows W571 and W572 are arranged on the three-dimensional display space defined by B-axis, DCT vertical frequency axis, and DCT horizontal frequency axis. In this case, when the display axes defining the three-dimensional display space are changed to R-axis, B-axis, and G-axis, the microprocessor 3 of the image processing apparatus 2 rearranges the display windows W571 and W572 according to the feature amounts of the feature parameters of the still images of video data corresponding to the newly set display axes.

Therefore, the microprocessor 3 of the image processing apparatus 2 arbitrarily changes the display axes defining the three-dimensional display space to suit the needs or preferences of the user to rearrange the display window W57, thereby allowing the user to intuitively grasp the overall feature (trend) of the video data through the rearrangement result.

Thus, for example, the display windows W571 and W572 on the three-dimensional display space defined by the B-axis, DCT vertical frequency axis, and DCT horizontal frequency axis shown in the left side of FIG. 24 gives the user an impression that the still images (sea) of the windows W571 and W572 have similar feature amounts of blue color component, while the display windows W571 and W572 on a new three-dimensional display space defined by the R-axis, B-axis, and G-axis shown in the right side of FIG. 24 gives the user an impression that the still images (sea) of the windows W571 and W572 have different feature amounts of green color component and red color component. Utilizing this configuration, the user can easily manage and search for the video data.

(4) Group Display Processing

Further, in the image processing apparatus 2, it is possible to display display windows W57 corresponding to their still images having the similar feature in a grouped manner. Here, the group display processing will be described.

Figure 29:
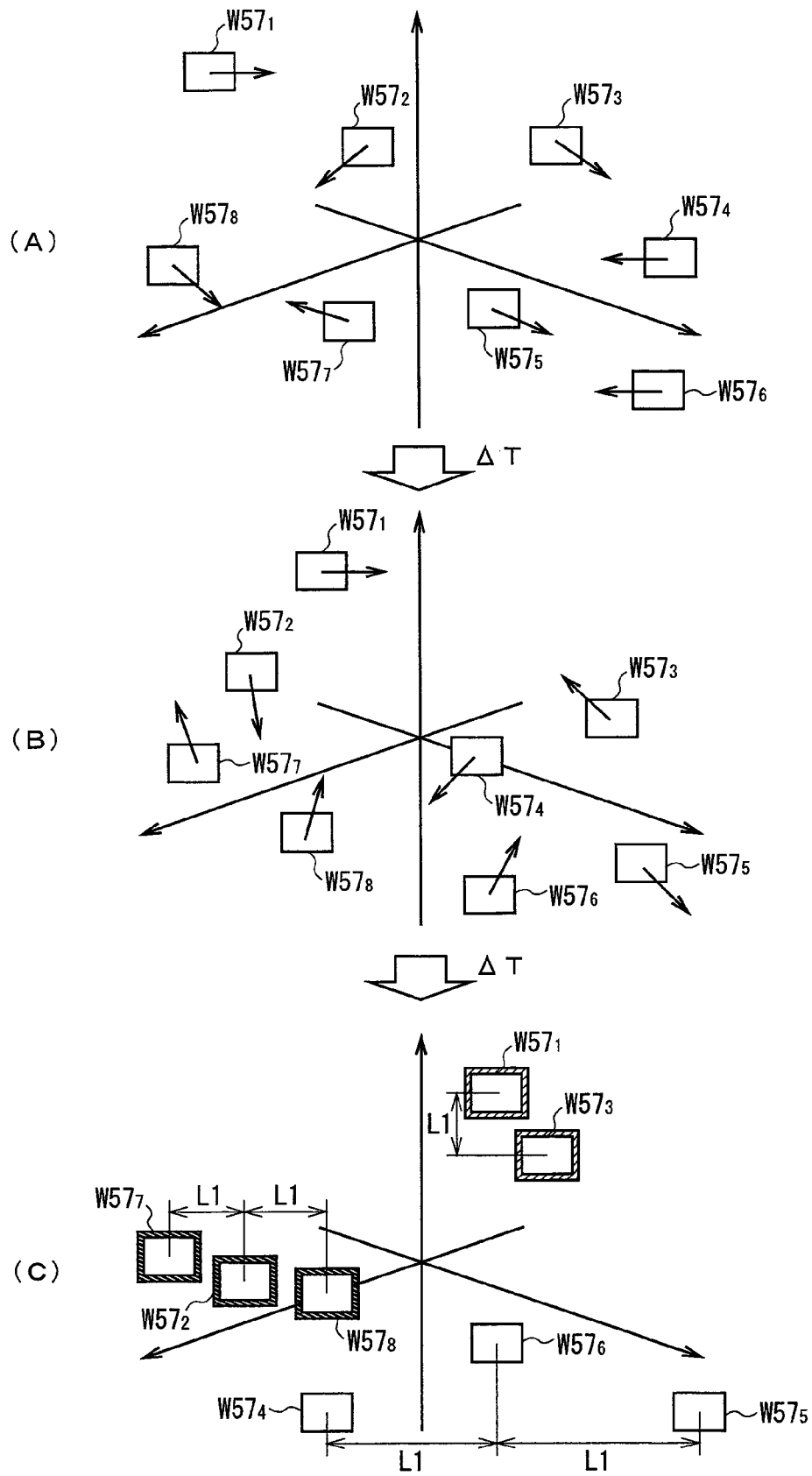
FIGS. 29 (A) to 29 (C) are schematic views used to explain group display processing.

For example, as shown in FIGS. 29 (A) and 29 (B), in the microprocessor 3 of the image processing apparatus 2, in the case where a plurality of display windows W571 to W578 corresponding to a plurality of video data are arranged on the three-dimensional display space, when the plurality of video data are played back, the display windows W571 to W578 are moved in the directions of respective arrows little by little every time the still images displayed through the display windows are updated.

Then, as shown in FIG. 29 (C), in the middle of, or after the playback of the video data, the microprocessor 3 of the image processing apparatus 2 calculates a distance L1 between the adjacent display windows. When the distance L1 is smaller than a predetermined threshold value TH1, the microprocessor 3 determines that the similarity in the feature amounts between the adjacent still images is high; on the other hand, when the distance L1 is larger than a predetermined threshold value TH1, the microprocessor 3 determines that the similarity in the feature amounts between the adjacent still images is low. For example, the microprocessor 3 of the image processing apparatus 2 puts together the display windows W571 and W573 having a high similarity as a first group and imparts a first predetermined color to the frames of the display windows W571 and W573 and, similarly, puts together the display windows W572, W577, and W578 as a second group and imparts a second predetermined color to the frames thereof.

In this case, with regard to, e.g., the display windows W574, W576, and W575, the distance L1 between one another is larger than the threshold value TH1 and thus the similarity in the feature amounts between adjacent still images are low, so that the microprocessor 3 of the image processing apparatus 2 removes the display windows W574, W576, and W575 from the target of grouping and, for example, lowers the luminance level of the display windows W574, W576, and W575 to make a visual difference from the first and second groups.

Figure 30:
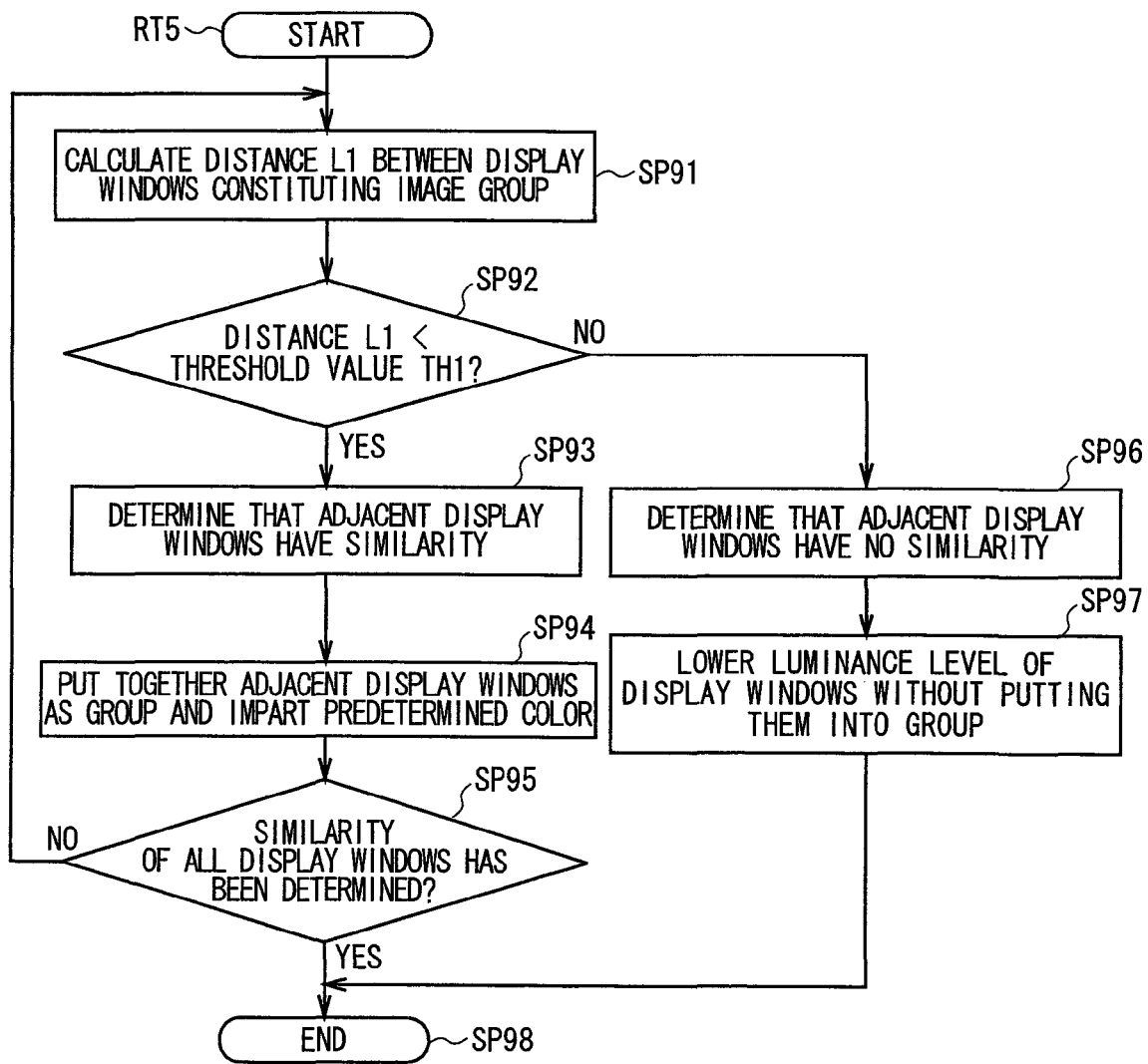
FIG. 30 is a flowchart showing a group display processing procedure.

Concretely, as shown in FIG. 30, the microprocessor 3 of the image processing apparatus 2 executes an initialization step of routine RT5 and proceeds to the next step SP91 where it calculates the distance L1 between adjacent display windows W57 with regard to a plurality of display windows W571 to W578 constituting the image group 58 displayed on the display area 55 and proceeds to subsequent step SP92.

In step SP92, the microprocessor 3 of the image processing apparatus 2 compares the distance L1 between the adjacent display windows W57 and previously set predetermined threshold value TH1 to determine whether the distance L1 is smaller than the threshold value L1. When an affirmative result is obtained, the microprocessor 3 proceeds to step SP93.

In step SP93, since the distance L1 between the adjacent display windows W57 is smaller than the threshold value TH1, the microprocessor 3 of the image processing apparatus 2 recognizes that a plurality of display windows W57 are arranged at close positions on the three-dimensional display space, that is, the feature amounts that the still images of the display windows W57 are similar between them, to determine the similarity between the display windows W57 is high and proceeds to step SP94.

In step SP94, the microprocessor 3 of the image processing apparatus 2 imparts the first or second predetermined color to the display frames of the plurality of display windows W57 determined to have a similarly to thereby display them as a group having similar feature amounts and proceeds to subsequent step SP95.

In step SP95, the microprocessor 3 of the image processing apparatus 2 determines whether the similarity of all the display windows W57 in the image group 58 has been determined. When a negative result is obtained, the microprocessor 3 returns to step SP91 where it repeats the abovementioned processing and, when completing the determination about the similarity of all the display windows W57 to thereby obtain an affirmative result. Then the microprocessor 3 proceeds to step SP98 so as to end this processing flow.

On the other hand, when a negative result is obtained in step SP92, the microprocessor 3 of the image processing apparatus 2 proceeds to step SP96 where it determines that the adjacent display windows W57 have no similarity since the distance L1 between the adjacent display windows W57 is not less than the threshold value TH1 and therefore the both display windows W57 are not arranged at close positions on the three-dimensional display space, that is, the feature amounts that the still images of the adjacent display windows W57 are not similar to each other and the microprocessor 3 proceeds to step SP97.

In step SP97, the microprocessor 3 of the image processing apparatus 2 does not put together the adjacent display windows W57 determined to have no similarity but lowers the luminance level of the display windows W57 to allow the user to visually confirm that these display windows W57 cannot be classified as a group, thereby resulting in highlighting of the grouped display windows W57. After that, the microprocessor 3 proceeds to step SP98 so as to end this processing flow.

As described above, the microprocessor 3 of the image processing apparatus 2 determines a plurality of display windows W57 corresponding to a plurality of video data based on their still images during or after the playback of the video data to classify the image group 58 into a group having a similarity and group having no similarity. Further, the microprocessor 3 of the image processing apparatus 2 imparts a predetermined color to the frame of the display windows W57 belonging to the group having a similarity while lowers the luminance level of the display windows W57 belonging to the group having no similarity, thus allowing the user to instantly and intuitively recognize the trend of the feature amounts that the respective display windows W57 of the image group 58 based on the highlighting.

The microprocessor 3 of the image processing apparatus 2 may execute the group display processing routine RT5 based on the first still image at the time point before the start of playback processing for a plurality of video data, or every time the still image of the video data being played back is updated.

Incidentally, in place of lowering the luminance level of the display windows W57 having no similarity, the microprocessor 3 of the image processing apparatus 2 may impart the display windows W57 having no similarity an opposite color to the grouped display windows W57. Further, in place of imparting the grouped display windows W57, the microprocessor 3 may increase the luminance level of the grouped display windows W57 or blink them. The point is that, it is only necessary to highlight the display windows W57 belonging to a group having similarity to distinguish them from other display windows W57.

It is possible to generate similarity information representing that the feature parameters of the video data are similar to each other, or representing the group having similarity as a new feature parameter or an associated parameter (to be described later). For example, a counter for counting the number of appearances of the similarity is provided for each video data to thereby measure the similarity between the video data. In this case, it is possible to automatically display only the video data having a count value larger than a predetermined threshold value.

(5) Display Application Example

Subsequently, a display application example for the display window W57 that the microprocessor 3 of the image processing apparatus 2 can execute will be described.

(5-1) Display Processing When Three-Dimensional Display Space is Moved with Position of Display Window Kept Fixed As described above, in the image processing apparatus 2, when the still image of the display window W57 corresponding to the video data is updated, the feature amounts of each still image are changed. At this time, a configuration may be adopted in which the position of a target display window W57 on which the feature amounts of the still image data is updated is not changed but the three-dimensional display space and other display windows W57 are moved to be rearranged. Here, such display processing in which the position of the target display window is kept fixed will be described.

In the above description, in the image processing apparatus 2, as shown in FIG. 23, every time a still image of the display window W57 is updated, the coordinate parameters (coordinate positions) on the three-dimensional display space on which the display window W57 of the updated still image is arranged according to the feature amount of the still image are changed to move the display window W57 from the position PO1 to position PO3 in a floating manner with the three-dimensional display space kept fixed.

However, a configuration may be adopted in which, in a state where the display position of a target display window W57 on the display area 55 is fixed, the three-dimensional display space itself is moved and/or rotated in accordance with the feature amount of the still images every time the still image of the display window W57 is updated to thereby change a relative positional relationship between the target display window W57 and three-dimensional display space, allowing other display windows W57 to come close to or move away from the fixed target display window 57 in a floating manner.

Figure 31:
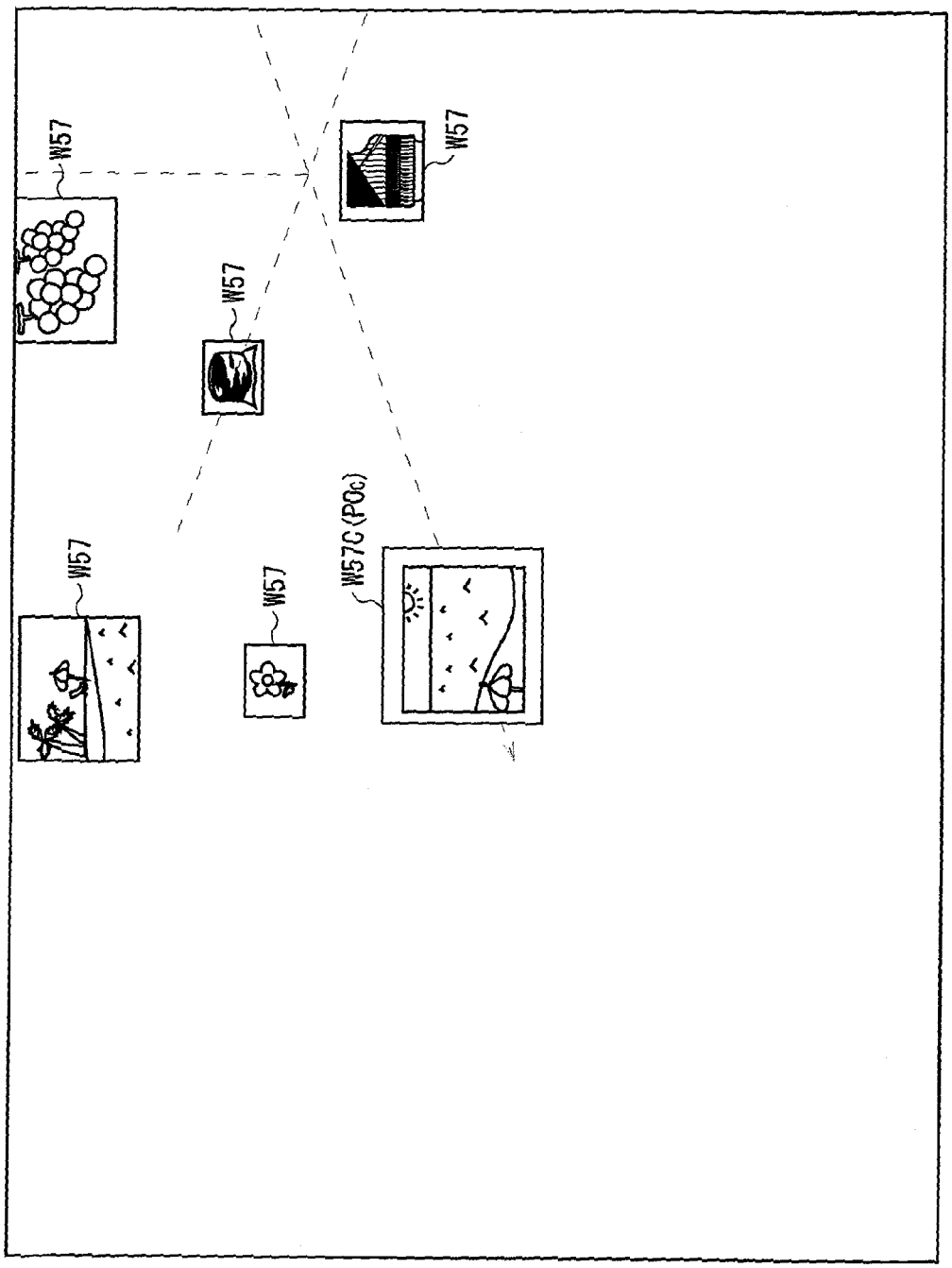
FIG. 31 is a schematic view showing a display example (1) obtained when a three-dimensional display space is moved with a display window kept fixed.

Concretely, in the case where the position of a display window W57C located at the position PO1 in FIG. 23 is fixed to a screen center position POc of the display area 55 as shown in FIG. 31, the microprocessor 3 of the image processing apparatus 2 displays other display windows W57 existing around the display window W57C with a relative positional relationship with the display window W57C maintained.

Figure 32:
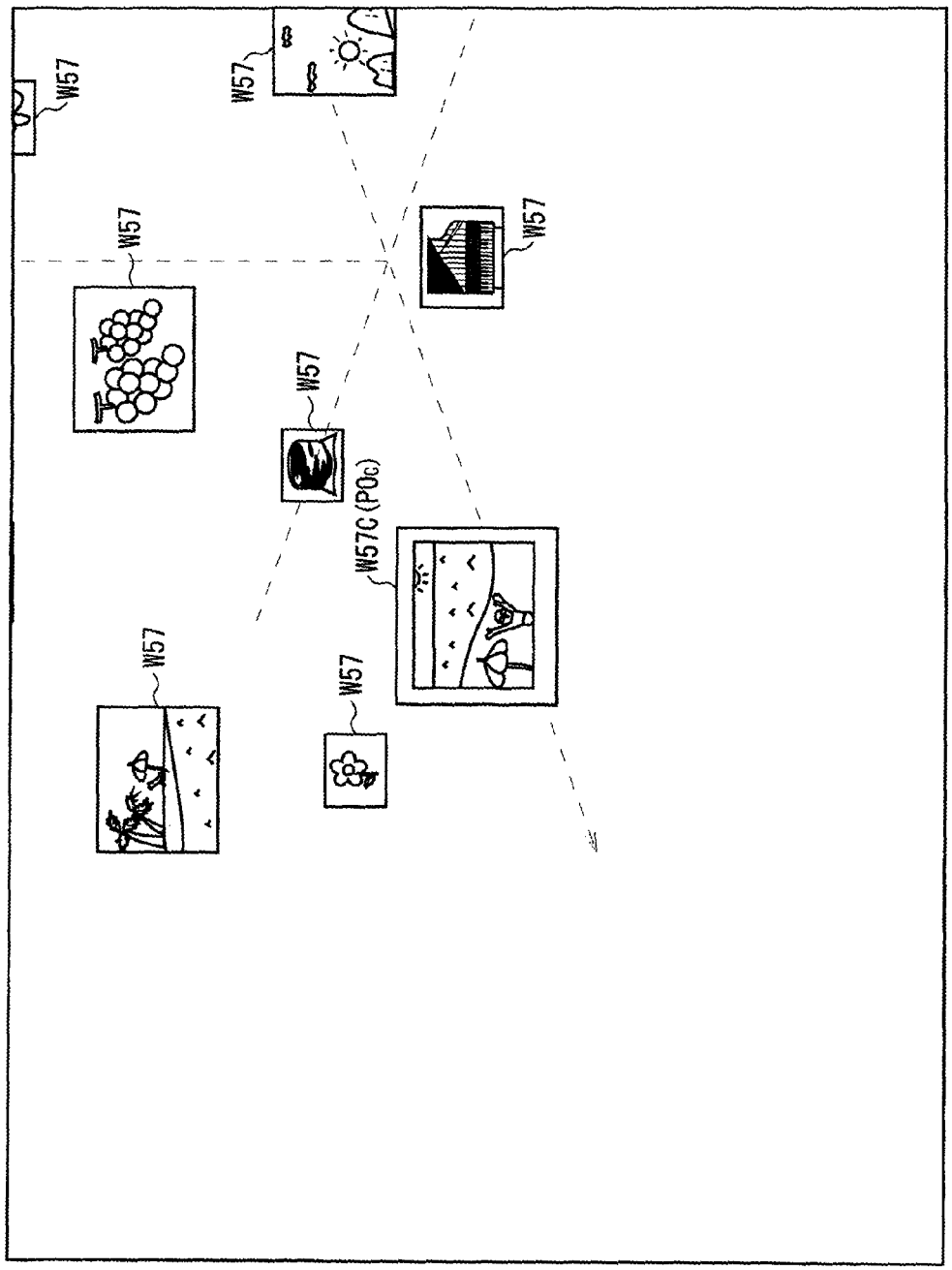
FIG. 32 is a schematic view showing a display example (2) obtained when a three-dimensional display space is moved with a display window kept fixed.

Thereafter, as shown in FIG. 32, upon update of the still image of the display window W57C, the microprocessor 3 of the image processing apparatus 2 moves other display windows W57 together with the three-dimensional display space according to the feature amount of the updated still image with the position of the display window W57C fixed to the screen center position POc.

Figure 33:
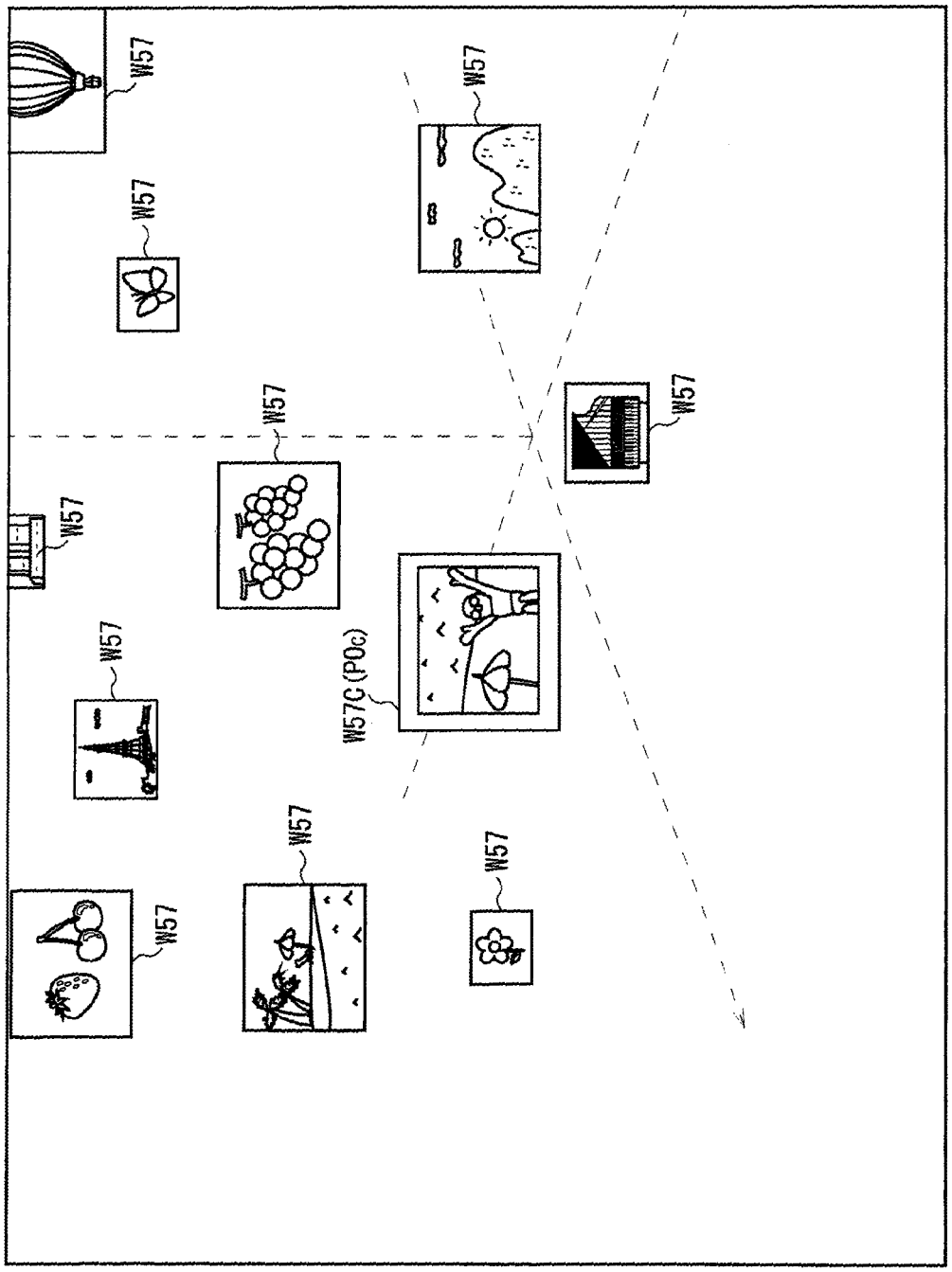
FIG. 33 is a schematic view showing a display example (3) obtained when a three-dimensional display space is moved with a display window kept fixed.

Similarly, as shown in FIG. 33, upon further update of the still image of the display window W57C, the microprocessor 3 of the image processing apparatus 2 moves other display windows W57 together with the three-dimensional display space according to the feature amount of the updated still image with the position of the display window W57C consistently fixed to the screen center position POc.

That is, the microprocessor 3 of the image processing apparatus 2 displays a playback image of the video data through the display window W57C with the position of the display window W57C kept fixed to the screen center position POc while moving the three-dimensional display space and other display windows W57 according to the feature amounts of the still image changing on a frame basis, thereby giving an impression to a user who focuses on the display window W57C that the user him or her self is moving together with the display window W57C on the three-dimensional display space while eliminating a risk that the user loses track of the display window W57C.

Figure 34:
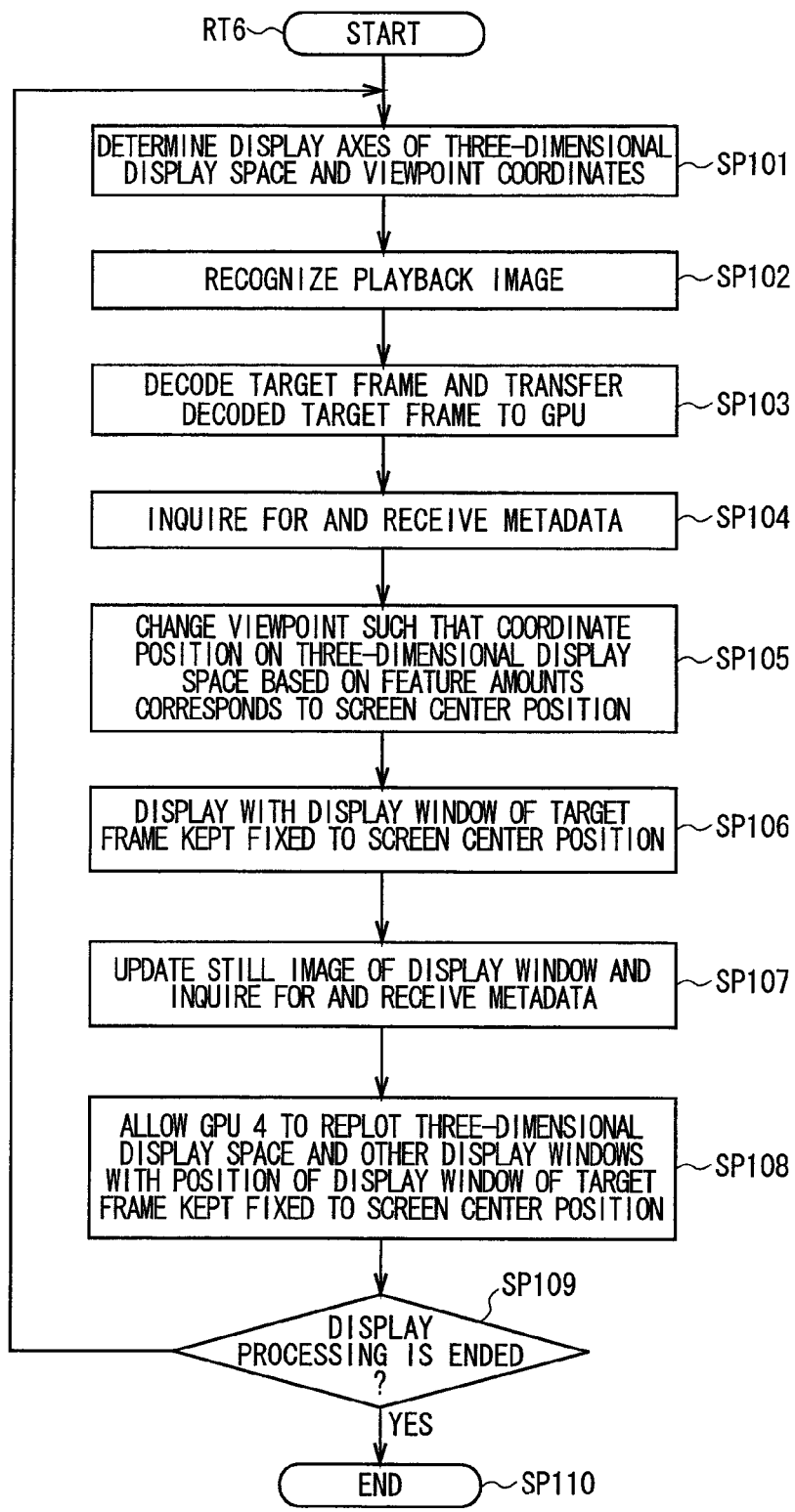
FIG. 34 is a flowchart showing a display processing procedure of video data performed with a display window kept fixed.

Such a display processing procedure performed with the position of the display window W57C kept fixed will concretely be described. As shown in FIG. 34, the microprocessor 3 of the image processing apparatus 2 executes an initialization step of routine RT6 and proceeds to the next step SP101.

In step SP101, the microprocessor 3 of the image processing apparatus 2 determines the display axes of the three-dimensional display space specified by a user and viewpoint coordinates for displaying the image group 58 to the user, followed by proceeding to step SP102.

In step SP102, the microprocessor 3 of the image processing apparatus 2 recognizes a still image of the video data to be played back which is specified by the user and then proceeds to step SP103. In step SP103, the microprocessor 3 sets the still image as a target frame, decodes its sub-video stream LD1, transfers decoded sub-video data to the GPU 4, and then proceeds to subsequent step SP104.

In step SP104, the microprocessor 3 of the image processing apparatus 2 inquires for the feature amounts of the feature parameters used as the display axes of the three-dimensional display space, receives them from the metadata file MDF associated with the still image, and proceeds to step SP105.

In step SP105, the microprocessor 3 of the image processing apparatus 2 calculates the coordinate parameters (coordinate positions) on the three-dimensional display space on which the display window W57C of the still image is pasted based on the feature amounts of the feature parameters received in step SP104, changes the viewpoint coordinates such that the coordinate position on the three-dimensional display space corresponds to the screen center position POc, and proceeds to step SP106.

In step SP106, the microprocessor 3 of the image processing apparatus 2 displays a first still image in a state where the position of the display window W57C of the target frame is fixed to the screen center position POc, rearranges display windows W57 corresponding to other video data existing around the display window W57C, and proceeds to subsequent step SP107.

In step SP107, in a state where the position of the display window W57C is fixed to the screen center position POc, the microprocessor 3 of the image processing apparatus 2 updates the still image of the display window W57C according to, e.g., a predetermined frame frequency, inquires for the feature amounts of the feature parameters used as the display axes, receives them from the metadata file MDF associated with the updated still image, and proceeds to step SP108.

In step SP108, the microprocessor 3 of the image processing apparatus 2 allows the GPU 4 to replot the three-dimensional display space and other display windows W57 existing around the display window W57C according to the feature amounts of the updated still image with the position of the display window W57C kept fixed to the screen center position Poc and proceeds to step SP109.

In step SP109, the microprocessor 3 determines whether to end display processing for the display window W57C at the screen center position POc based on whether there has been issued a termination instruction from the user or whether a predetermined time has elapsed. When an affirmative result is obtained, the microprocessor 3 proceeds to step SP110 where it ends the display processing for the display window W57C.

On the other hand, when a negative result is obtained in step SP109, the microprocessor 3 does not end the display processing for the display window W57C at the screen center position POc but returns to step SP101 where it repeats the above-mentioned processing.

As described above, the microprocessor 3 of the image processing apparatus 2 displays a playback image of the video data through the display window W57C with the position of the display window W57C kept fixed to the screen center position POc while moving the three-dimensional display space and other display windows W57C according to the feature amounts of the still image to be updated, thereby allowing the user to intuitively recognize the feature of the target video data through a change in the relative positional relationship between the display window W57C and the three-dimensional display space and other display windows W57 as an image.

(5-3) Enlarged Display Example Using Sub-Browser

In the microprocessor 3 of the image processing apparatus 2, the display sizes of the respective display windows W57 constituting the image group 58 are not always sufficiently large. Thus, there may be a case where a user cannot satisfactorily visually confirm the playback image of the video through the display window 57W.

Figure 35:
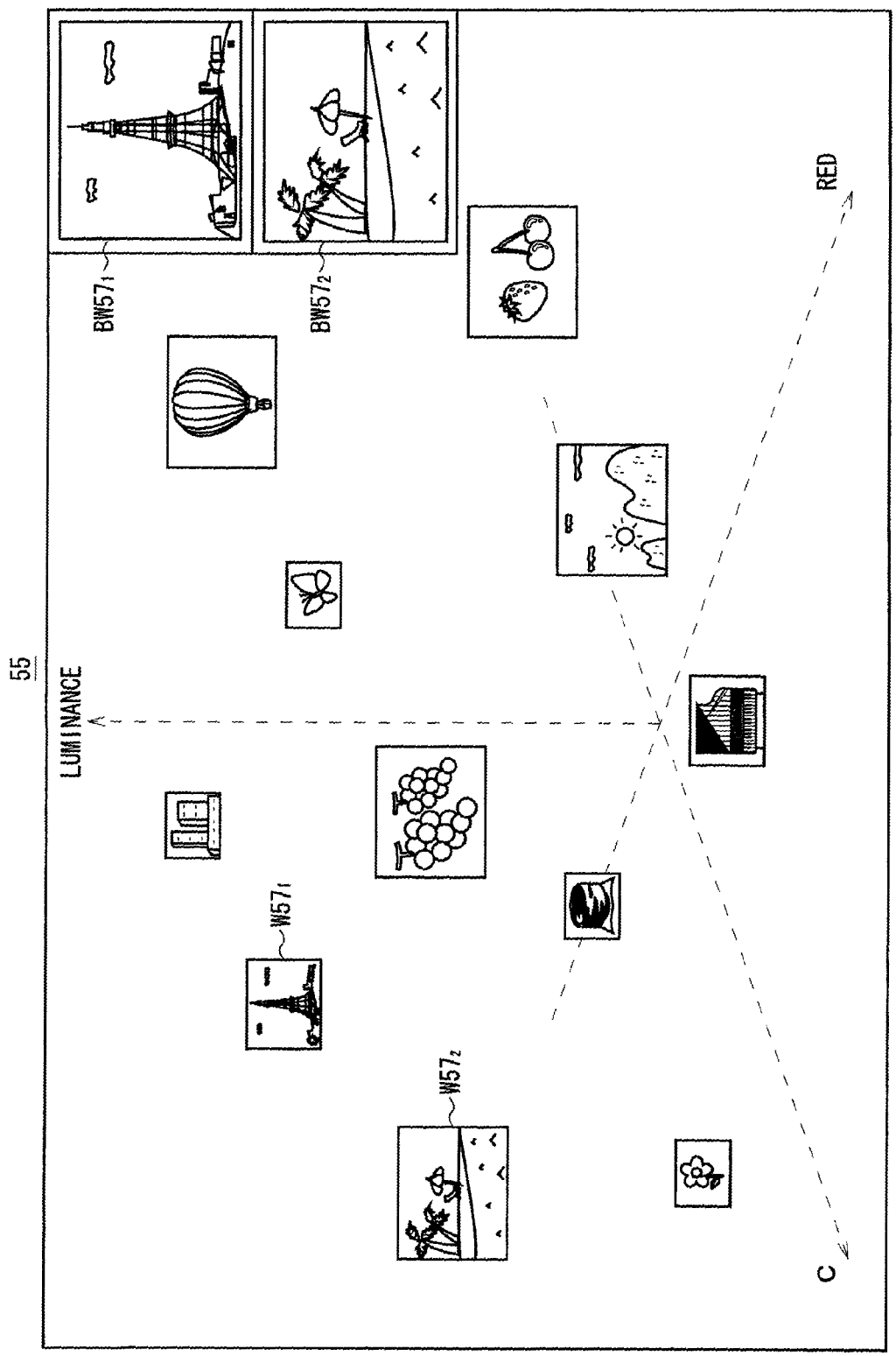
FIG. 35 is a schematic view showing a display example in an enlarged display window.

In order to cope with this, in the image processing apparatus 2, when the display windows W571 and W572 of the image group 58 are selected from the display windows W57 by a user through a double-click operation, a sub-browser having a comparatively large size pops up and displays the same playback images as those displayed through the display windows W571 and W572 through enlarged display windows BW 571 and BW 572 on the sub-browser in an enlarged manner, as shown in FIG. 35.

With this configuration, even when the playback image is displayed in a very small size depending on the locations or display sizes of the display windows W571 and W572, the image processing apparatus 2 uses the enlarged display windows BW 571 and BW 572 to allow the user to satisfactorily confirm the contents of the playback images, resulting in each search for user's desired video data from among a plurality of display windows W57 corresponding to a plurality of video data.

The microprocessor 3 of the image processing apparatus 2 arranges the enlarged display windows BW571 and BW572 along the periphery of the display area 55, imparts the same color to the frames of the display window W571 and its corresponding enlarged display window BW571, and imparts the same color (different from the color imparted to the display window W571 and enlarged display window BW571) to the frames of the display window W572 and its corresponding enlarged display window BW572.

This configuration allows the user to easily recognize a correspondence relationship between the playback image displayed on the enlarged display window BW571 and display window W571 or playback image displayed on the enlarged display window BW572 and display window W572.

The enlarged display windows BW571 and BW572 are arranged along the periphery of the display area 55, so that when the number of the enlarged display windows BW571, BW572 is excessively increased, some display windows of the image group 58 may be hidden by the enlarged display windows. To prevent this, when the number of the enlarged display windows BW571, BW572 exceeds a predetermined value, the longitudinal and lateral lengths of the enlarged display windows are reduced to reduce the entire screen size thereof.

(6) Display Window Trajectory Display Processing

As described above, in the image processing apparatus 2, when a playback image of the video data is displayed through the display window W57, the position of the display window W57 on the three-dimensional display space is changed every time picture (still image) constituting the video data is updated. In such a configuration, there may be a case where the display window W57 at a given position is moved to a position far away from the previous position after a predetermined time has elapsed. In such as case, it is difficult for the user to remember the feature that the image being played back had at the previous timing, with the result that the user cannot sufficiently grasp the overall feature (trend) of the video data.

In view of the above point, in the image processing apparatus 2, the movement process of the display window W57 is displayed as a trajectory while the display window W57 is moved on the three-dimensional display space to thereby allow the user to visually confirm that what type of feature the playback video data image had and/or will have in the past and/or future during display of the video data. Thus, even after the display of the playback image of the video data, the user can sufficiently recognize the feature (trend) of the video data. In the following, the trajectory display processing for achieving the above advantage will be described.

(6-1) Normal Trajectory Display Mode

Figure 36:
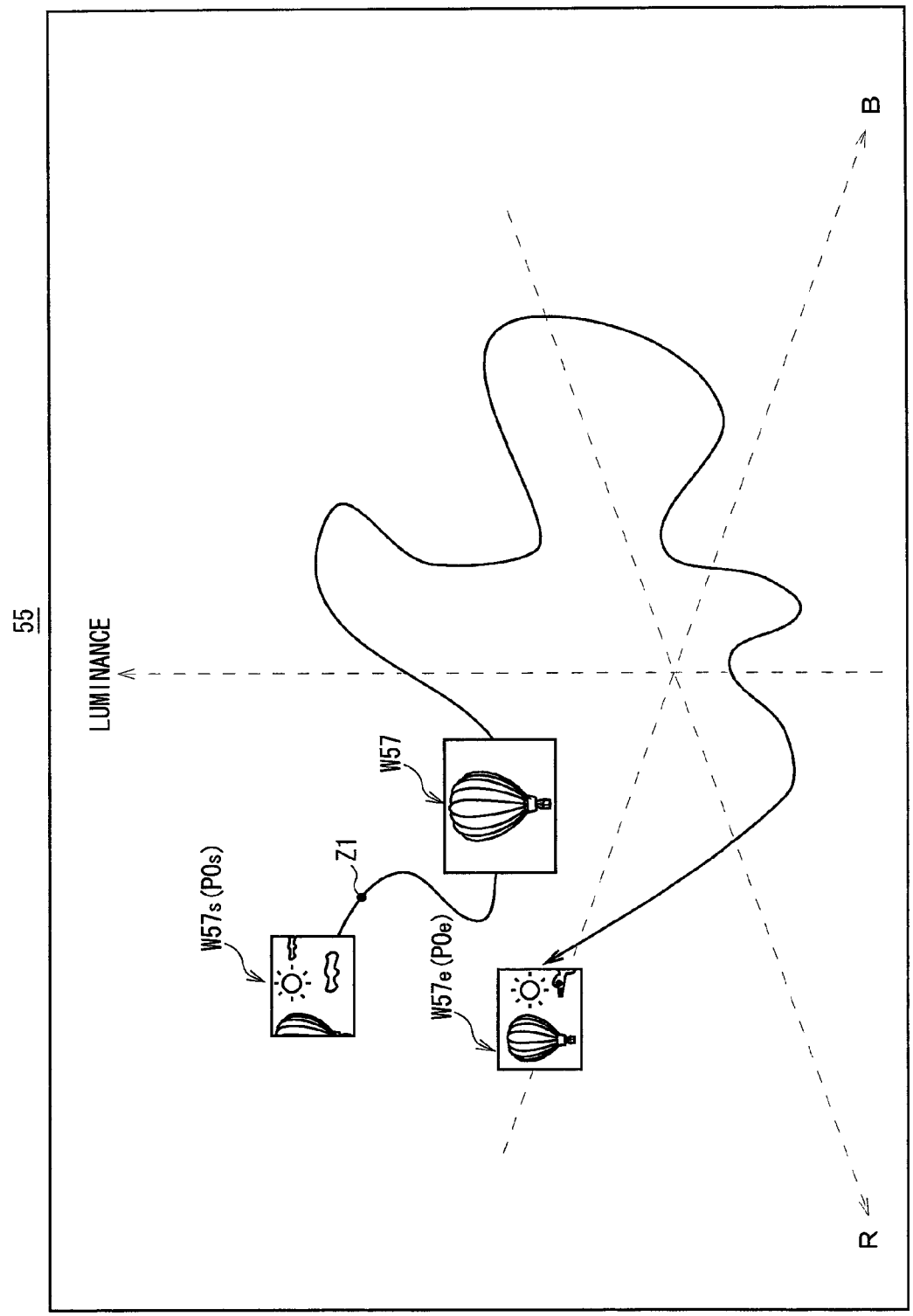
FIG. 36 is a schematic view showing a display pattern (1) in an entire trajectory display mode.

FIG. 36 shows a case where an entire trajectory display mode is selected. In this case, the microprocessor 3 of the image processing apparatus 2 moves the display window W57 of the video data in the direction of an arrow every time the still image is updated while displaying, as a line, a trajectory describing the past movement of the display window W57 arranged in association with the still image being displayed and trajectory describing the future movement of the display window W57.

When displaying the past trajectory, the microprocessor 3 of the image processing apparatus 2 generates a line by connecting the barycenters of the display window W57 moving along with the movement of the display window W57 every time the still image of the display window W57 is updated and displays the generated line as the past trajectory in, e.g., red.

When displaying the future trajectory, the microprocessor 3 of the image processing apparatus 2 calculates the coordinate parameters (coordinate positions) to which the display window W57 will move based on the feature amount of the still image of the display window W57 that will be updated from now, generates a line by sequentially connecting the future barycenters of the display window W57 on the calculated coordinate positions and displays the generated line as the future trajectory in, e.g., blue.

That is, in the image processing apparatus 2, the past trajectory extending in the rear direction from the display window W57 is displayed as a red line while the future trajectory extending in the front direction from the display window W57 is displayed as a blue line. As described above, the past and future trajectories are displayed in a color-coded manner, thereby allowing the user to instantly and intuitively recognize in which direction the display window W57 will move.

In place of displaying the past and future trajectories in a color-coded manner, the microprocessor 3 of the image processing apparatus 2 may employ any other displaying method to express the trajectory. For example, the past trajectory and future trajectory may be displayed in a solid line and broken line, respectively.

Although the microprocessor 3 of the image processing apparatus 2 displays both the past and future trajectories of the display window W57 in the above description, only one of the past and future trajectories may be displayed according to the user's mode selection.

Figure 37:
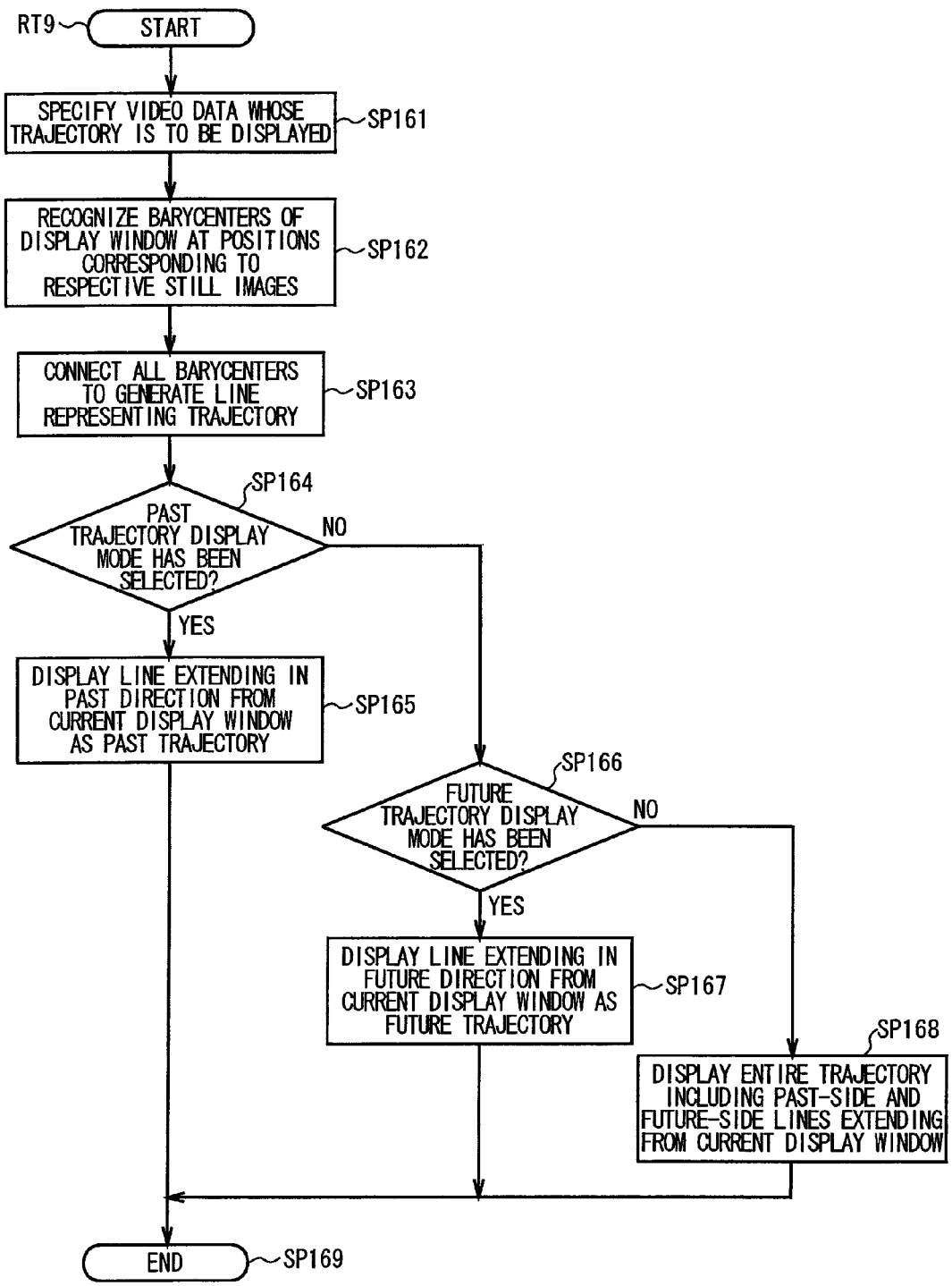
FIG. 37 is a flowchart showing a trajectory display processing procedure.

A procedure of the above trajectory display processing performed by the microprocessor 3 of the image processing apparatus 2 will be described using a flowchart of FIG. 37.

The microprocessor 3 of the image processing apparatus 2 executes an initialization step of routine RT9 and proceeds to the next step SP161 where it receives a user's selection to specify the video data whose trajectory is to be displayed and proceeds to step SP162.

In step SP162, the microprocessor 3 of the image processing apparatus 2 recognizes the barycenters of the display window W57 at the positions corresponding to respective still images constituting the target video data and proceeds to step SP163.

In step SP163, the microprocessor 3 of the image processing apparatus 2 connects the barycenters recognized in step SP162 to generate a line representing the trajectory describing the movement of the display window W57 of the video data and proceeds to step SP164.

In step SP164, the microprocessor 3 of the image processing apparatus 2 determines whether a past trajectory display mode showing the past trajectory has been selected by the user. When an affirmative result is obtained, the microprocessor 3 of the image processing apparatus 2 proceeds to step SP165 where it displays a line extending in the past direction from the current display window W57 as the past trajectory and proceeds to step SP169 so as to end this processing flow.

On the other hand, when a negative result is obtained in step SP164, which means that the user has selected a future trajectory display mode showing the future trajectory or entire trajectory display mode showing entire trajectory including the past and future, the microprocessor 3 of the image processing apparatus 2 proceeds to step SP166.

In step SP166, the microprocessor 3 of the image processing apparatus 2 determines whether the future trajectory display mode has been selected by the user. When an affirmative result is obtained, the microprocessor 3 proceeds to step SP167 where it displays a line extending in the future direction from the current display window W57 as the future trajectory and proceeds to step SP169 so as to end this processing flow.

On the other hand, when a negative result is obtained in step SP166, which means that the user has selected the entire trajectory display mode, the microprocessor 3 of the image processing apparatus 2 proceeds to step SP168 where it displays the entire trajectory including the past-side and future-side lines extending from the current display window W57 and proceeds to step SP169 so as to end this processing flow.

Figure 38:
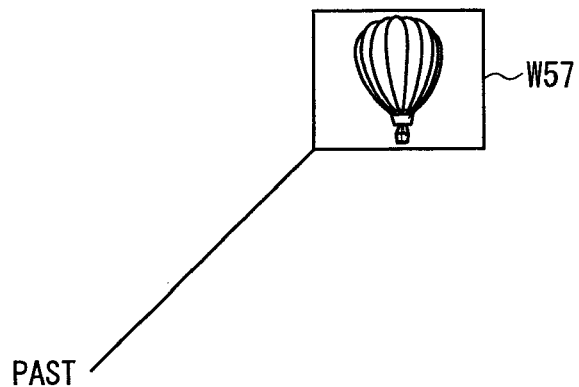
FIG. 38 is a schematic view showing a trajectory on the past side.

Thus, in the microprocessor 3 of the image processing apparatus 2, in the case where only the past trajectory is displayed with respect to the display window W57, only the line extending in the past direction (i.e., in the rear direction) from the current display window W57 is displayed as shown in FIG. 38, so that the user receives an impression as if a moving object were traveling while discharging air.

Figure 39:
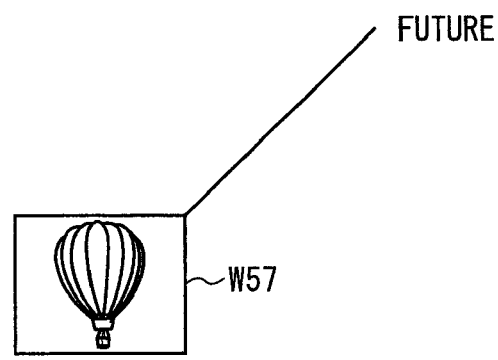
FIG. 39 is a schematic view showing a trajectory on the future side.

Further, in the case where only the future trajectory is displayed with respect to the display window W57, only the line extending in the future direction (i.e., in the front direction) from the current display window W57 is displayed as shown in FIG. 39, so that the user receives an impression as if a moving object were traveling while lighting its traveling direction.

Incidentally, in the case where the future trajectory is displayed, a configuration may be adopted in which the entire future trajectory up to an end position POe (FIG. 36) is not displayed at the beginning, but only a line of a predetermined length extending from the currently displayed display window W57 is displayed as the future trajectory. When the end position POe is not presented to the user at the beginning as described above, the user can enjoy the movement of the display window W57 while estimating the end position POe.

Figure 40:
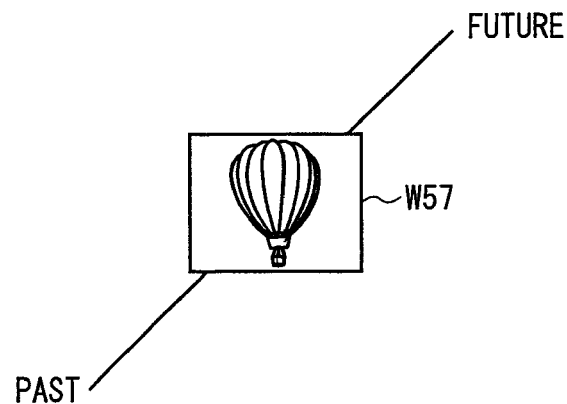
FIG. 40 is a schematic view showing the entire trajectory.
Figure 41:
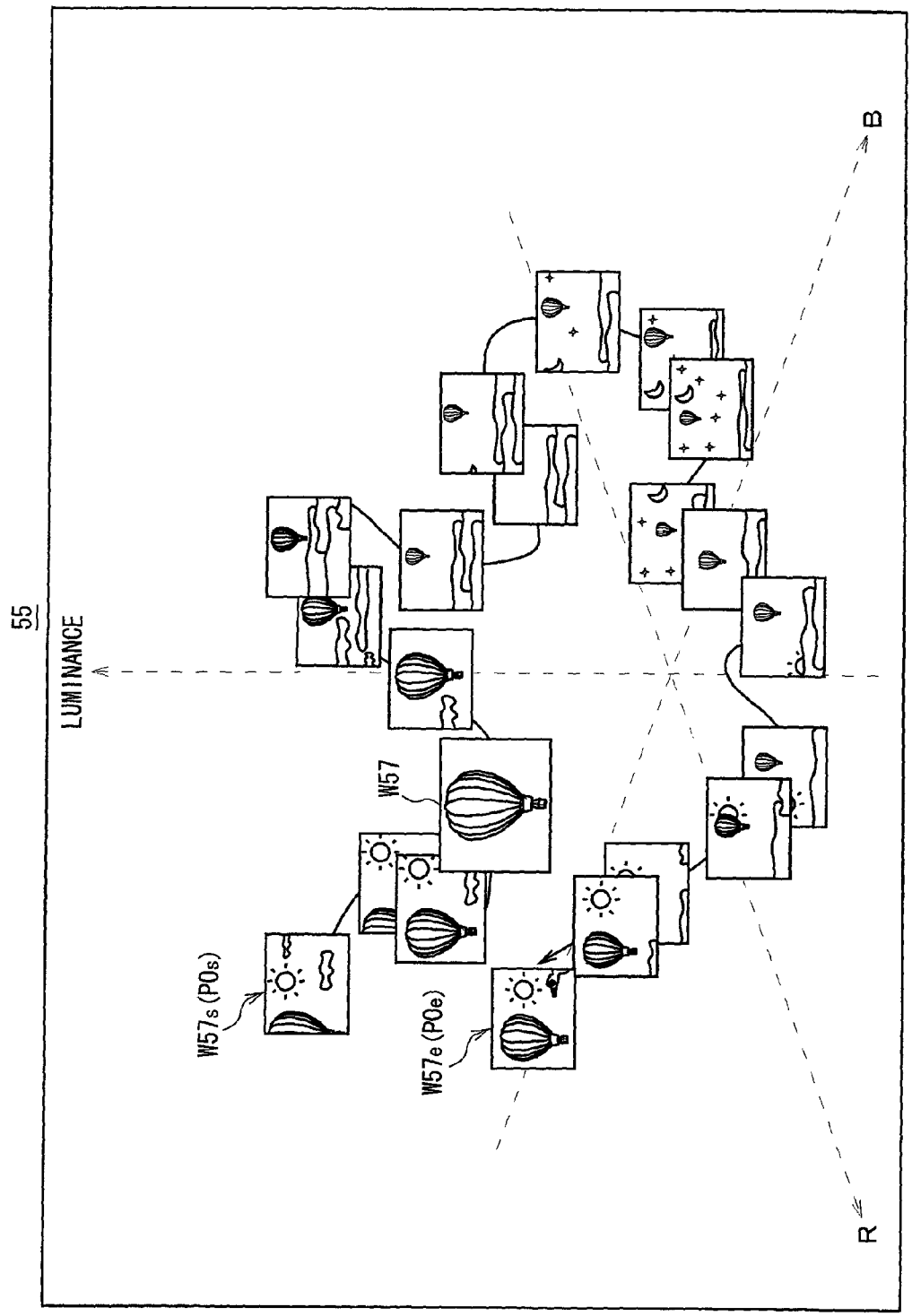
FIG. 41 is a schematic view showing a display pattern (2) in the entire trajectory display mode.

Further, in the case where the entire trajectory including both the past and future trajectories is displayed with respect to the display window W57, the line extending in the front and rear directions from the current display window W57 is displayed as shown in FIG. 40, so that the user receives an impression as if a train were moving on a rail track.

As described above, the microprocessor 3 of the image processing apparatus 2 allows the user to arbitrarily select the trajectory display method from the above three modes, thereby presenting the feature (trend) of each still image of the video data by a most easily recognizable trajectory mode.

(6-2) Trajectory Display Mode Using Plurality of Display Windows

As shown in FIG. 36, the microprocessor 3 of the image processing apparatus 2 is configured to display not only the display window W57 that is being moved but also remain displaying, at a start position POs of the display window W57 at the video data playback start time point and end position POe of the display window W57 at the video data playback end time point, display windows W57s and W57e each showing a still image at that time point.

This configuration of the image processing apparatus 2 allows the user visually confirming the display window W57 corresponding to this video data to intuitively recognize the entire course from the start position POs on the three-dimensional display space to the end position POe on the three-dimensional display space as an image representing the entire trajectory of the display window W57.

As a matter of course, in the microprocessor 3 of the image processing apparatus 2, it is not always necessary to display the display windows W57s and W57e at the start and end positions Pos and Poe but it is possible not to display them by the user's selection operation.

Figure 45:
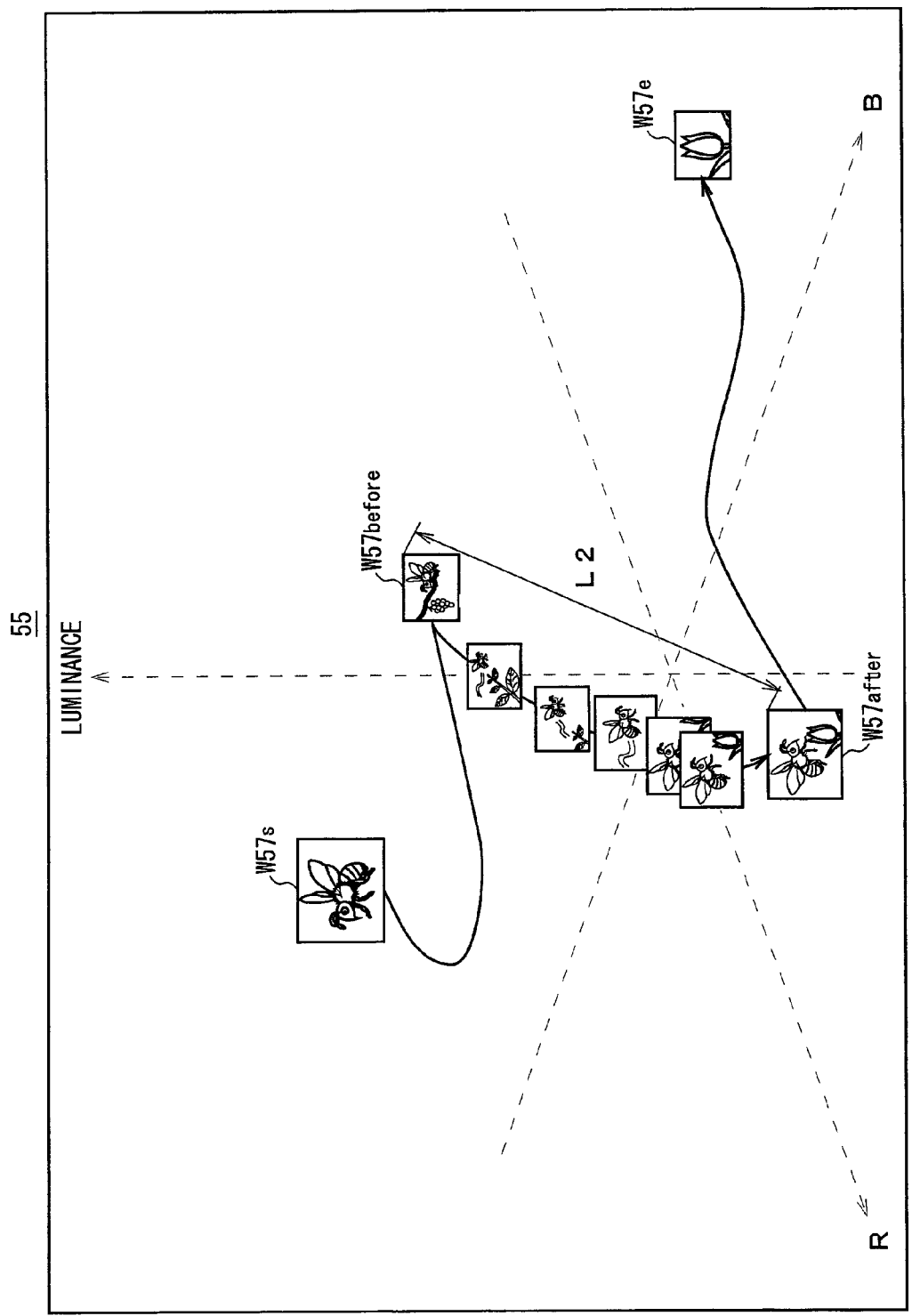
FIG. 45 is a schematic view showing a trajectory display example including scene change.

Further, when an all-window display button Z1 (FIG. 36) provided near the start position POs is double-clicked by the user, the microprocessor 3 of the image processing apparatus 2 displays, as shown in FIG. 45, a part of the display windows W57 (W57s to W57e) at a predetermined interval or all the display windows W57s to W57e at the positions on the three-dimensional display space determined by a plurality of pictures (still images) constituting the video data, thereby presenting the user a continuous sequence formed by the plurality of display windows W57 (W57s to W57e) as the feature (trend) of the video data in place of or while displaying the past and future trajectories.

Figure 42:
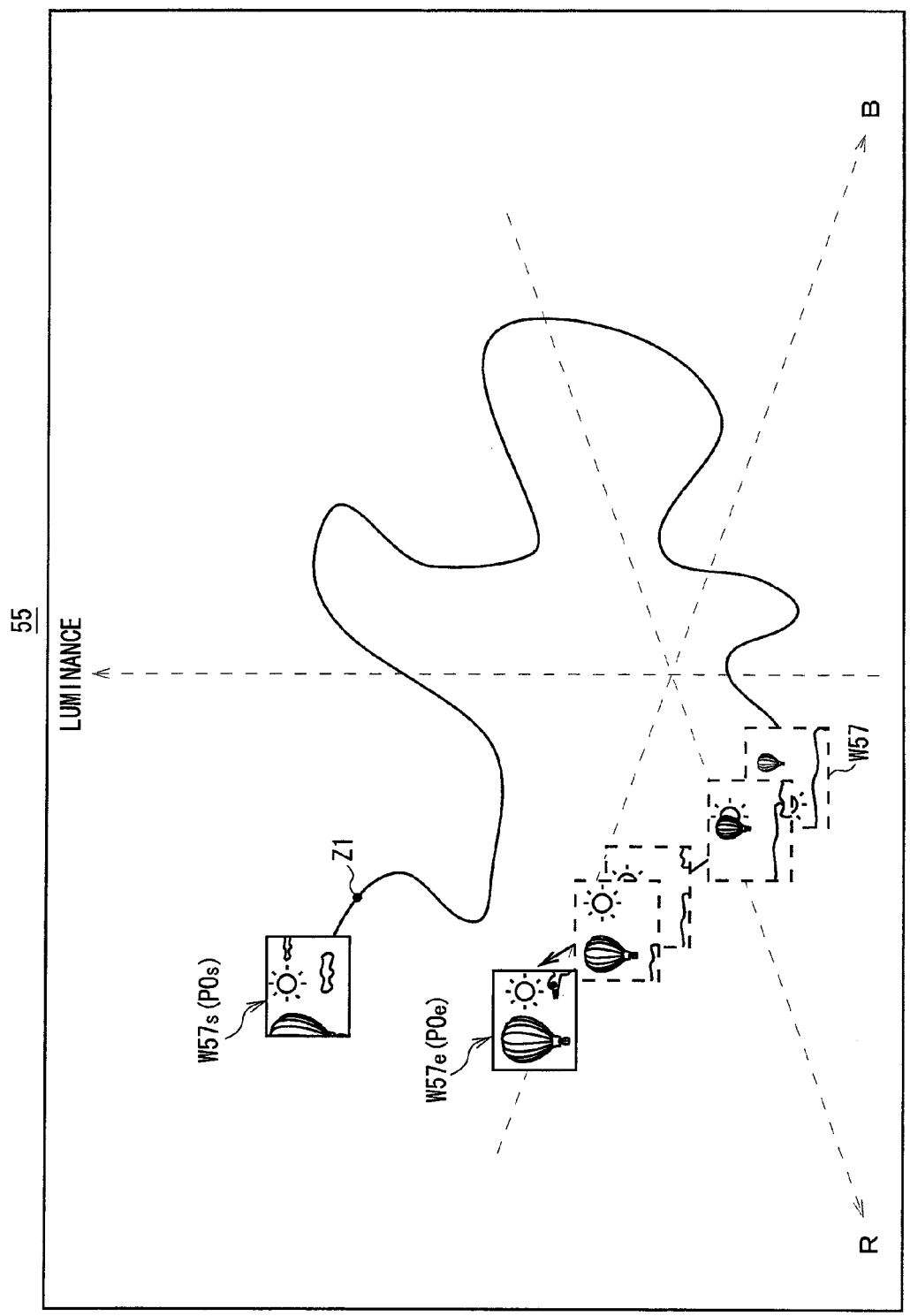
FIG. 42 is a schematic view showing a display pattern (3) in the entire trajectory display mode.

Further, as shown in FIG. 42, upon recognition of user's click operation to a given point on the trajectory, the microprocessor 3 of the image processing apparatus 2 starts playback processing through the display window W57 and performs preview display of the playback image up to the end position POe corresponding to the display window W57e.

With this configuration of the image processing apparatus 2, after allowing the user to visually confirm a state where the still images are displayed in a moving manner through the display windows W57 from the start position POs to end position Poe by playing back the video data, it is possible to resume the display processing through the display window W57 at a user's desired position, thereby significantly enhancing operability of the user.

Incidentally, when a given point on the trajectory is clicked by the user even during display of the display window corresponding to the video data, the microprocessor 3 of the image processing apparatus 2 starts playback processing through the display window W57 at the given point and, at the same time, extinguishes the display windows W57 that had been displayed at that time in terms of viewability to remain only one display window W57 on the trajectory line.

However, when the user determines that the viewability is not impaired in the image processing apparatus 2, a plurality of display windows W57 can be displayed in a moving manner on the trajectory line at the same time.

Figure 43:
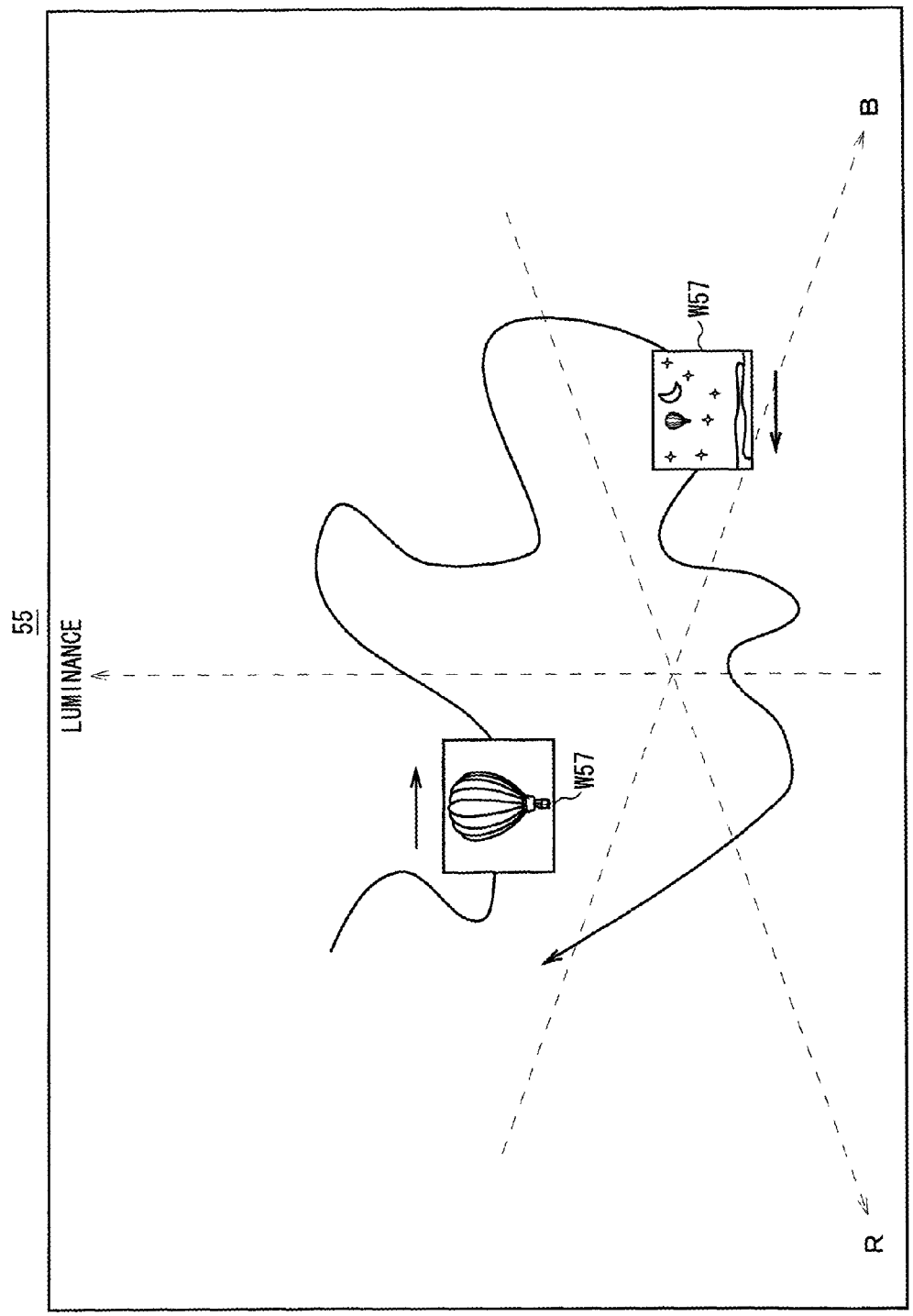
FIG. 43 is a schematic view showing a display pattern (4) in the entire trajectory display mode.

In this case, the microprocessor 3 of the image processing apparatus 2 displays in parallel two display windows W57 on the trajectory in a moving manner as shown in FIG. 43, making it further easier for the user to search for his or her desired scene.

Figure 44:
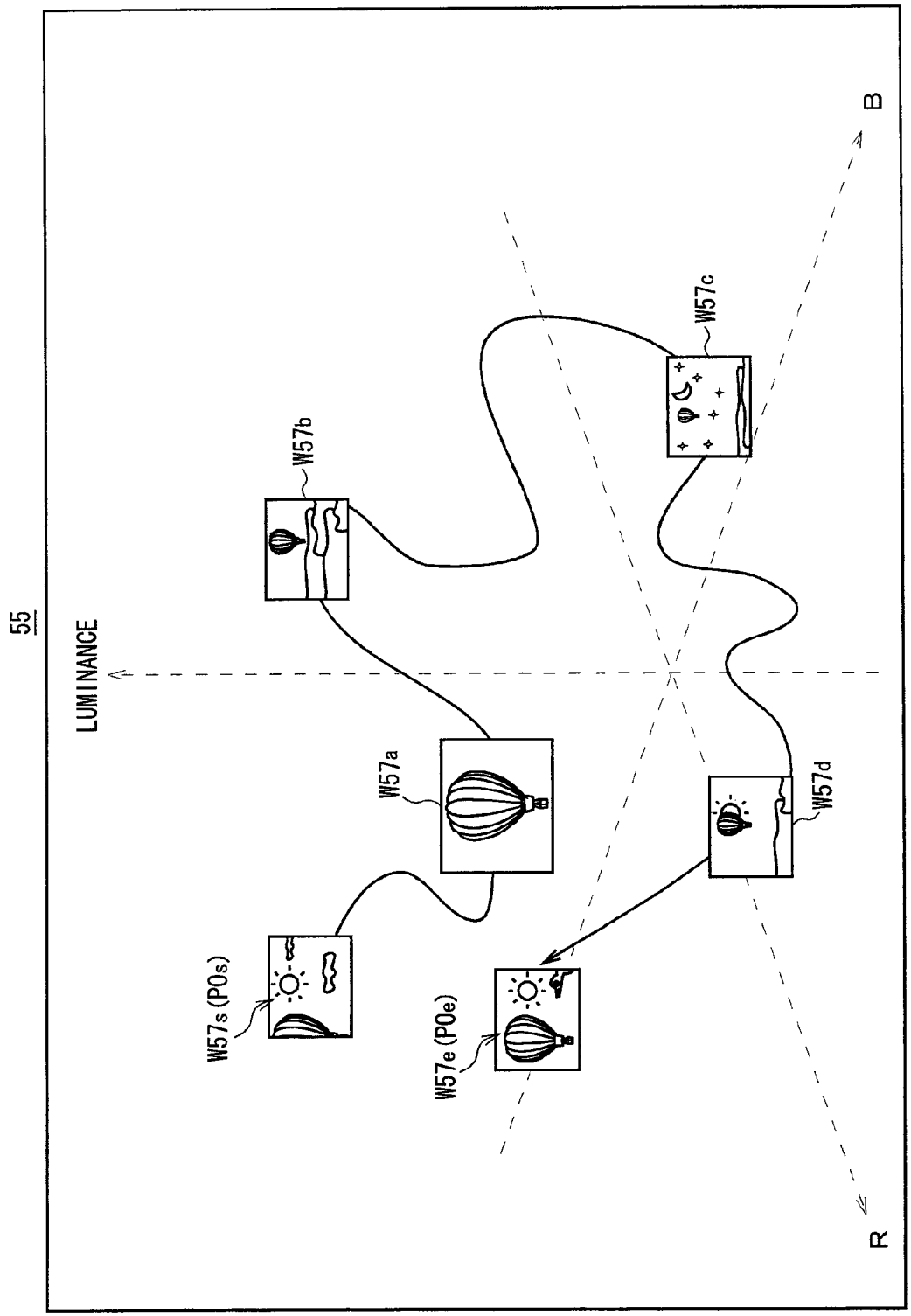
FIG. 44 is a schematic view showing a trajectory display example using representative scenes.

Further, as shown in FIG. 44, the microprocessor 3 of the image processing apparatus 2 can remain displaying display windows W57a, W57b, W57c, and W57d of the still images that have previously been set as representative scenes at predetermined positions on the trajectory of the display window W57.

With this configuration, even after the display windows W57 are displayed in a moving manner from the start position POs to end position Poe, the display windows W57a, W57b, W57c, and W57d showing the still images corresponding to the representative scenes remain displayed on the trajectory. Thus, simply by visually confirming the still images corresponding to the representative scenes through the display windows W57a, W57b, W57c, and W57d, it is possible for the user to easily grasp not only the overall trend of the video data but also the trend of the features of the respective representative scenes.

In the case where a source of the video data is a DVD, such representative scenes correspond to representative still image that have previously been set for each chapter. Accordingly, when the video data of a DVD is played back through the display window W57, the microprocessor 3 of the image processing apparatus 2 easily realizes the trajectory display processing for remain displaying the representative scenes.

In the image processing apparatus 2, although the display windows W57 corresponding to the representative scenes remain displayed in the above description, it is possible to remain displaying the display windows on a time-basis, e.g., at a constant time interval. In this case, the user can visually confirm the still images displayed through the display windows W57 existing at a constant time interval, so that even after the playback processing of the video data using the display window W57, it is possible for the user to immediately grasp the feature (trend) of the video data through the display windows W57 remain displayed at a constant time interval.

(6-3) Trajectory Display Mode at Scene Change Time or Flash Time

There is a scene change or flash during the playback of the image of the video data through the display window W57, as shown in FIG. 45. In the case where the feature amounts of a still image before the scene change significantly differ from the feature amounts of a still image after the scene change, a display window W57before before the scene change may significantly jump to a display window W57after after the scene change in some cases.

In such a case, the image processing apparatus 2 executes the coordinate compensation processing routine SRT1 (FIG. 24) as described above so as not to allow the display window W57before to jump in a single action to the display window W57after but sequentially arranges the display windows W57 from the position corresponding to the display window W57before while reducing the movement distance in a stepwise manner toward the destination, thereby allowing the user to visually confirm the movement from the display windows W57before to W57after at the time of a scene change. This coordinate compensation processing can be implemented in the trajectory display mode.

In this case, the microprocessor 3 of the image processing apparatus 2 does not allow the display window W57 to jump to a destination in a single action on its trajectory but allows the display window W57 to move in a stepwise manner from the position of the display window W57before before scene change to the position of the display window W57after after the scene change. At this time, the microprocessor 3 of the image processing apparatus 2 highlights (e.g., displays the display windows W57 in a translucent color, or in a blinking manner) only the display windows W57 moving in a stepwise manner.

The microprocessor 3 of the image processing apparatus 2 remains displaying both the display window W57before before scene change and display window W57after after the scene change, thereby allowing the user to always visually confirm the contents before and after the scene change.

Incidentally, in place of executing the above-mentioned coordinate compensation processing routine SRT1, the microprocessor 3 of the image processing apparatus 2 may repeatedly display the still images changing between the positions before and after the scene change by the display window W57after at a constant interval. At this time, the movement display speed is extremely lowered relative to the jumping speed.

Figure 46:
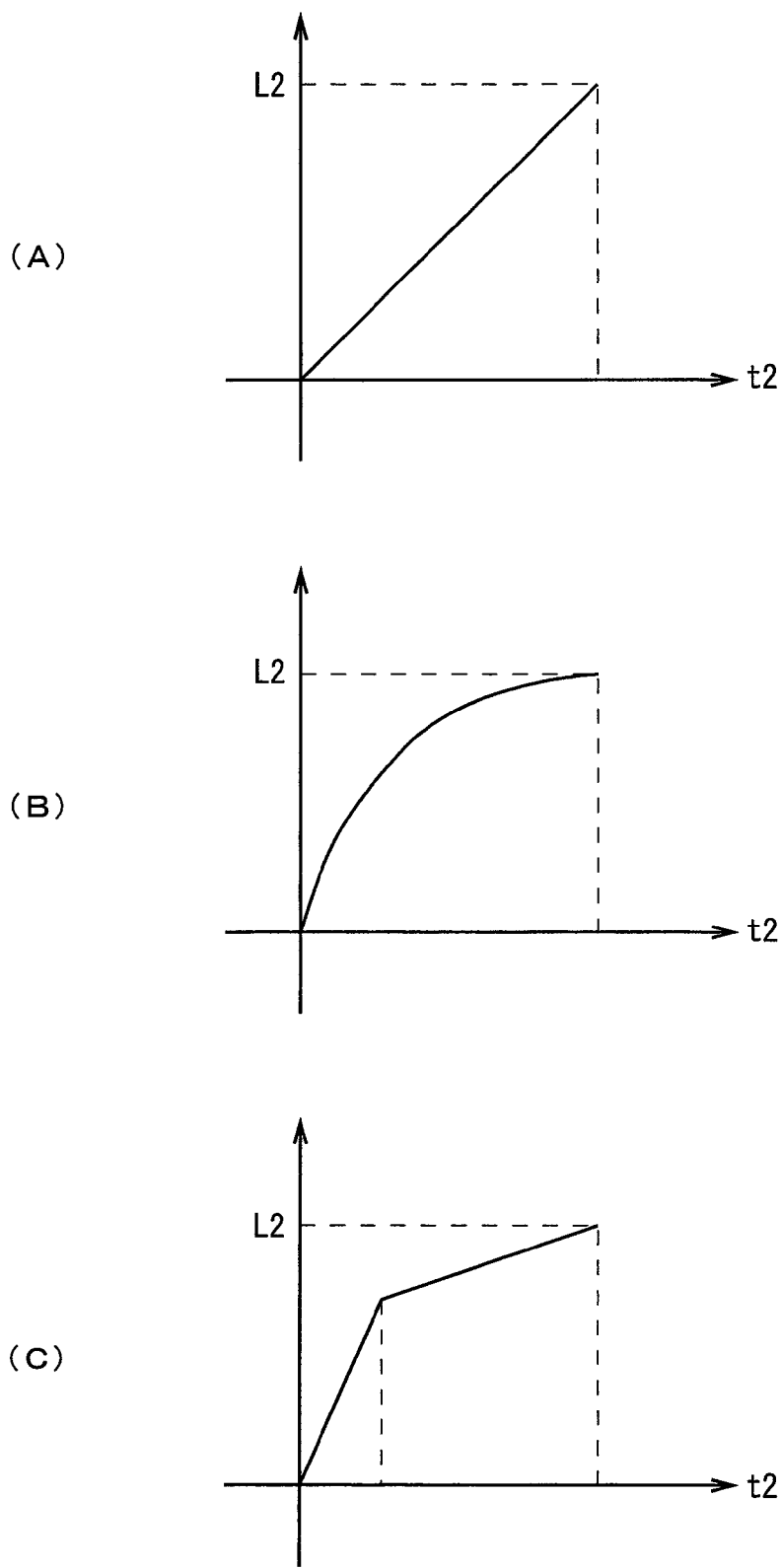
FIGS. 46 (A) to 46 (C) are schematic views each showing a movement speed control example.

The microprocessor 3 of the image processing apparatus 2 may set the movement display speed such that a distance L2 between the positions before and after the scene change by the display window W57after and a movement time t2 required for the display window W57 to move the distance L2 have a linear relationship as shown in FIG. 46 (A) or such that the distance L2 and movement time t2 have a non-linear relationship as shown in FIGS. 46 (B) and 46 (C).

In this case, when allowing the display window W57 to move in a stepwise manner from the position of the display window W57before before scene change to the position of the display window W57after after the scene change, the microprocessor 3 of the image processing apparatus 2 can change the movement speed of the display window W57 in such a manner as to move the display window W57 at high speed in the beginning and gradually lowers the movement display speed thereof.

Further, upon recognition of user's click operation with respect to the display window W57 moving on the trajectory, the microprocessor 3 of the image processing apparatus 2 remains displaying the clicked display window W57 at a position determined in accordance with the feature amounts of the corresponding still image at that time for several seconds or semipermanently. Upon recognition of another click operation with respect to this display window W57, the microprocessor 3 of the image processing apparatus 2 deletes the clicked display window W57 or resumes playback of the image through the display window W57 at that time point.

(6-4) Trajectory Display Mode Using Time Code

Figure 47:
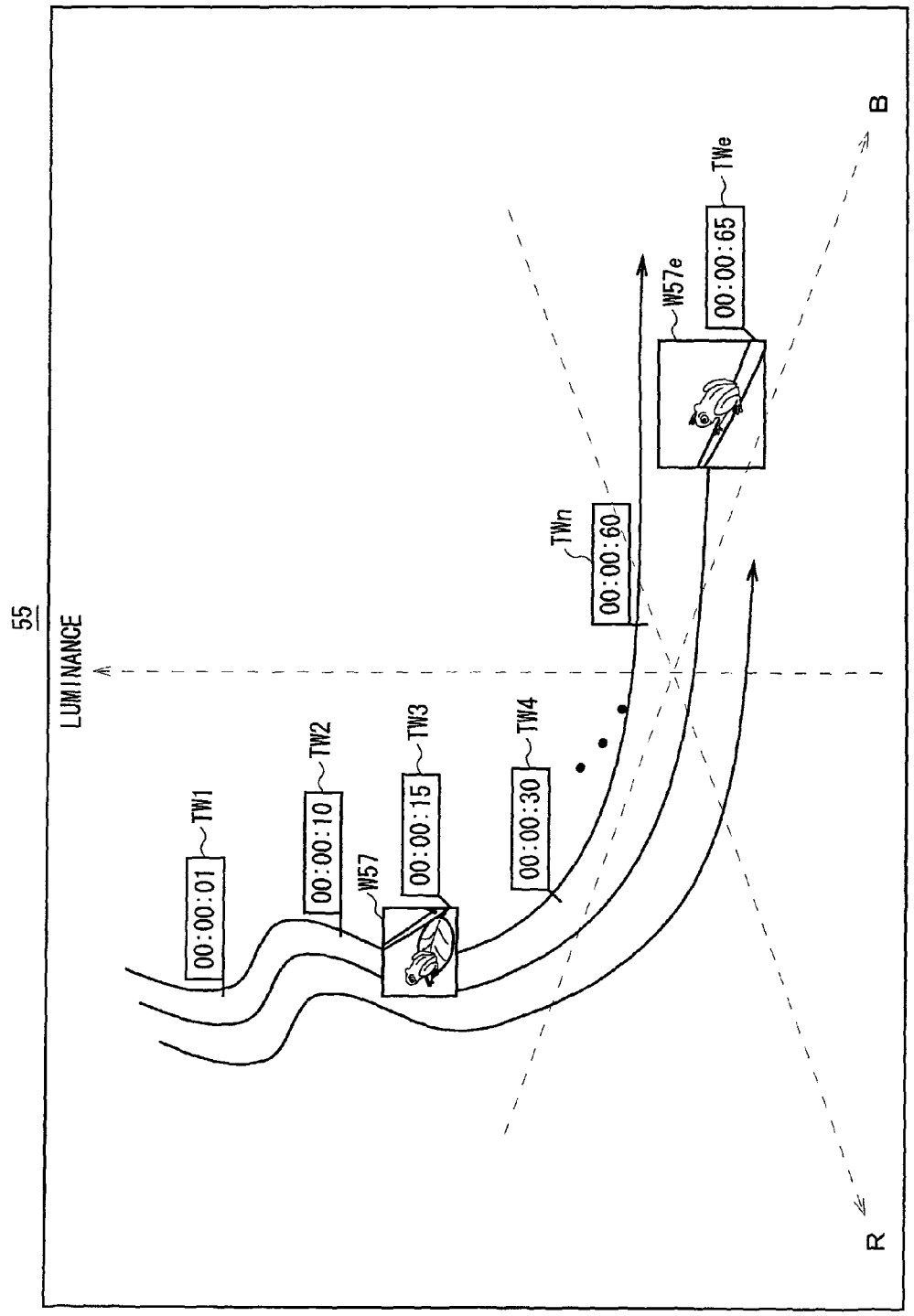
FIG. 47 is schematic view showing an example of a trajectory display including time code.

As shown in FIG. 47, when playing back the video data through the display window W57 while the display window W57 on the three-dimensional display space, the microprocessor 3 of the image processing apparatus 2 can display time code display frames TW1 to TWn along predetermined positions on the trajectory of the display window W57.

The microprocessor 3 of the image processing apparatus 2 reads out time code information associated with the video data which are displayed in the time code display windows TW1 to TWn from the metadata files MDF corresponding to the respective still images and uses the read out time code information to display time codes of the time code display frame TW1 to TWn.

Further, the microprocessor 3 of the image processing apparatus 2 can add the correspond time code not only to the positions on the trajectory but also to the remaining displayed display window W57 showing a still image corresponding to a representative scene and remaining displayed display window W57e at the end position POe through the time code display frames TW3 and TWe.

Thus, not only the trajectory of the display window W57 displayed in a moving manner in accordance with the progress of the video data, but also the time information of the video data can be present to the user through the time code display frames TW1 to TWn to TWe added to the positions on the trajectory line and display windows W57, whereby the user can search for his or her desired scene while recognizing the time course of the video data through the time code display frames TW1 to TW4.

In the case where a plurality of video data having very similar features are played back through their respective display windows W57, the resultant trajectories of the respective display windows W57 become very similar to one another. In this case, three similar trajectories are displayed.

By visually confirming this state, the user can estimate that the three video data have similar contents based on the similarity between the trajectories, thereby easily managing and searching for the video data.

(6-5) Display Window Control Mode During Display of Trajectory

The image processing apparatus 2 can display the display window W57 in a moving manner in accordance with the progress of the playback image of the video data while changing the size and shape of the display window W57 in addition to displaying the trajectory thereof, and this point will be described below.

Figure 48:
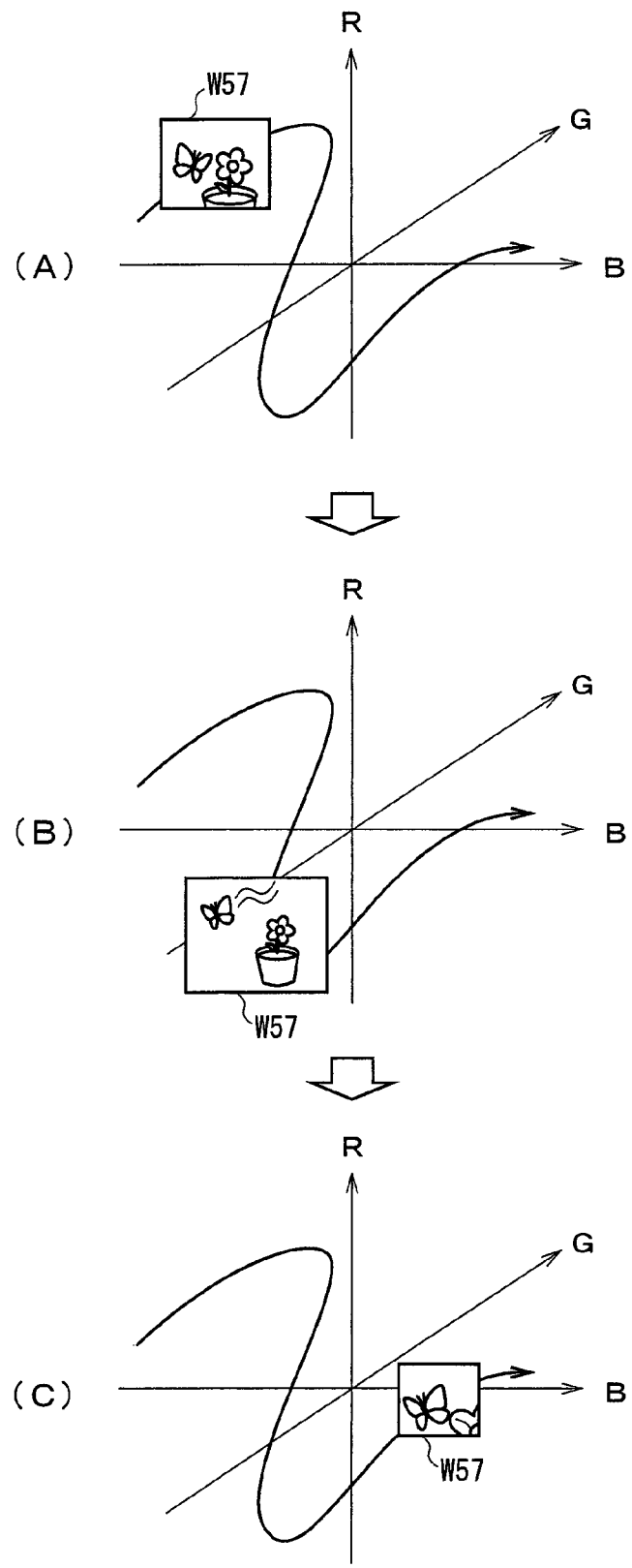
FIGS. 48 (A) to 48 (C) are schematic views used to explain display window control processing.

Concretely, in the case where the display window W57 of the video data is displayed in a moving manner along its trajectory on the three-dimensional display space on which RGB color components are set as the parameters of the display axes as shown in FIG. 48 (A), the microprocessor 3 of the image processing apparatus 2 acquires, e.g., the feature amounts of the density information of the still images constituting the video data from the respective metadata file MDF of the still images in addition to the feature amounts in the RGB color components used as the feature parameters of the display axes. When the feature amount of the density information exceeds a predetermined threshold value, the microprocessor 3 of the image processing apparatus 2 enlarges the size of the display window W57 corresponding to the still image at that time point by a predetermined factor as shown in FIG. 48 (B).

When the feature amount of the density information of the still image is less than a predetermined threshold value, the microprocessor 3 of the image processing apparatus 2 reduces the size of the display window W57 corresponding to the still image at that time point by a predetermined factor as shown in FIG. 48 (C).

That is, in the case where the still image includes a large number of high frequency components to cause the feature amount of the density information to exceed a predetermined threshold value, the microprocessor 3 of the image processing apparatus 2 enlarges the size of the display window W57 corresponding to the still image to thereby enhance viewability for the user.

On the other hand, in the case where the still image hardly includes a high frequency component to cause the feature amount of the density information to become less than a predetermined threshold value, the microprocessor 3 of the image processing apparatus 2 determines that viewability for the user hardly changes even if the image size is reduced and reduces the size of the display window W57, thereby resulting in a reduction in a processing load.

Incidentally, although the density information of the still image is used as a parameter in addition to the color components constituting the display axes to enlarge or reduce the display size of the display window W57 in the above description, other various kinds of feature amounts such as motion amount, hue, and audio level may be used to enlarge or reduce the size of the display window W57. Further, it is possible not only to enlarge or reduce the size of the display window W57 but also to change the shape of the frame of the display window W57, or to control both the display size and frame shape.

(7) Operation and Advantage

As described above, when displaying the playback image of the video data through the display window W57, the microprocessor 3 of the image processing apparatus 2 sequentially arranges the display windows W57 on the three-dimensional display space generated using the display axes specified by the user every time the frame of the video data is updated in accordance with the feature amounts of respective still images constituting the video data.

The feature amounts change every time the frame of the video data is updated to change the destination coordinate position of the display window W57, thereby giving the user an impression as if the display window W57 moved in a floating manner on the three-dimensional display space.

For example, in the case where video data shot by a video camera in a travel destination is arranged on the three-dimensional display space and a playback image of the video data is displayed through the display window W57, the display window W57 showing, e.g., a "sea" moves to an area where a number of display windows W57 of the video data shot on a beach are arranged. When the scene of the video data is then updated to a still image of "mountain", the display window W57 correspondingly moves to an area where a number of display windows W57 of the video data shot in a mountain forest are arranged. When the scene of the video data is then updated to a still image of "building", the display window W57 correspondingly moves to an area where a number of display windows W57 of the video data shot in a downtown are arranged.

The motion itself of the display window W57 represents the feature of the video data, so that the user can intuitively recognize the feature (trend) of the video data through the positional change of the display window W57 on the three-dimensional display space and motion image of the display window W57 itself.

In a conventional approach, only the first image of a plurality of still images constituting the video data is displayed in thumbnail view. However, the above approach does not necessarily represent the trend of the video data. In the present invention, the movement of the display window W57 itself, which is caused by a change of the feature amounts of the still image constituting the video data, is presented to the user as a motion image, allowing the user to correctly understand the feature (trend) of the video data, which facilitates search or management of video data.

In the case where there is a scene change or flash during playback of the video data, the image processing apparatus 2 does not allow the display window W57 to jump in a single action from the position on the three-dimensional display space before scene change or flash to the position on the three-dimensional display space after scene change or flash, but displays the display window W57 in a moving manner while reducing the movement distance in a stepwise manner toward the destination, thereby preventing the user from losing track of the display window W57. Thus, the user can grasp the display window W57 as a motion image without interruption.

Further, when a plurality of display windows W57 corresponding to a plurality of video data are used to perform playback processing simultaneously, the display window W57 corresponding to video data having similar feature amounts are collected in a specific area on the three-dimensional display space every time the frames of the video data are updated, thereby allowing the user to intuitively and easily recognize the features (trends) of the plurality of video data through the arrangement state of the display windows W57 collected or dispersed on the three-dimensional display space.

Further, when the parameters of the display axes defining the three-dimensional display space are changed by a user's instruction in a state where video data is played back to display the display window W57 on the three-dimensional display space, the image processing apparatus 2 generates a new three-dimensional display space to thereby significantly change the arrangement state of the display windows W57 to be displayed thereon. That is, it is possible foe the user to freely change the arrangement state of the display windows W57 on the basis of his or her desired parameters.

Further, when displaying the display window W57 in a moving manner, the image processing apparatus 2 displays the past trajectory of the display window W57, future trajectory thereof, or both the past and future trajectory thereof together with the display windows W57 according to user's selection, thereby visually presenting the past and future movement of the display window W57 on the three-dimensional display space. Therefore, simply by comparing the trajectories of display windows W57 corresponding to a plurality of video data, the user can intuitively understand whether there is a similarity between the video data as trajectory line image.

When arranging the display windows W57 corresponding to the video data on the display area 55 of the edit window to thereby present the display windows as the image group 58, the image processing apparatus 2 does not display the display axes themselves defining the three-dimensional display space and arranges the display windows W57 such that all the display windows W57 are always positioned right in front of the user's view, allowing the user to easily understand that the plurality of display windows W57 are arranged on the three-dimensional display space.

As described above, in the case where the video data is played back, the feature amounts of the still images are changed every time the respective still image constituting the video data are updated. According to the change in the feature amounts of the image, the image processing apparatus 2 displays the display window W57 in a moving manner while changing a relative positional relationship between the display window W57 and three-dimensional display space to thereby express the feature (trend) of the playback image that the video data has as a motion of the display window W57 according to the change in the feature of picture, allowing the user to intuitively recognize the motion image of the display window W57. Thus, it is possible to facilitate classification, management, and search of a large number of video data through intuitive images.

(8) Another Embodiment

Although the case where the video processing apparatus according to another embodiment of the present invention is applied to the image processing apparatus 2 has been explained in the above embodiment, the present invention is not limited to this case. Alternatively, the video processing apparatus may be applied to a simple computer. In this case, a plurality of video data shot by a video camera are stored in an internal hard disc drive of the computer, and all the video data are arranged on the three-dimensional display space for display, thereby allowing the user to intuitively recognize the feature or overall trend of the still image video data and to easily search his or her desired image.

Figure 49:
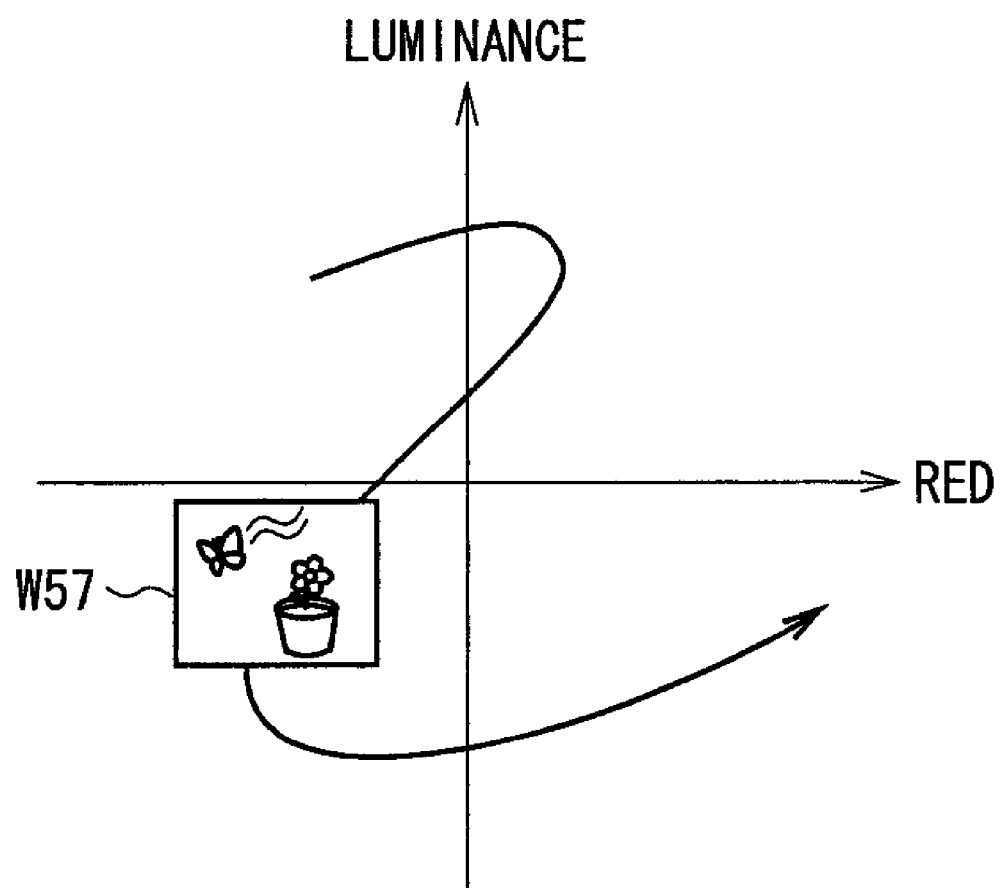
FIG. 49 is a schematic view used to explain a two-dimensional display space according to another embodiment of the present invention.

Further, although the case where the display window W57 is arranged on the three-dimensional display space has been explained in the above embodiment, the present invention is not limited to this case. Alternatively, as shown in FIG. 49, the display window W57 may be arranged on a two-dimensional display space and, further, the trajectory thereof may be displayed on the two-dimensional display space.

Further, although the case where the three-dimensional display space is generated with R (red), B (blue), and luminance that a picture (still image) constituting the video data has set to the display axes as feature parameters has been explained in the above embodiment, the present invention is not limited to this case. Alternatively, it is possible to use audio information associated with the still image or time information as a parameter of the display axes, or it is possible to use both the R (red) and B (blue) as one parameter of the display axes. As described above, various kinds of multidimensional display spaces may be generated for arrangement of the display window W57 according to the user's preference.

Figure 50:
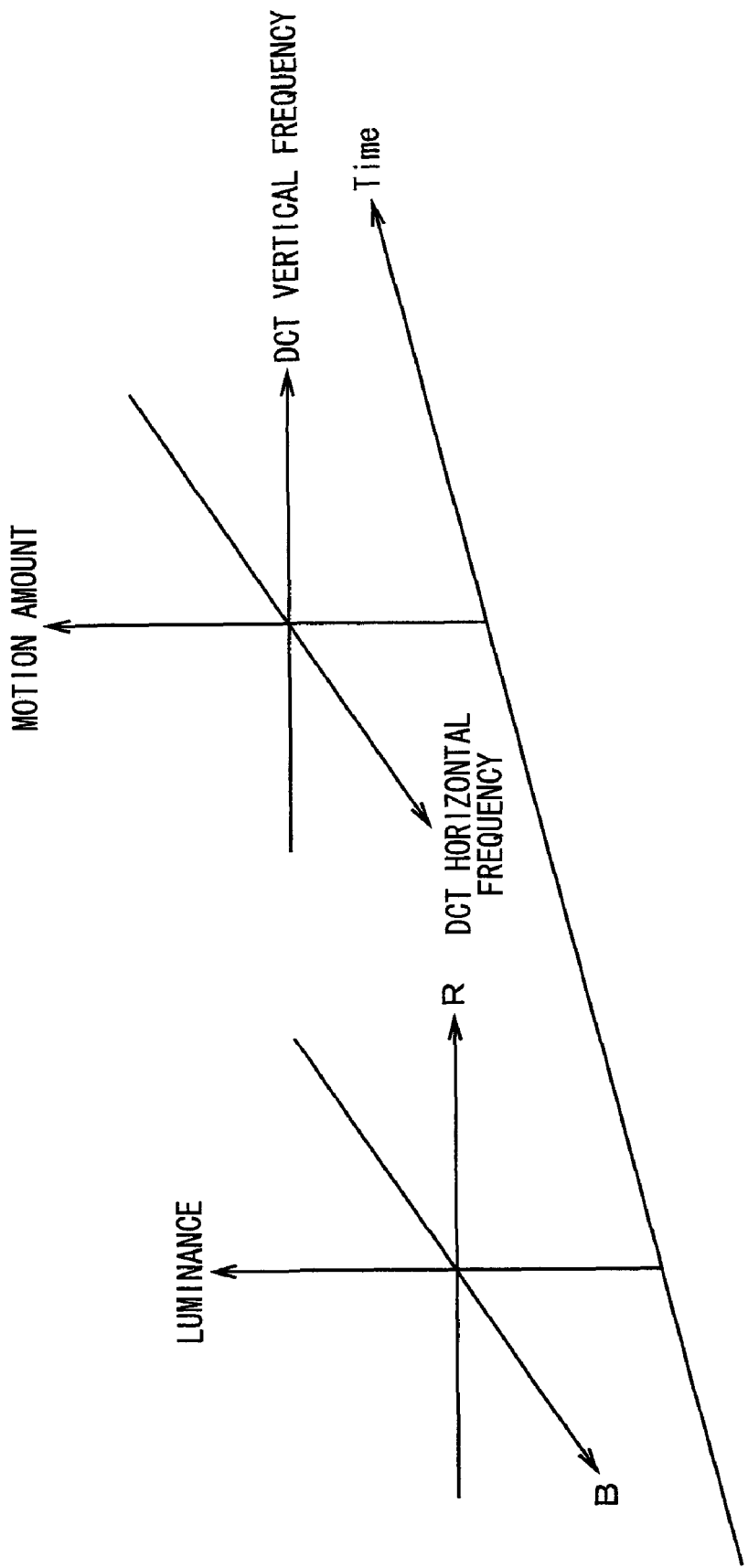
FIG. 50 is a schematic view showing a four-dimensional display space according to another embodiment of the present invention.

For example, as shown in FIG. 50, the image processing apparatus 2 may arrange a three-dimensional display space defined by the display axes determined by luminance, R (red), and B (blue) and three-dimensional display space defined by the display axes determined by motion amount, DCT vertical frequency, and DCT horizontal frequency along the time axis to generate a four-dimensional display space so as to arrange the display window W57 of the video data on the four-dimensional display space and display the display window W57 in a moving manner along with the playback processing.

Figure 51:
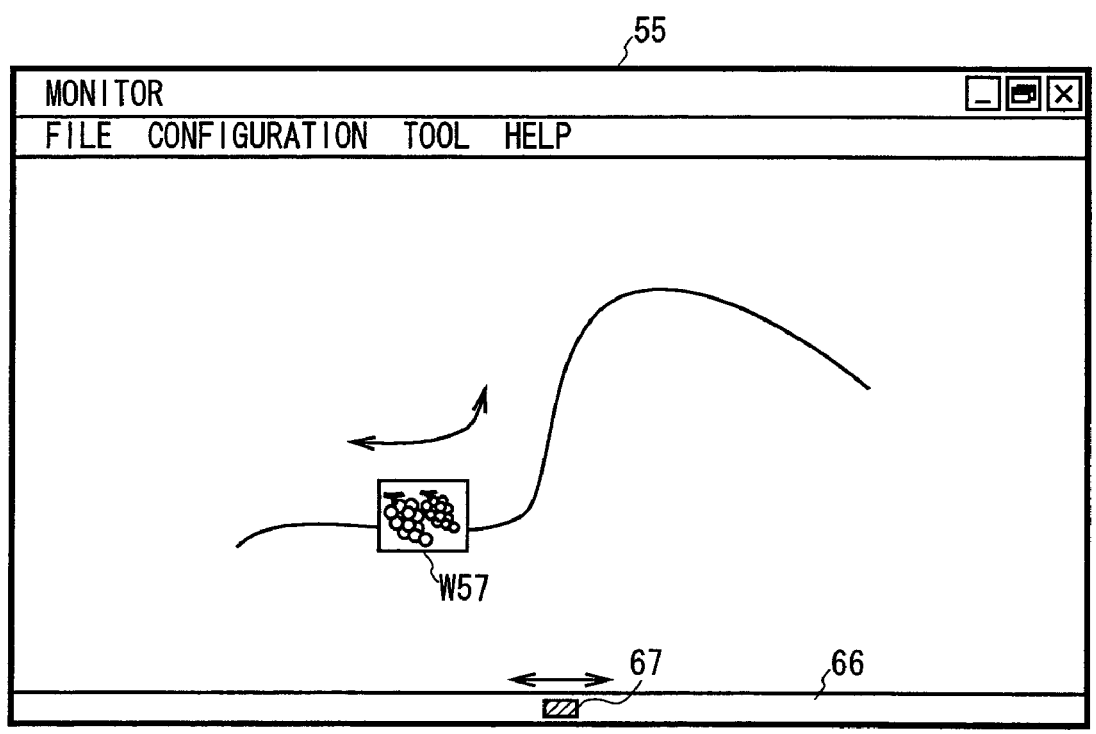
FIG. 51 is a schematic view used to explain display window movement display processing that operates simultaneously with the movement of a horizontal scroll bar according to another embodiment.

Further, although the case where the display window w57 is displayed in a moving manner on the three-dimensional display space in accordance with the playback of the video data has been explained in the above embodiment, the present invention is not limited to this case. Alternatively, as shown in FIG. 51, the display window W57 may be moved to the past or future side along the trajectory of the display window W57 in accordance with the user's operation to a tab 67 on a horizontal scroll bar 66 provided on the display area 55 of the edit window 50.

In this case, the user can freely control the position of the display window W57 on the three-dimensional display space on his or her own will, thereby further easily search his or her desired scene or execute editing work.

Further, although the case where the playback image of the video data is displayed through the display window W57 has been explained in the above embodiment, the present invention is not limited to this case. For example, in the case where the display windows W57 constituting the image group 58 are overlapped with one another, some display windows W57 may be hidden by other display windows W57. In this case, for the hidden display windows W57, the update rate of the still images constituting the video data may be decreased to extremely reduce the playback speed, the resolution may be reduced, the still image may not be updated, or no image may be displayed. As described above, by eliminating the playback display processing for the display windows W57 that the user cannot visually confirm, the processing load on the microprocessor 3 can be reduced.

Further, although the case where the time code display frame TW (FIG. 47) is added to the trajectory line or display window W57 has been explained in the above embodiment, the present invention is not limited to this case. Alternatively, various notification windows such as a frame number notification window or field number notification frame may be added to the trajectory line of display window W57 as long as the playback elapsed time can be notified to the user.

Further, although the feature parameters or associated parameters are calculated for each picture (still image) of the video data in the above embodiment, they may be calculated on a plurality of pictures basis, e.g., in units of one GOP. For example, the average value of the feature parameters of all the pictures constituting one GOP or the feature parameters (associated parameters) of a specified I picture selected from among the pictures constituting one GOP may be adopted as the feature parameters of one GOP.

In the case where the feature parameters or associated parameters are calculated in units of a plurality of pictures, e.g., one GOP so as to be stored as the metadata, the size of the metadata can be reduced, as well as the processing load required for analyzing the metadata can be reduced, as compared to a case where the feature parameters or associated parameters are calculated on a picture basis.

When the picture-basis or GOP-basis feature parameters or associated parameters are calculated at the time of generation of the metadata in the case where the video data is encoded by the MPEG video format, the obtained feature parameters or associated parameters may be included in a picture header or GOP header in a video stream obtained as a result of the MPEG encoding process.

(9) Associated Parameters Linked to Video data

Although the feature parameters of the picture (still image) constituting the video data has been explained in the above embodiment, the present invention may be applied to a configuration using parameters (associated parameters) linked (associated) to the video data. Examples of the associated parameters include time information representing the time at which the video data is shot or recorded, positional information (lat/long information) representing the location at which the video data is shot or recorded, identification information for identifying the owner or creator of the video data, identification information for identifying the user accessing the video data through a network, the number of times of accesses representing the number of times the video data is accessed, group identification information for identifying the group of the video data, face identification information for identifying the faces of persons included in the video data, and title category, keyword, or subtitle information included in the video data. These associated parameters can be generated using a known technique.

The term "linked (associated)" state represents a state where the data and parameters (metadata) are linked to each other. For example, even when the video data and metadata are recorded in different recording media or transmitted from different transmission lines, if information for identifying the video data or picture number of the video data is included in the parameters (metadata), it is possible to associate the video data and metadata with each other afterward. In the present embodiment, such a case is included in the "linked (associated)" state.

Such associated parameters are used according to the same processing procedure as described above together with the feature parameters to achieve the abovementioned display configuration.

Figure 52:
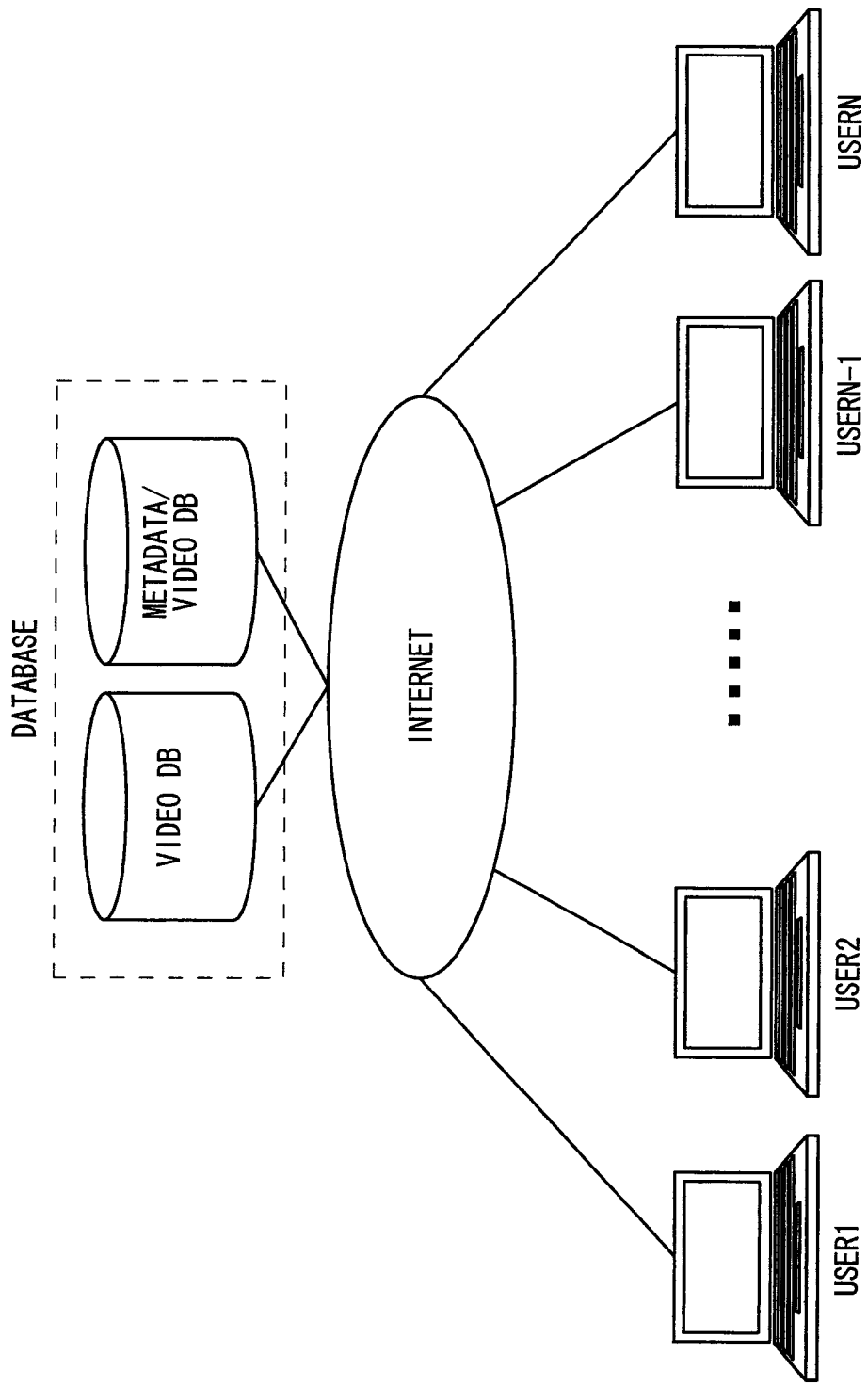
FIG. 52 is a schematic view used to explain applicable applications.

As shown in FIG. 52, there can be considered an application that collectively manages the video data provided (uploaded) from a plurality of users 1 to N in servers (video DB, metadata/video DB) and allows the users to access his or her interesting video data through a network for confirmation of the content of the video data.

In this case, the database can manage the associated parameters for each video data. For example, in the case where the number of times of accesses representing the number of times the video data is accessed is included in the associated parameters, the display size of the display window can be changed in accordance with increase or decrease of the number of accesses (for example, when the number of accesses exceeds a previously set threshold value, the corresponding video data is determined to be popular, and size of the display window of the video data is increased or display window thereof is highlighted). Further, in the case where the identification information for identifying the owner or creator of the video data is included in the associated parameters, the display space can be set for each user. Further, the display space can be generated on a category basis.

Figure 53:
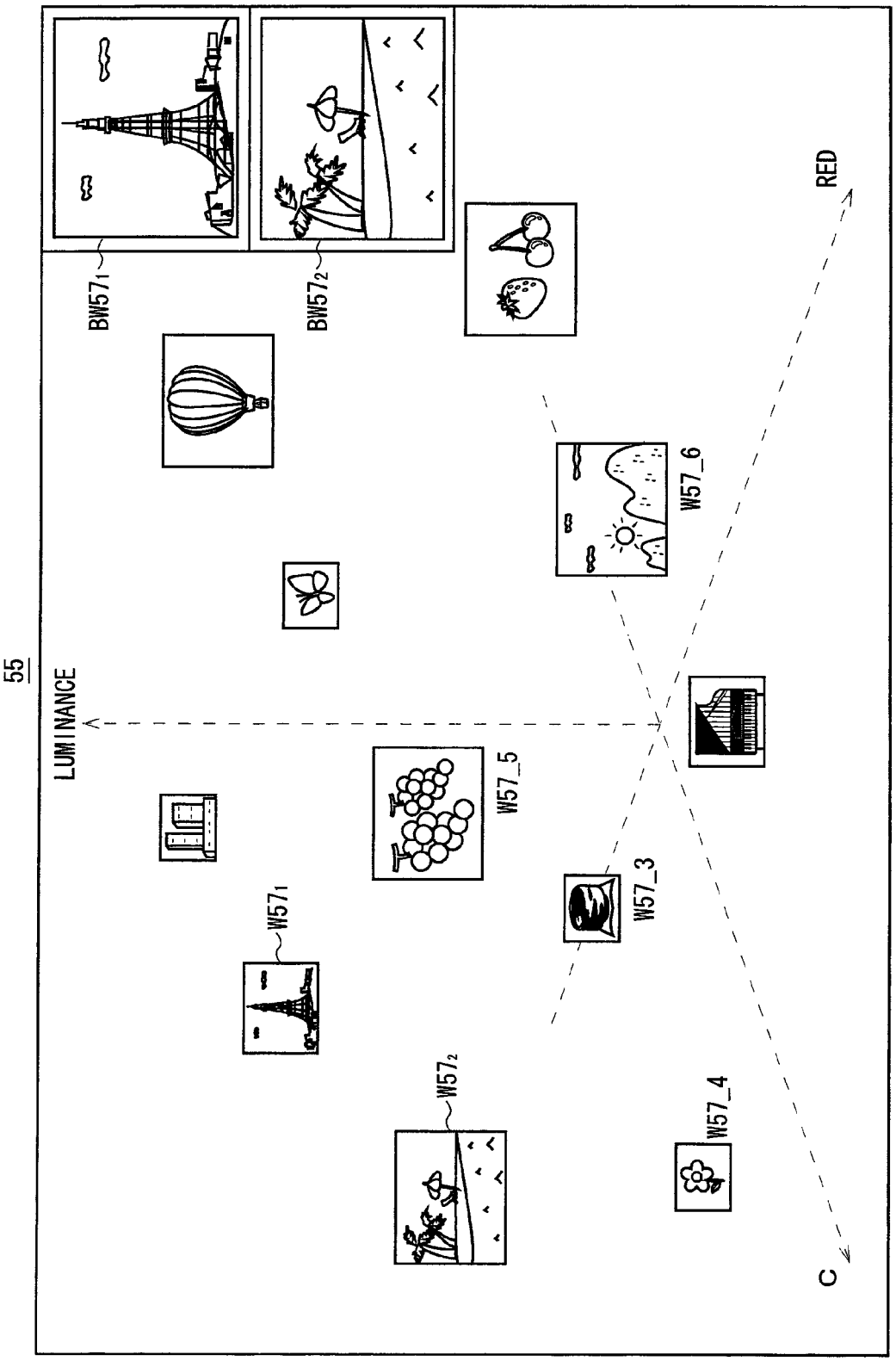
FIG. 53 is a schematic view showing a display example (1) obtained when an associated parameter is utilized.

For example, as shown in FIG. 53, display windows W57_2, W57_5, and W57_6 are displayed in a larger size than the display windows W57_1, W57_3, and W57_4. This means that the number of accesses to the former display windows is greater than the latter display windows.

Figure 54:
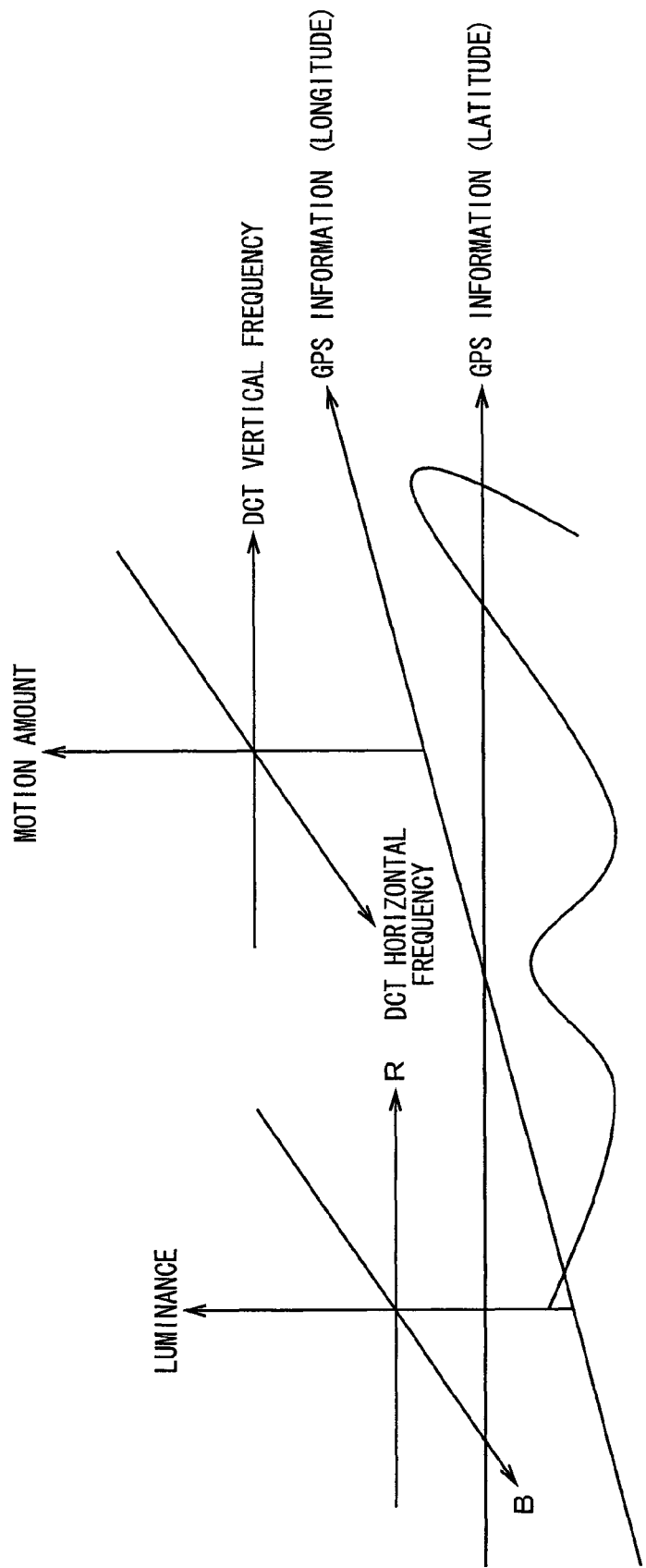
FIG. 54 is a schematic view showing a display example (2) obtained when an associated parameter is utilized.
Figure 55:
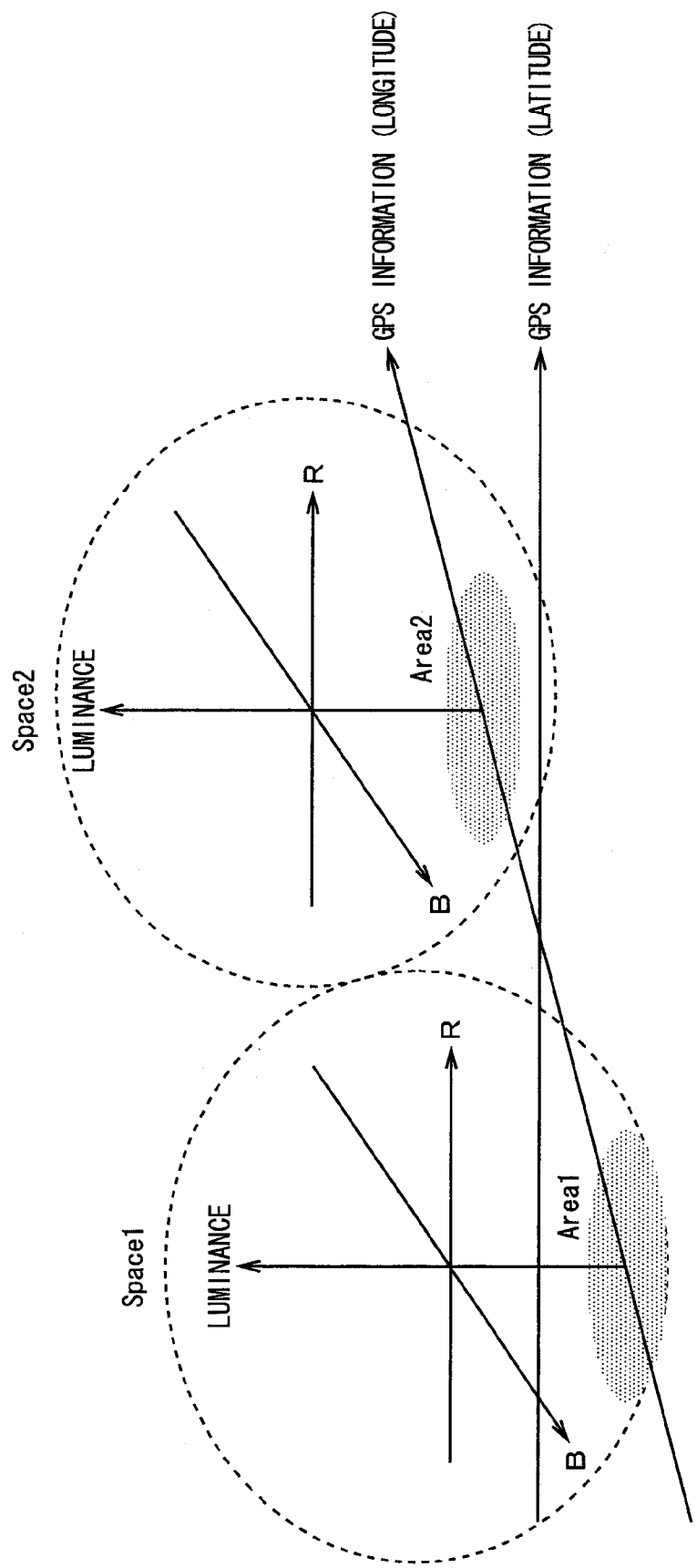
FIG. 55 is a schematic view showing a display example (3) obtained when an associated parameter is utilized.

In FIG. 50, the case where the time axis is used to generate the four-dimensional display window has been explained. When the abovementioned associated parameters are used, various display configurations can be achieved. For example, in the case where the positional information (latitude/longitude) generated using s GPS and linked to the video data is included in the associated parameters, a display space to which the positional information is added as a display axis is generated as shown in FIG. 54. In this case, the video data and three-dimensional display space move in conjunction with each other along with a change in the positional information.

Further, in the case where a large number of users provide a large number of video data as shown in FIG. 52, the similarity which is the feature parameters and associated parameters are used to group the video data in terms of similarity and positional information and generate a display space for each group. Particularly, in an application like a video posting site and SNS (Social Networking Service), the display space generated for each group can be regarded as a community. Thus, the video data posted from a number of users are utilized to promote communication between users.

(10) Apparatus to which Present Invention is Applicable

Although the case where the present invention is applied to the image processing apparatus 2 having the configuration as shown in FIG. 1 has been explained in the above embodiment, the present invention is not limited to this case. Alternatively, the present invention may widely be applied to other various image processing apparatus as long as it can achieve a function as an image processing apparatus.

Examples of the image processing apparatus include a computer, a video camera, a digital camera, a game device, a portable information terminal (portable-type computer, mobile phone, portable-type game device), a storage device (optical disc device, home server), and a processing board or processing card implementing a function embodying the present invention.

In either case, the above image processing apparatus commonly includes a casing, a signal processing section, and an external interface and separately includes a peripheral unit in accordance with its product form. For example, in the case of a video camera or digital camera, it includes, in addition to the above-mentioned common components, a camera unit and a write circuit for storing shot video image data in a storage medium. In the case of an electronic apparatus having a communication function, such as a mobile phone, it includes, in addition to the above-mentioned common components, a transmitting/receiving circuit and an antenna.

Further, although the case where the microprocessor 3 activates the video processing program stored in the hard disc drive 7 to display the display window W57 on the three-dimensional space in a moving manner has been explained in the above embodiment, the present invention is not limited to this case. Alternatively, a program storage medium storing the video processing program may be installed to the microprocessor 3 so as to execute the abovementioned display processing.

Example of the abovementioned program storage medium that enables the video processing program for executing the display processing to be executed after installing the program in the hard disc drive 7 include not only a package medium such as a flexible disc, a CD-ROM (Compact Disc-Read Only Memory), a DVD (Digital Versatile Disc), but also a semiconductor memory or magnetic disc that temporarily or permanently stores the video processing program. In addition, as a means for storing the video processing program in the abovementioned program storage media, it is possible to utilize a wired or wireless communication medium such as Local Area Network, Internet, or digital satellite broadcasting and, in this case, the program may be stored in the program storage medium through various communication interfaces such as a router or a modem.

Further, although the case where the image processing apparatus 2 as the video processing apparatus according to the present invention is constituted by the microprocessor 3 which serves as a display space generation means and a conversion means and microprocessor 3 and GPU 4 which serve as a classification/arrangement means has been explained in the above embodiment, the present invention is not limited to this case. Alternatively, the image processing apparatus according to the present invention may be constituted by the display space generation means, conversion means, and classification/arrangement means realized by other various circuit configurations.

Various modifications may be made within the spirit and scope of the present invention. Further, various modifications and applications may be made on the basis of the above description of the present invention.

INDUSTRIAL APPLICABILITY

The image processing apparatus and image processing method according to the present invention can widely be applied to various types of image processing apparatuses that plays back video data on a display screen.

The invention claimed is:

1. An image processing apparatus comprising:
    display space generation means for generating a display space defined by display axes determined by one of feature parameters representing a feature of video data or audio data and associated parameters linked to the video data or audio data;
    conversion means for converting feature values designated by one of the feature parameters and associated values designated by the associated parameters into coordinate parameters corresponding to a position on the display axes on the display space; and
    display control means for displaying the video data through a display window on the display space in accordance with a change of the position corresponding to the converted coordinate parameters
    wherein the display control means displays, as a trajectory, a movement pathway that the display window through which the video data is displayed moves in accordance with passage of time in which the video data is displayed on the display space.

2. The image processing apparatus according to claim 1, further comprising:
    selection means for selecting, as display parameters, one of the feature parameters and associated parameters used for changing a display mode of the display window through which the video data is displayed from among a plurality of one of the feature parameters and the associated parameters,
    wherein the display control means changes a display style of the display window displaying the video data in accordance with a value of the display parameters selected by the selection means.

3. The image processing apparatus according to claim 2, wherein the display style includes one of a size of the display window, a contrast inside the display window, a transmittance inside the display window, and a highlight of the frame of the display window.

4. The image processing apparatus according to claim 1, further comprising:
    selection means for selecting, as playback mode parameters, one of the feature parameters and the associated parameters used for selecting whether one of a first video data having a first resolution and a second video data having a resolution lower than the first resolution is to be displayed from among a plurality of one of the feature parameters and the associated parameters;
    wherein the display control means selects and displays one of the first video data and the second video data in accordance with a value of the playback mode parameters selected by the selection means.

5. The image processing apparatus according to claim 1, further comprising:

selection means for selecting, as playback mode parameters, one of the feature parameters and the associated parameters used for selecting whether one of video data based on a first format and video data based on a second format having a data amount smaller than that of the first format is to be displayed from among a plurality of one of the feature parameters and the associated parameters;
wherein the display control means selects and displays one of the video data based on the first format and the video data based on the second format in accordance with a value of the playback mode parameters selected by the selection means.

6. The image processing apparatus according to claim 1, wherein the display space generation means selects three different feature parameters or associate parameters from among a plurality of one of the feature parameters and the associated parameters to generate a three-dimensional display space.

7. The image processing apparatus according to claim 1, wherein the display control means displays a still image included in the video data on a corresponding position on the trajectory.

8. The image processing apparatus according to claim 7, wherein the display control means displays the still image on the corresponding position on the trajectory at prescribed time intervals.

9. The image processing apparatus according to claim 1, wherein the display control means displays a time code corresponding to the video data on the trajectory.

10. The image processing apparatus according to claim 1, wherein the display control means displays, as a trajectory display mode, a trajectory corresponding to the past and a trajectory corresponding to the future based on a position on the trajectory of currently-displayed video data.

11. The image processing apparatus according to claim 1, wherein the display control means displays only the trajectory corresponding to the past as a past trajectory display mode based on a position on the trajectory of currently-displayed video data.

12. The image processing apparatus according to claim 1, wherein the display control means displays only the trajectory corresponding to the future as a future trajectory display mode based on a position on the trajectory of currently-displayed video data.

13. The image processing apparatus according to claim 1, further comprising:
variation determination means for determining whether a variation of the feature amounts included in the feature parameters is greater than or equal to a threshold value,
wherein the display control means, when the variation is determined to be greater than or equal to the threshold value by the variation determination means, displays with changing movement speed of the display window displaying the video data from the coordinate parameters before changing to the coordinate parameters after changing.

14. The image processing apparatus according to claim 13, wherein the display control means displays so that the movement speed of the display window is to be slower.

15. The image processing apparatus according to claim 13, wherein when the feature amounts are greater than or equal to the threshold value, the variety determination means determines that one of a scene change and a flash has occurred.

16. The image processing apparatus according to claim 1, further comprising:
a video decoder that decodes a video stream to generate the video data.

17. The image processing apparatus according to claim 1, further comprising:
recording means for recording one of the feature parameters and the associated parameters as metadata in a recording medium;
wherein the conversion means converts, by referring to the metadata recorded in the recording medium, the feature value designated by one of the feature parameters and the associated value designated by the associated parameters into the coordinate parameters corresponding to the display axes on the display space.

18. The image processing apparatus according to claim 1, further comprising:
recording means for recording coordinate parameters converted by the conversion means as metadata in a recording medium;
wherein the display control means displays the video data through the display window corresponding to which a position to the coordinate parameters changes by referring to the metadata recorded in a recording medium.

19. The image processing apparatus according to claim 1, further comprising:
display axes changing means for changing combination pattern of one of the feature parameters and the associated parameters used for the display axes on the display space;
wherein the display control means displays the video data through the display window on the display space having the display axes changed by the display changing means.

20. The image processing apparatus according to claim 1, further comprising:
metadata generation means for generating, as metadata, similarity information representing that the images of the video data are similar to each other, when a distance between a plurality of video data on the display space is within a predetermined value,
wherein when the similarity information represents a condition of similarity, the display control means changes a display style of the display window corresponding to a plurality of video data.

21. An image processing method comprising:
a display space generation step of generating a display space defined by display axes determined by one of feature parameters representing a feature of video data or audio data and associated parameters linked to the video data or audio data;
a conversion step of converting feature values designated by one of the feature parameters and associated values designated by the associated parameters into coordinate parameters corresponding to a position on the display axes on the display space; and
a display control step of displaying the video data through a display window on the display space in accordance with a change of the position corresponding to the converted coordinate parameters,
wherein the display control step displays, as a trajectory, a movement pathway that the display window through which the video data is displayed moves in accordance with passage of time in which the video data is displayed on the display space.

* * * * *